US010644988B2

(12) United States Patent
Tanaka et al.

(10) Patent No.: US 10,644,988 B2
(45) Date of Patent: May 5, 2020

(54) COMMUNICATION PATH MANAGEMENT APPARATUS AND COMMUNICATION PATH MANAGEMENT METHOD

(71) Applicant: FUJITSU LIMITED, Kawasaki-shi, Kanagawa (JP)

(72) Inventors: Miho Tanaka, Kawasaki (JP); Hitoshi Ueno, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/994,872

(22) Filed: May 31, 2018

(65) Prior Publication Data

US 2018/0351849 A1 Dec. 6, 2018

(30) Foreign Application Priority Data

Jun. 2, 2017 (JP) ................................ 2017-110290

(51) Int. Cl.
| | |
|---|---|
| *H04L 12/721* | (2013.01) |
| *H04L 12/727* | (2013.01) |
| *H04L 12/733* | (2013.01) |
| *H04L 12/715* | (2013.01) |
| *H04L 12/803* | (2013.01) |

(52) U.S. Cl.
CPC .......... *H04L 45/121* (2013.01); *H04L 45/124* (2013.01); *H04L 45/126* (2013.01); *H04L 45/20* (2013.01); *H04L 45/44* (2013.01); *H04L 45/46* (2013.01); *H04L 47/125* (2013.01)

(58) Field of Classification Search
CPC ...................................................... H04L 45/121
See application file for complete search history.

(56) References Cited

U.S. PATENT DOCUMENTS

| | | | | |
|---|---|---|---|---|
| 2012/0179823 A1* | 7/2012 | Hatasaki | ................... | G06F 3/06 709/226 |
| 2013/0208599 A1* | 8/2013 | Mashimo | ............... | H04L 45/125 370/238 |
| 2015/0066929 A1 | 3/2015 | Satzke et al. | | |
| 2017/0338976 A1* | 11/2017 | Wang | ....................... | H04L 12/56 |
| 2018/0054756 A1* | 2/2018 | Kahtava | ............ | H04W 28/0284 |
| 2018/0331951 A1* | 11/2018 | Boutros | ................... | H04L 45/74 |
| 2018/0367455 A9* | 12/2018 | Kwon | ................... | H04L 45/745 |

FOREIGN PATENT DOCUMENTS

| | | |
|---|---|---|
| JP | 2009-282652 | 12/2009 |
| JP | 2015-515037 | 5/2015 |

* cited by examiner

*Primary Examiner* — Kevin M Cunningham
(74) *Attorney, Agent, or Firm* — Fujitsu Patent Center

(57) ABSTRACT

A communication path management apparatus includes a memory, and a processor coupled to the memory and to decide, for each of processing-pairs, part of inter-adjacent-server communication paths that couple adjacent servers on communication paths among servers in the network as data-transfer-paths used for data transfer from a first processing to a second processing of a processing-pair, the processing-pair including first and second processings that are consecutive in the order of execution, based on an execution track record of the first processing that is earlier in the order of execution and the second processing that is later in the order of execution in the processing-pair in each of the servers, and instruct servers at both ends of the data-transfer-paths decided regarding each of the processing-pairs to carry out data transfer of an execution result of the first processing by the data-transfer-paths.

5 Claims, 40 Drawing Sheets

COMMUNICATION PATH MANAGEMENT APPARATUS AND COMMUNICATION PATH MANAGEMENT METHOD

CROSS-REFERENCE TO RELATED APPLICATION

This application is based upon and claims the benefit of priority of the prior Japanese Patent Application No. 2017-110290, filed on Jun. 2, 2017, the entire contents of which are incorporated herein by reference.

FIELD

The embodiments discussed herein are related to a communication path management apparatus and a communication path management method.

BACKGROUND

Today, various pieces of equipment may be coupled to a network as called internet of things (IoT). If a large amount of data is collected from a large number of pieces of equipment coupled to a network and the collected data is processed by a computer, various pieces of knowledge may be obtained.

A distributed system exists as one of computer systems that process a large amount of data. The distributed system executes plural kinds of processing in order decided in advance for collected data by using plural servers. Pieces of application software for executing the respective kinds of processing (hereinafter, referred to as distributed applications) are introduced into the servers in the distributed system. The distributed system balances the processing load by executing the distributed applications on different servers and enables processing of an enormous amount of data.

As a technique relating to the distributed system, there is a method that enables efficient, flexible disposing of application components in a cloud system, for example. Furthermore, a technique has also been devised that carries out selection support of disposing-destination nodes optimized so that cooperative operation of each software component may be properly carried out regarding plural software components forming distributed applications.

Examples of the related art include Japanese National Publication of International Patent Application No. 2015-515037 and Japanese Laid-open Patent Publication No. 2009-282652, for example.

SUMMARY

According to an aspect of the invention, a communication path management apparatus includes a memory configured to store an execution track record of each of a plurality of kinds of processing about which order of execution for input data has been decided in each of a plurality of servers in a network, and a processor coupled to the memory and the processor configured to decide, for each of processing pairs, part of a plurality of inter-adjacent-server communication paths that couple adjacent servers on communication paths among the plurality of servers in the network as data transfer paths used for data transfer from a first processing to a second processing of a processing pair, the processing pair including a first processing and a second processing that are consecutive in the order of execution, based on the execution track record of the first processing that is earlier in the order of execution and the second processing that is later in the order of execution in the processing pair in each of the plurality of servers, and instruct servers at both ends of the data transfer paths decided regarding each of the processing pairs to carry out data transfer of an execution result of the first processing by the data transfer paths.

This object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

In a distributed system, a server that executes a distributed application is often changed for improvement in the efficiency of the whole system, maintenance of the system, or the like. When a server that executes a distributed application is changed, processing of a handover of data to a server that newly executes the distributed application, a new communication coupling for transferring data of the processing target to the server, and so forth is executed. The communication coupling is individually carried out in each inter-adjacent-server communication path that couples adjacent servers on the communication path from the server that executes earlier processing in the order of processing to the server that executes later processing in the order of processing. For this reason, it takes a certain level of time to change the server that executes the distributed application and the processing is delayed during the change.

Therefore, it is conceivable that communication coupling is carried out in advance regarding all inter-adjacent-server communication paths between servers and data to be processed by each distributed application is steadily transferred to all servers via all inter-adjacent-server communication paths in which the communication coupling has been carried out. This may rapidly change the server that executes the distributed application.

However, if the communication coupling of all inter-adjacent-server communication paths between adjacent servers is carried out in advance and all pieces of data are transferred to all servers in the distributed system, the amount of transferred data increases and the load of the network becomes excessively high. It is effective to limit the inter-adjacent-server communication path that transfers data to part of the inter-adjacent-server communication paths for reduction in the load of the network, however, an effective measure for determining which inter-adjacent-server communication path is appropriate for the data transfer does not exist.

Embodiments of a technique for determining the inter-adjacent-server communication path appropriate for carrying out data transfer in a distributed system will be described below with reference to the drawings. The respective embodiments may be carried out with combination of plural embodiments within a range in which contradiction is not caused.

First Embodiment

Figure 1:
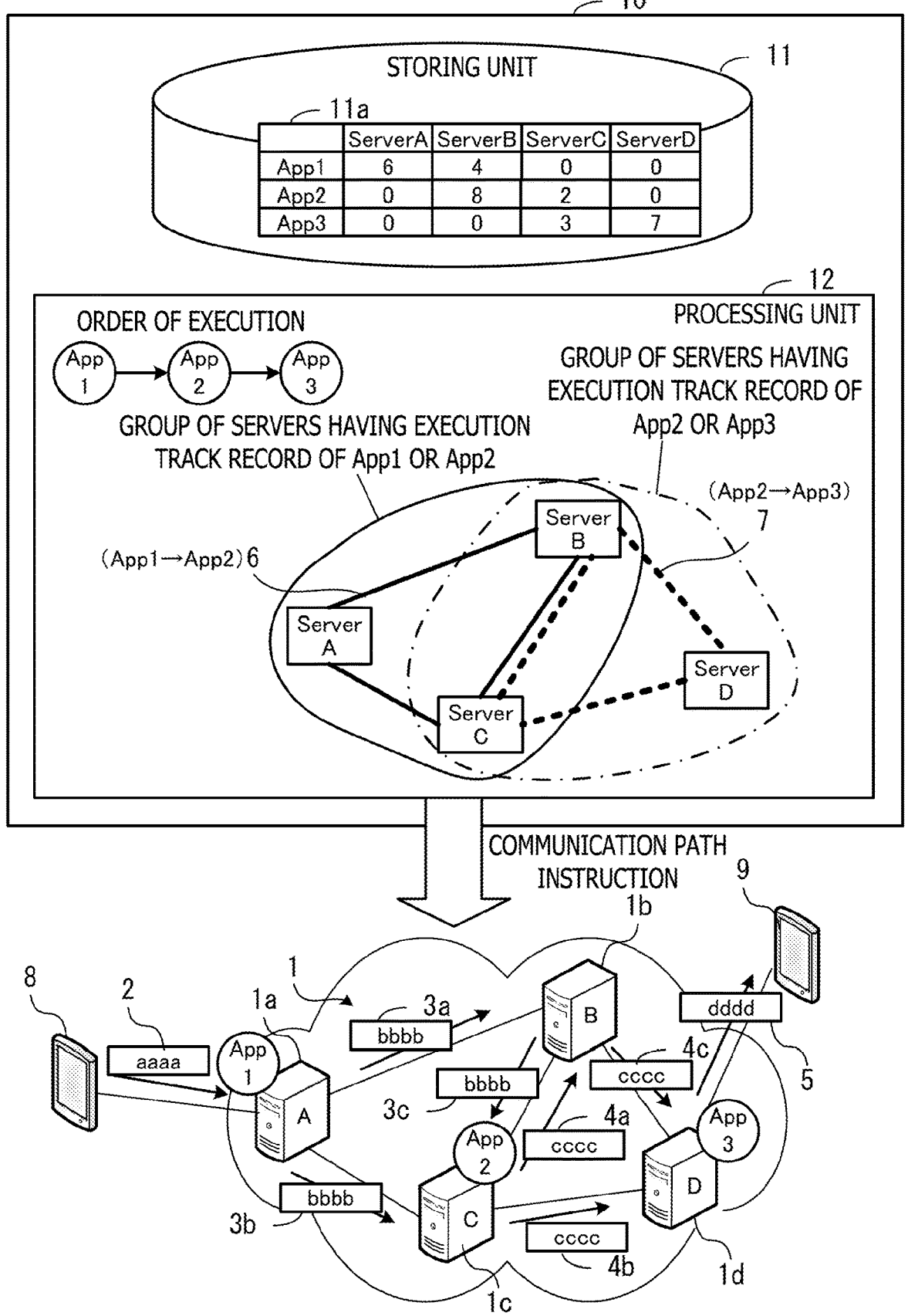
FIG. 1 is a diagram illustrating a configuration example of communication path management apparatus according to a first embodiment.

First, a first embodiment will be described. FIG. 1 is a diagram illustrating a configuration example of communication path management apparatus according to a first embodiment. Communication path management apparatus 10 includes a storing unit 11 and a processing unit 12. The storing unit 11 is a memory or storage apparatus the communication path management apparatus 10 includes, for example. The processing unit 12 is a processor the communication path management apparatus 10 includes, for example.

The storing unit 11 stores an execution track record 11a in each of plural servers 1a to 1d in a network 1 regarding each of plural kinds of processing about which the order of execution for input data 2 has been decided. The plural kinds of processing are executed by using corresponding pieces of software, for example. In the example of FIG. 1, the processing executed first is executed by using software "App1" and the processing executed second is executed by using software "App2." The processing executed last is executed by using software "App3."

The processing unit 12 identifies processing pairs composed of two kinds of processing that are consecutive in the order of execution. Next, the processing unit 12 executes the following processing regarding each processing pair.

The processing unit 12 checks the execution track record 11a in each of the plural servers 1a to 1d regarding first processing that is earlier in the order of execution and second processing that is later in the order of execution in the processing pair. Next, based on the execution track record 11a, the processing unit 12 decides part of plural inter-adjacent-server communication paths that couple adjacent servers on the communication paths among the plural servers 1a to 1d in the network 1 as data transfer paths 6 and 7 used for data transfer from the first processing to the second processing.

For example, the processing unit 12 decides part of the plural servers 1a to 1d as data transmission destination servers by a statistical method on the execution track record about the first processing or the second processing. Then, the processing unit 12 decides the inter-adjacent-server communication paths between the data transmission destination servers as the data transfer paths 6 and 7. The data transmission destination server is a server having a track record of at least one time of execution of the first processing or the second processing, for example.

In the example of FIG. 1, the processing executed by using the software "App1" has an execution track record in the server 1*a* with a server name "Server A" and the server 1*b* with a server name "Server B." The processing executed by using the software "App2" has an execution track record in the server 1*b* with the server name "Server B" and the server 1*c* with a server name "Server C." The processing executed by using the software "App3" has an execution track record in the server 1*c* with the server name "Server C" and the server 1*d* with a server name "Server D."

In the case of the processing pair between the kinds of processing executed by using the pieces of software "App1" and "App2," the group of servers each having an execution track record of either processing is a server group of the servers 1*a* to 1*c* with the server names "Server A," "Server B," and "Server C." Therefore, the processing unit 12 decides the inter-adjacent-server communication paths that couple adjacent servers in the servers 1*a* to 1*c* as the data transfer paths 6 from the processing executed by using the software "App1" to the processing executed by using "App2."

Furthermore, in the case of the processing pair between the kinds of processing executed by using the pieces of software "App2" and "App3," the group of servers each having an execution track record of either processing is a server group of the servers 1*b* to 1*d* with the server names "Server B," "Server C," and "Server D." Therefore, the processing unit 12 decides the inter-adjacent-server communication paths that couple adjacent servers in the servers 1*b* to 1*d* as the data transfer paths 7 from the processing executed by using the software "App2" to the processing executed by using "App3."

Then, the processing unit 12 instructs the servers at both ends of the data transfer paths 6 and 7 decided regarding each of the processing pairs to carry out data transfer of the execution result of the first processing by the data transfer paths. Due to this, the data transfer is carried out with limitation to appropriate inter-adjacent-server communication paths having a high possibility of being used when a server that executes processing is changed based on the execution track record of each kind of processing in the respective servers 1*a* to 1*d*.

For example, suppose that the first processing by use of the software "App1" is executed in the server 1*a* and the second processing by use of the software "App2" is executed in the server 1*c* and the third processing by use of the software "App3" is executed in the server 1*d*. In this case, the input data 2 transmitted from terminal apparatus 8 is received by the server 1*a*. The server 1*a* executes the processing by use of the software "App1" on the input data 2 and transmits pieces of transfer data 3*a* and 3*b* including the processing result to the adjacent two servers 1*b* and 1*c*, respectively. When receiving the transfer data 3*a*, the server 1*b*, which does not execute the second processing, transmits transfer data 3*c* with the same contents as the transfer data 3*a* to the server 1*c*. The inter-adjacent-server communication path that couples the server 1*b* and the server 1*d* is not the data transfer path corresponding to the processing pair between the kinds of processing executed by using the pieces of software "App1" and "App2." For this reason, transmission of the transfer data with the same contents as the transfer data 3*a* is not carried out from the server 1*b* to the server 1*d*.

When receiving the transfer data 3*b* or the transfer data 3*c*, the server 1*c*, which executes the second processing, executes the processing by use of the software "App2" on the received data. Then, the server 1*c* transmits pieces of transfer data 4*a* and 4*b* including the processing result to the adjacent two servers 1*b* and 1*d*, respectively. When receiving the transfer data 4*a*, the server 1*b*, which does not execute the third processing, transmits transfer data 4*c* with the same contents as the transfer data 4*a* to the server 1*d*. The inter-adjacent-server communication path that couples the server 1*b* and the server 1*a* is not the data transfer path corresponding to the processing pair between the kinds of processing executed by using the pieces of software "App2" and "App3." For this reason, transmission of the transfer data with the same contents as the transfer data 4*a* is not carried out from the server 1*b* to the server 1*a*.

When receiving the transfer data 4*b* or the transfer data 4*c*, the server 1*d*, which executes the third processing, executes the processing by use of the software "App3" on the received data. Then, the server 1*d* transmits output data 5 including the processing result to terminal apparatus 9 specified as the delivery destination of the output data 5 in advance, for example.

As above, the transfer data including the result of the first processing by use of the software "App1" is transferred via only the inter-adjacent-server communication paths to servers having an execution track record of the first processing or the second processing. Similarly, the transfer data including the result of the second processing by use of the software "App2" is transferred via only the inter-adjacent-server communication paths to servers having an execution track record of the second processing or the third processing. By limiting the transfer destination of the transfer data, the amount of data transmitted in the network 1 may be reduced. In addition, to the server having an execution track record of the processing by use of a respective one of pieces of software, data as the target of the processing about which the execution track record exists is steadily sent. For this reason, even when the server that executes the processing is changed, communication coupling processing in a new inter-adjacent-server communication path and processing of last-minute data passing and so forth are unnecessary if the change is a change within servers having an execution track record in the past. As a result, the change in the server that executes the processing may be rapidly made and delay of offering of services offered in the system concerned may be deterred.

It is also possible for the processing unit 12 to decide the data transfer path in such a manner that relayed data is transferred via the inter-adjacent-server communication path with favorable efficiency based on the delay time of communication between servers. For example, the processing unit 12 identifies the server having the highest execution frequency of the first processing among the plural servers 1*a* to 1*d* as the starting point server. Then, the processing unit 12 decides the shortest path with which the delay time of communication is the shortest among the communication paths from the starting point server to a respective one of the other servers and decides the inter-adjacent-server communication path on the shortest path as the data transfer path. This may shorten the time for transfer of transfer data and intend improvement in the efficiency of the processing.

Furthermore, it is also possible for the processing unit 12 to limit the communication direction in which a communication coupling for data communication is established regarding each inter-adjacent-server communication path between adjacent servers. For example, the processing unit 12 determines whether or not a track record of execution of the second processing exists in any one of the servers that may be reached by tracing the shortest path that passes through the data transfer path from the data transfer path to the side remoter from the starting point server. Then, the processing unit 12 instructs the servers at both ends of the data transfer path determined to have a track record of execution of the second processing to establish a communication coupling of bidirectional communication. Furthermore, the processing unit 12 instructs the servers at both ends of the data transfer path determined to have no track record of execution of the second processing to establish a communication coupling of unidirectional communication from the side remoter from the starting point server to the side closer to the starting point server. This may deter establishment of useless communication coupling and reduce the amount of data transfer on the network 1.

Moreover, the processing unit 12 may make execution instructions of processing to the respective servers 1a to 1d and update the execution track record 11a in association with the execution instructions. For example, when receiving server specifying information to specify an execution server that executes a respective one of plural kinds of processing, the processing unit 12 instructs the execution server specified by the server specifying information to execute the corresponding processing. Furthermore, the processing unit 12 updates the execution track record 11a of the corresponding processing in the execution server. This may keep the execution track record 11a at the latest state and enhance the accuracy of decision of the data transfer paths 6 and 7.

Second Embodiment

Next, a second embodiment will be described. Suppose that, in the second embodiment, programs of distributed applications have been installed on all servers included in a distributed system. Furthermore, each server activates the distributed application and makes the state in which processing by the distributed application on input data may be executed based on an instruction from a center server. The server that has entered the state in which the processing by the distributed application on the input data may be executed is not different from the situation in which the distributed application has been newly deployed (installation and execution of a program) in appearance. Therefore, in the following description, causing a server to execute a distributed application and making the state in which processing by the distributed application on input data may be executed will be often referred to as deploying the distributed application in the server.

Figure 2:
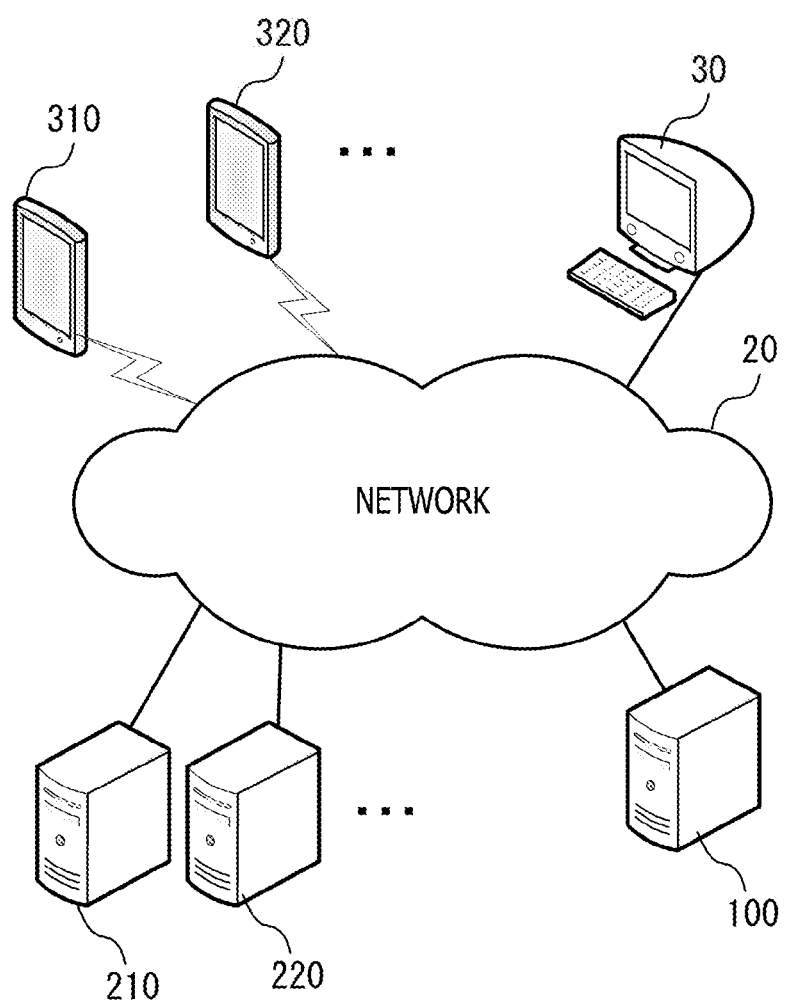
FIG. 2 is a diagram illustrating one example of a distributed system of a second embodiment.

FIG. 2 is a diagram illustrating one example of a distributed system of a second embodiment. In the distributed system, to a network 20, plural servers 210, 220, . . . , plural pieces of terminal apparatus 310, 320, . . . , a center server 100, and management apparatus 30 are coupled.

The plural servers 210, 220, . . . are computers that execute distributed applications. The center server 100 is a computer that manages deployment of the distributed applications in the plural servers 210, 220, . . . and communication coupling among the plural servers 210, 220, . . . . It is also possible to cause the center server 100 to execute the distributed application. The pieces of terminal apparatus 310, 320, . . . are computers that transmit data of a processing target or receive a processing result. The pieces of terminal apparatus 310, 320, . . . are coupled to the network 20 through a radio communication network, for example. The management apparatus 30 is a computer that specifies the deployment destinations of the distributed applications and specifies the order of execution of the distributed applications.

Figure 3:
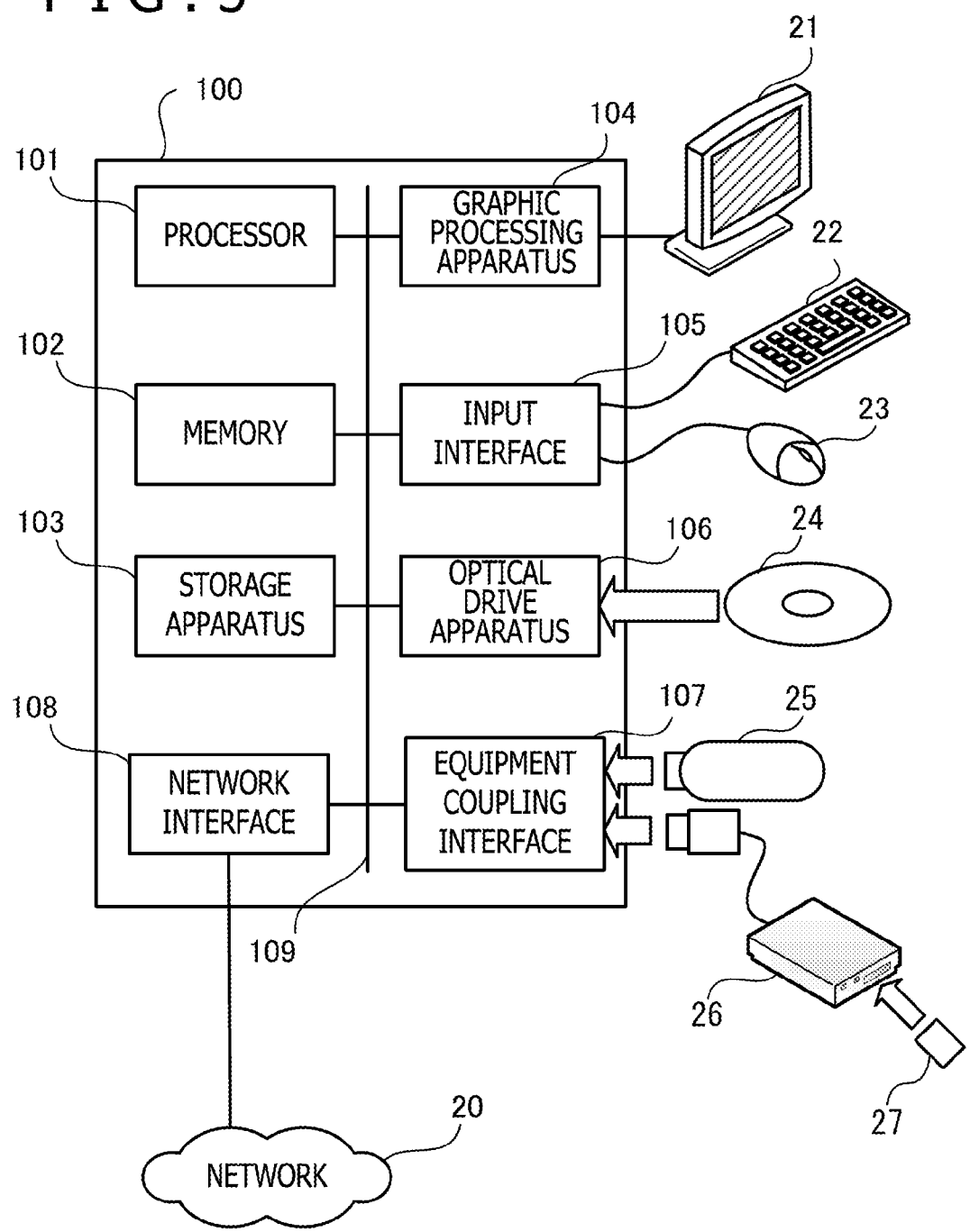
FIG. 3 is a diagram illustrating one example of hardware of a center server used for the second embodiment.

FIG. 3 is a diagram illustrating one example of hardware of a center server used for the second embodiment. The whole apparatus of the center server 100 is controlled by a processor 101. A memory 102 and plural pieces of peripheral equipment are coupled to the processor 101 through a bus 109. The processor 101 may be a multiprocessor. The processor 101 is a central processing unit (CPU), a micro processing unit (MPU), or a digital signal processor (DSP), for example. At least part of functions implemented through execution of a program by the processor 101 may be implemented by an electronic circuit such as an application specific integrated circuit (ASIC) or a programmable logic device (PLD).

The memory 102 is used as main storing apparatus of the center server 100. In the memory 102, at least part of a program of an operating system (OS) the processor 101 is caused to execute or an application program is temporarily stored. Furthermore, various kinds of data for processing by the processor 101 are stored in the memory 102. As the memory 102, volatile semiconductor storing apparatus such as a random access memory (RAM) is used.

As the pieces of peripheral equipment coupled to the bus 109, storage apparatus 103, graphic processing apparatus 104, an input interface 105, optical drive apparatus 106, an equipment coupling interface 107, and a network interface 108 exist.

The storage apparatus 103 writes and reads data to and from a built-in recording medium electrically or magnetically. The storage apparatus 103 is used as auxiliary storing apparatus of the computer. The program of the OS, application programs, and various kinds of data are stored in the storage apparatus 103. As the storage apparatus 103, hard disk drive (HDD) and solid state drive (SSD) may be used, for example.

A monitor 21 is coupled to the graphic processing apparatus 104. The graphic processing apparatus 104 causes an image to be displayed on the screen of the monitor 21 in accordance with a command from the processor 101. As the monitor 21, display apparatus using a cathode ray tube (CRT), liquid crystal display apparatus, and so forth exist.

A keyboard 22 and a mouse 23 are coupled to the input interface 105. The input interface 105 transmits signals sent from the keyboard 22 and the mouse 23 to the processor 101. The mouse 23 is one example of a pointing device and it is also possible to use other pointing devices. As other pointing devices, touch panel, tablet, touchpad, trackball, and so forth exist.

The optical drive apparatus 106 reads data recorded on an optical disc 24 by using laser light or the like. The optical disc 24 is a portable recording medium on which data is recorded in such a manner as to be readable by reflection of light. As the optical disc 24, digital versatile disc (DVD), DVD-RAM, compact disc read-only memory (CD-ROM), compact disc-recordable/rewritable (CD-R/RW), and so forth exist.

The equipment coupling interface 107 is a communication interface for coupling pieces of peripheral equipment to the center server 100. Memory apparatus 25 and a memory reader-writer 26 may be coupled to the equipment coupling interface 107, for example. The memory apparatus 25 is a recording medium equipped with a function of communication with the equipment coupling interface 107. The memory reader-writer 26 is apparatus that writes data to a memory card 27 or reads out data from the memory card 27. The memory card 27 is a card-type recording medium.

The network interface 108 is coupled to the network 20. The network interface 108 carries out transmission and reception of data with other computers or pieces of communication equipment through the network 20.

The center server 100 may implement the processing functions of the second embodiment by the hardware configuration described above. The servers 210, 220, . . . , the pieces of terminal apparatus 310, 320, . . . , and the management apparatus 30 may also be implemented by the similar hardware as the center server 100. Furthermore, the communication path management apparatus 10 represented in the first embodiment may also be implemented by the similar hardware as the center server 100 illustrated in FIG. 3.

The center server 100 and the servers 210, 220, . . . implement the processing functions of the second embodiment by executing a program recorded on a computer-readable recording medium, for example. The program in which the contents of processing to be executed by the center server 100 or the server 210, 220, . . . may be recorded in various recording media. For example, the program to be executed by the center server 100 or the server 210, 220, . . . may be stored in the storage apparatus 103. The processor 101 loads at least part of the program in the storage apparatus 103 into the memory 102 and executes the program. Furthermore, it is also possible to record the program to be executed by the center server 100 or the server 210, 220, . . . on a portable recording medium such as the optical disc 24, the memory apparatus 25, or the memory card 27. The program stored in the portable recording medium becomes executable after being installed on the storage apparatus 103 based on control from the processor 101, for example. Moreover, it is also possible for the processor 101 to directly read out the program from the portable recording medium and execute the program.

In such a distributed system, distributed processing on sensor data collected from any terminal apparatus is executed, for example. Then, the processing result is transmitted to terminal apparatus registered in advance as the delivery destination of the processing result.

Figure 4:
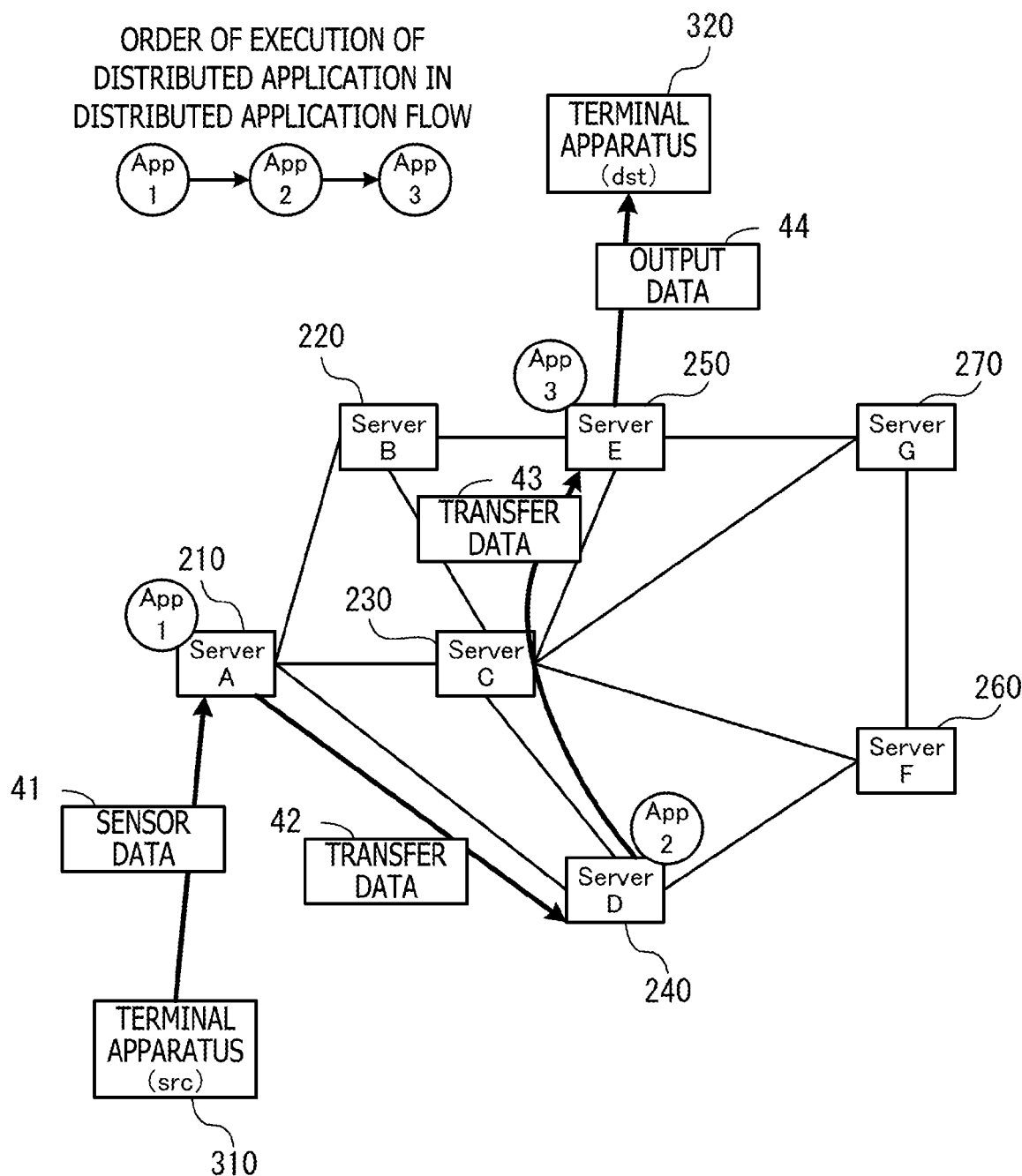
FIG. 4 is a diagram illustrating one example of distributed processing of a service.

FIG. 4 is a diagram illustrating one example of distributed processing of a service. The service to be subjected to the distributed processing is carried out by plural distributed applications. The distributed application is software in which the procedure of one kind of processing is described in a distributed application flow that defines a series of processing of the service. The distributed application has only the application identifier (ID) of this distributed application and does not have information relating to the server in which this distributed application is executed and the application ID of the distributed application executed next/ the server that executes the distributed application. Furthermore, there is a possibility that one or more distributed applications are deployed in one server.

In the example of FIG. 4, seven servers 210, 220, 230, 240, 250, 260, and 270 are set in a distributed system. The server name of the server 210 is "Server A." The server name of the server 220 is "Server B." The server name of the server 230 is "Server C." The server name of the server 240 is "Server D." The server name of the server 250 is "Server E." The server name of the server 260 is "Server F." The server name of the server 270 is "Server G."

In the second embodiment, the service is offered by executing processing based on the respective distributed applications on collected sensor data 41 in order of distributed application "App1," distributed application "App2," and distributed application "App3." In the example of FIG. 4, the distributed application "App1" is deployed in the server 210. The distributed application "App2" is deployed in the server 240. The distributed application "App3" is deployed in the server 250.

In this case, the sensor data 41 detected by the terminal apparatus 310 is transmitted from the terminal apparatus 310 to the server 210, for example. The server 210 executes processing on the sensor data 41 by using the distributed application "App1" and transmits the processing result to the server 240 as transfer data 42. The server 240 executes processing on the transfer data 42 by using the distributed application "App2" and transmits the processing result to the server 250 as transfer data 43. The server 250 executes processing on the transfer data 43 by using the distributed application "App3" and transmits the processing result as output data 44 to the terminal apparatus 320 specified as the delivery destination in advance.

In operation of such a distributed system, the server as the deployment destination of the distributed application is often changed. For example, the server of the deployment destination of the distributed application is changed when the processing load of the server in which the distributed application is deployed is excessively high, or when scale-out of a server is carried out and a new server is added, or the like. Furthermore, for maintenance of a server, the distributed application deployed in the server is moved to another server in some cases.

When the server of the deployment destination of a specific distributed application is changed, communication coupling processing is executed if a communication coupling between the server in which the distributed application is newly deployed and a server in which another distributed application is deployed has not been carried out. The communication coupling processing refers to processing of establishing coupling and session between the servers. If the communication coupling processing intervenes when the server of the deployment destination of the distributed application is changed, data transfer delay occurs during the communication coupling processing. Therefore, it is conceivable that communication coupling is carried out in advance also regarding communication paths other than the communication paths between the servers in which the distributed applications are currently deployed (backup paths) in addition to the communication paths between the servers in which the distributed applications are currently deployed.

For example, if communication coupling is carried out between all adjacent servers, the communication coupling processing does not have to be executed in the movement of a distributed application whichever server the distributed application moves to. However, in the distributed system, transfer data as the execution result of the distributed application that is previous in the order of processing is transmitted to not only the server in which the distributed application that is subsequent in the order of processing is deployed but also all servers with which communication is possible. Among the servers that have received transfer data, only the server in which the distributed application that is subsequent in the order of execution is deployed executes processing by the deployed distributed application on the received transfer data. As above, in the distributed system, data continues to flow also to the servers in which the distributed application is not deployed as long as communication coupling is carried out. For this reason, if communication coupling between all adjacent servers is carried out, unnecessary traffic is generated in the servers on the backup paths and the network. Such increase in the traffic becomes a cause of the lowering of the processing efficiency as the whole system.

Therefore, in the second embodiment, the center server 100 carries out control in such a manner that the preliminary communication coupling is not carried out for the server having almost no possibility of deployment of the distributed application. For example, a controller included in the center server 100 decides the server for which the communication coupling is carried out based on the past tendency of distributed application deployment.

Figure 5:
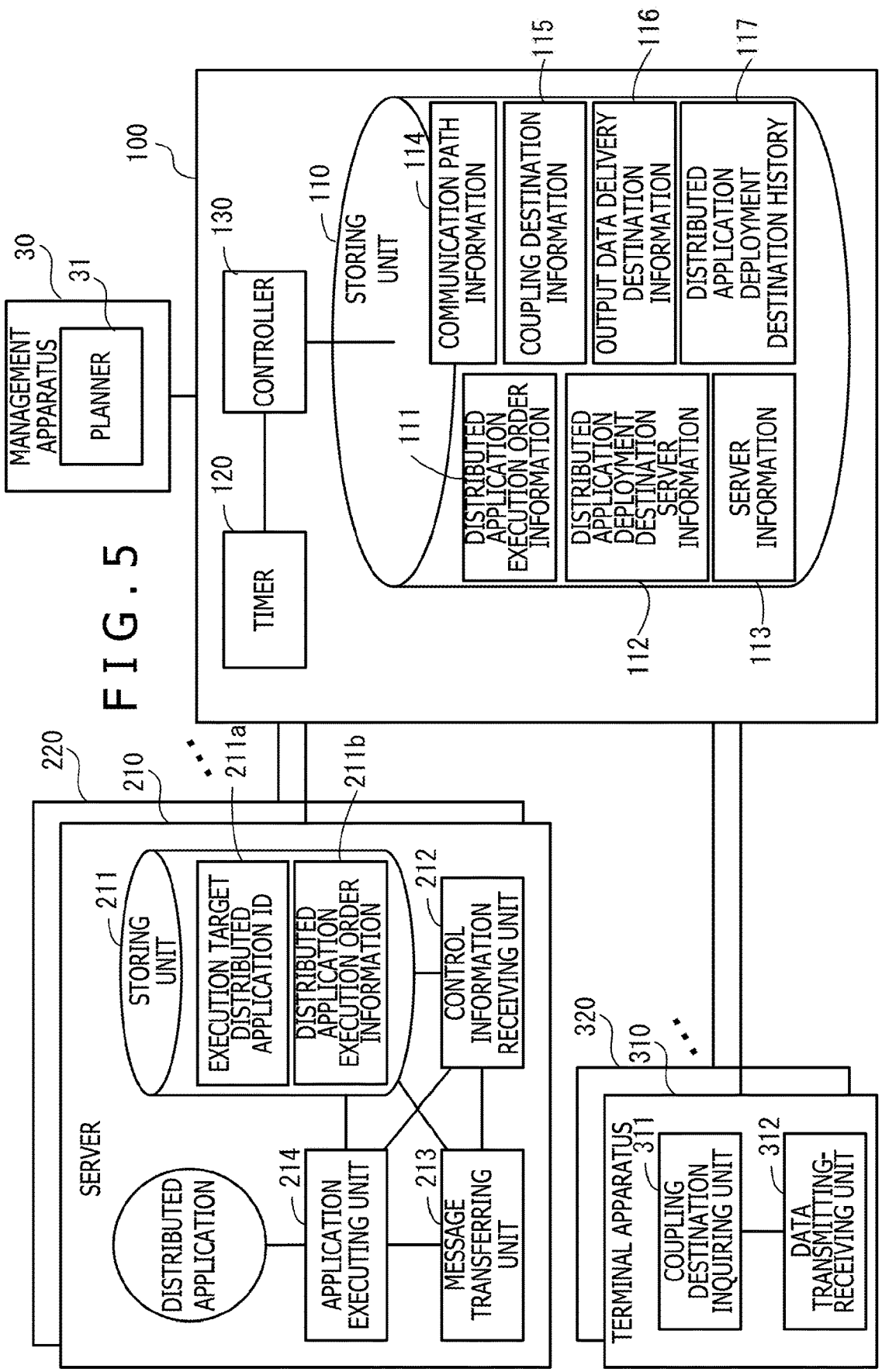
FIG. 5 is a block diagram illustrating one example of functions of respective pieces of apparatus.

Functions the respective pieces of apparatus has for setting appropriate backup paths and executing distributed processing will be described below. FIG. 5 is a block diagram illustrating one example of functions of respective pieces of apparatus. The management apparatus 30 includes a planner 31. The planner 31 decides the servers of appropriate deployment destinations of distributed applications according to the operation situation of the distributed system. For example, the planner 31 decides the servers of the deployment destinations of the respective distributed applications in such a manner that the amount of traffic transmitted to the respective servers is minimized. Furthermore, the planner 31 decides the servers of the deployment destinations of the respective distributed applications in such a manner that processing delay or transfer delay of a service is minimized. The decision of the deployment destinations of the distributed applications is carried out by being triggered by an excess of the CPU load of any server over a threshold or an excess of the amount of traffic of any communication path over a threshold, for example. After deciding the deployment destinations of the distributed applications, the planner 31 transmits distributed application execution order information 111 and distributed application deployment destination server information 112 to the center server 100.

The center server 100 includes a storing unit 110, a timer 120, and a controller 130.

The storing unit 110 stores information used for control of the distributed system. In the storing unit 110, the distributed application execution order information 111, the distributed application deployment destination server information 112, server information 113, communication path information 114, coupling destination information 115, output data delivery destination information 116, and a distributed application deployment destination history 117 are stored, for example. The distributed application execution order information 111 is information that represents the order of execution of distributed applications. The distributed application deployment destination server information 112 is information that represents the server of the deployment destination of each distributed application. The server information 113 is information that represents the servers that operate in the distributed system. The communication path information 114 is information that represents communication paths used for communication of transfer data between the distributed applications. The coupling destination information 115 is information that represents the servers that serve as coupling destinations from terminal apparatus. The output data delivery destination information 116 is information that represents the terminal apparatus that serves as the delivery destination of output data that is the result of a series of processing by the plural distributed applications. The distributed application deployment destination history 117 is information that represents the number of times the server became the deployment destination of the distributed application in the past on each server basis.

When the clock time becomes the execution start clock time of communication path decision processing set in advance, the timer 120 instructs the controller 130 to start decision processing of the communication path.

The controller 130 controls deployment of distributed applications in servers and setting of the communication path for communication of transfer data between the distributed applications. For example, the controller 130 receives the distributed application execution order information 111 and the distributed application deployment destination server information 112 from the planner 31. Then, the controller 130 instructs the servers that serve as the deployment destinations of the distributed applications to execute the distributed applications based on the distributed application deployment destination server information 112. For example, the controller 130 transmits execution application control information including the application ID of a distributed application to the server of the deployment destination of the distributed application.

Furthermore, the controller 130 notifies the order of execution of the distributed applications represented in the received distributed application execution order information 111 to the servers that serve as the deployment destinations of the distributed applications. The order of execution notified to each server is information about a part relating to the distributed application deployed in the server. For example, the controller 130 transmits, to the server of the deployment destination of a distributed application, control information including the application ID of the distributed application executed by the server and the application ID of the distributed application with which processing is executed subsequently to the distributed application. Moreover, the controller 130 decides the inter-adjacent-server communication paths to be coupled based on the distributed application deployment destination history 117. Then, the controller 130 makes an instruction to couple the decided inter-adjacent-server communication paths by transmitting transfer destination control information to the servers at both ends of the inter-adjacent-server communication paths. Furthermore, when receiving an instruction to start the decision processing of the communication path from the timer 120, the controller 130 decides the inter-adjacent-server communication paths to be coupled. Then, the controller 130 transmits transfer destination control information to the servers at both ends of the inter-adjacent-server communication paths to thereby instruct the servers to couple the decided inter-adjacent-server communication paths.

The server 210 includes a storing unit 211, a control information receiving unit 212, a message transferring unit 213, and an application executing unit 214.

The storing unit 211 stores information used for distributed processing. For example, the storing unit 211 stores an execution target distributed application ID 211a and distributed application execution order information 211b. The execution target distributed application ID 211a is the identifier (application ID) of the distributed application to be executed by the server 210. The distributed application execution order information 211b is the identifier (application ID) of the distributed application to be executed subsequently to the distributed application to be executed by the server 210.

The control information receiving unit 212 receives control information transmitted by the center server 100. The control information receiving unit 212 transfers the received control information to the message transferring unit 213.

Based on the control information, the message transferring unit 213 transmits transfer destination control information to the servers at both ends of the inter-adjacent-server communication path of each distributed application to thereby establish a session with the message transferring unit in the server of the coupling destination specified as the inter-adjacent-server communication path. At the timing when both the data transmitting side and receiving side between the message transferring units have specified the same distributed application ID and established a session, message transfer by the session becomes possible.

When receiving sensor data from terminal apparatus, the message transferring unit 213 transfers the sensor data to the application executing unit 214. When receiving transfer data from another server, the message transferring unit 213 transfers the transfer data to the application executing unit 214 if the distributed application that has the application ID given to the transfer data and is executed next is the distributed application deployed in the server 210. When receiving the processing result of the distributed application from the application executing unit 214, the message transferring unit 213 transmits transfer data including the processing result to the inter-adjacent-server communication path coupled in association with the distributed application executed next.

The application executing unit 214 executes the distributed application decided to be deployed into the server 210. When receiving data to be processed by the distributed application being executed, the application executing unit 214 employs the data as input and executes the distributed application. Then, the application executing unit 214 transmits, to the message transferring unit 213, transfer data obtained by giving the application ID of the distributed application that executes processing next to the processing result based on the distributed application. If the distributed application deployed in the server 210 is the distributed application executed last in the distributed application flow, the application executing unit 214 transmits the processing result based on the distributed application to the message transferring unit 213 as output data.

Although functions of the server 210 are represented in FIG. 5, the other servers 220, . . . also have the similar functions as the server 210.

The terminal apparatus 310 includes a coupling destination inquiring unit 311 and a data transmitting-receiving unit 312. The coupling destination inquiring unit 311 transmits a coupling destination inquiry including an operation request to the center server 100. As the operation request, there are a request for data registration and a request for start or stop of data subscription. If a coupling destination inquiry including the operation request for data registration is made, the identifier of the server of the transmission destination of sensor data is returned as a response from the center server 100. The coupling destination inquiring unit 311 transmits, to the data transmitting-receiving unit 312, the identifier of the server of the transmission destination of sensor data notified from the center server 100.

The data transmitting-receiving unit 312 transmits sensor data detected by equipment included in the terminal apparatus 310 to the server notified as the coupling destination. Furthermore, if an operation request for start of data subscription has been transmitted, the data transmitting-receiving unit 312 receives output data transmitted from the server in which the distributed application for executing the last processing is deployed.

Functions of each element illustrated in FIG. 5 may be implemented by causing a computer to execute a program module corresponding to the element, for example.

Next, information stored in the storing units of the respective pieces of apparatus will be, for example, described.

Figure 6:
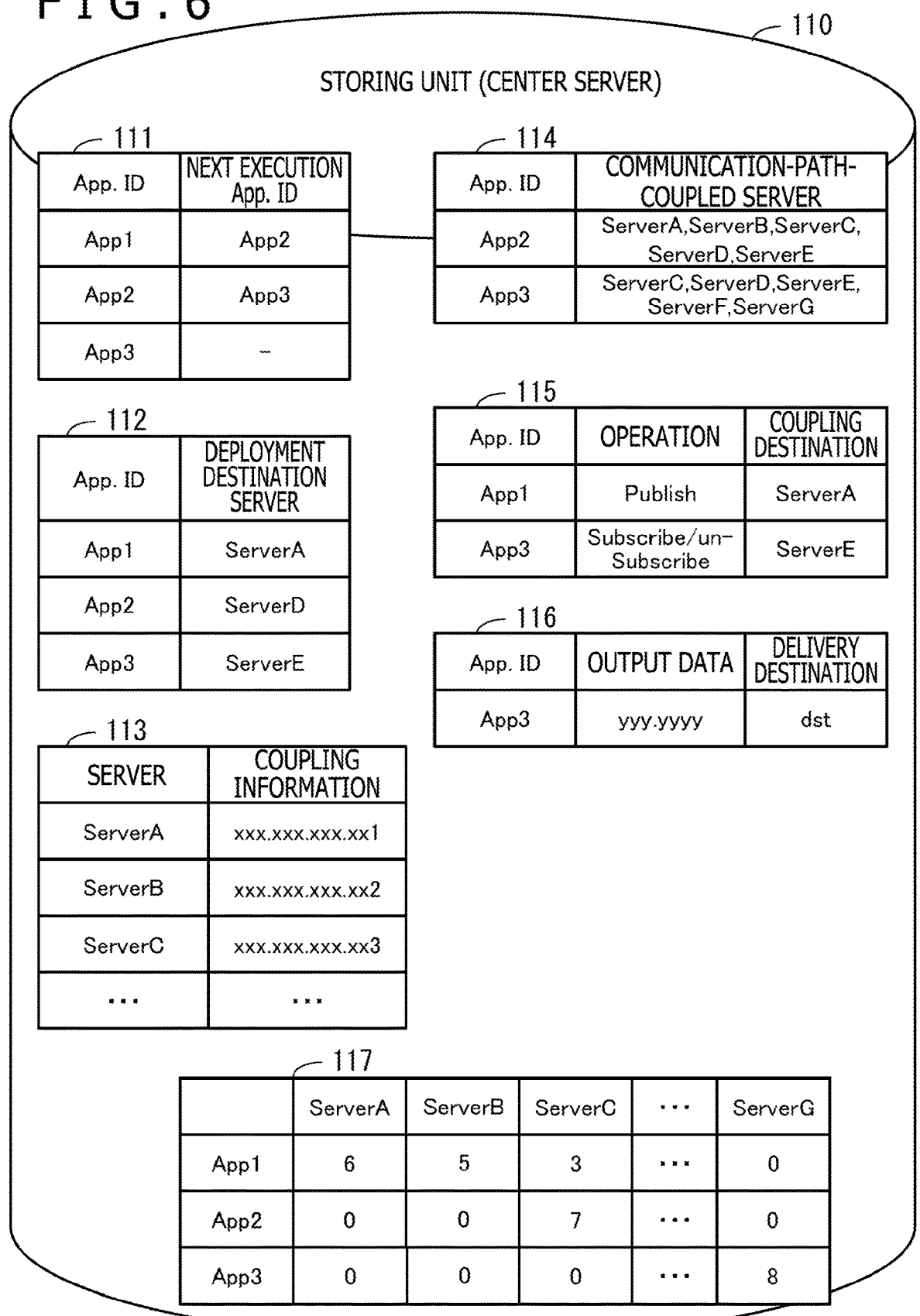
FIG. 6 is a diagram illustrating one example of information stored in a storing unit of a center server.

FIG. 6 is a diagram illustrating one example of information stored in a storing unit of a center server. In the distributed application execution order information 111, in association with the application ID (App. ID) of the distributed application, the application ID (next execution App. ID) of the distributed application executed subsequently to the distributed application in the distributed application flow is set. The distributed application about which the next execution App. ID is not set ("App3" in FIG. 6) is the distributed application executed last in the distributed application flow. The order of execution of the distributed applications may be understood based on the pairs of "App. ID" and "next execution App. ID" represented in the distributed application execution order information 111. In the example of FIG. 6, it is indicated that the distributed applications are executed in order of "App1," "App2," and "App3."

In the distributed application deployment destination server information 112, in association with the application ID (App. ID) of the distributed application, the server name of the server of the deployment destination of the distributed application is set.

In the server information 113, in association with the server name of each server included in the distributed system, information for a coupling to the server (for example, internet protocol (IP) address) is set.

In the communication path information 114, in association with the application ID (App. ID) of the distributed application, the server name of one or more servers as the coupling target of the inter-adjacent-server communication path for communication of transfer data addressed to the distributed application is set.

In the coupling destination information 115, in association with the application ID (App. ID) of the first and last distributed applications in the distributed application flow, operation carried out in the distributed application and the server name of the server of the coupling destination of terminal apparatus that requests the operation are set. The server of the coupling destination refers to the server in which the corresponding distributed application is deployed. For example, for the operation request for data registration ("Publish"), the server in which the leading distributed application of the distributed application flow ("App1," in the example of FIG. 6) is deployed (Server A) is specified as the coupling destination. Furthermore, for the operation request for start or stop of data subscription (Subscribe/unSubscribe), the server in which the last distributed application of the distributed application flow ("App3," in the example of FIG. 6) is deployed (Server E) is specified as the coupling destination.

In the output data delivery destination information 116, in association with the application ID (App. ID) of the last distributed application in the distributed application flow, the output data and the delivery destination are set. The delivery destination is specified based on the apparatus name of terminal apparatus ("dst," in the example of FIG. 6).

In the distributed application deployment destination history 117, the numbers of times of deployment of the respective distributed applications regarding each server are represented. In the distributed application deployment destination history 117, when new deployment or redeployment of a distributed application is carried out, 1 is added to the numerical value corresponding to the set of the deployed distributed application and the server of the deployment destination.

Figure 7:
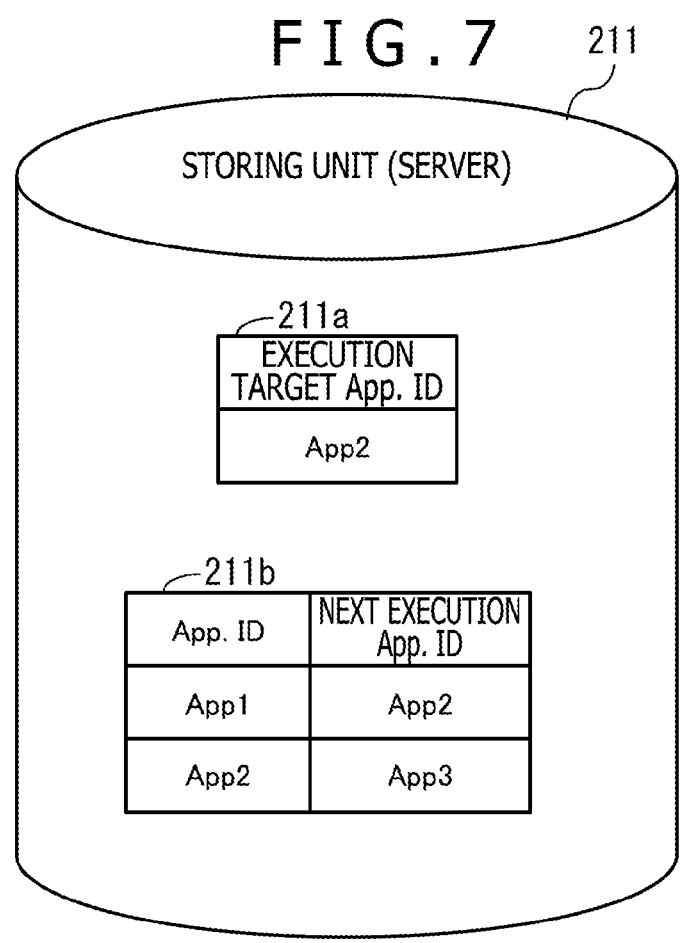
FIG. 7 is a diagram illustrating one example of information stored in a storing unit of a server.

FIG. 7 is a diagram illustrating one example of information stored in a storing unit of a server. In FIG. 7, an example of the storing unit 211 of the server 210 is illustrated. The execution target distributed application ID 211a is the application ID of the distributed application that is decided to be deployed in the server 210 and is the target of execution by the server 210. In the distributed application execution order information 211b, the order of execution of distributed applications in a part relating to the distributed application deployed in the server 210 in the distributed application flow is represented.

When a service is started in the above-described distributed system, the order of execution of distributed applications and the deployment destinations of the distributed applications are specified in the planner 31 in the management apparatus 30.

Figure 8:
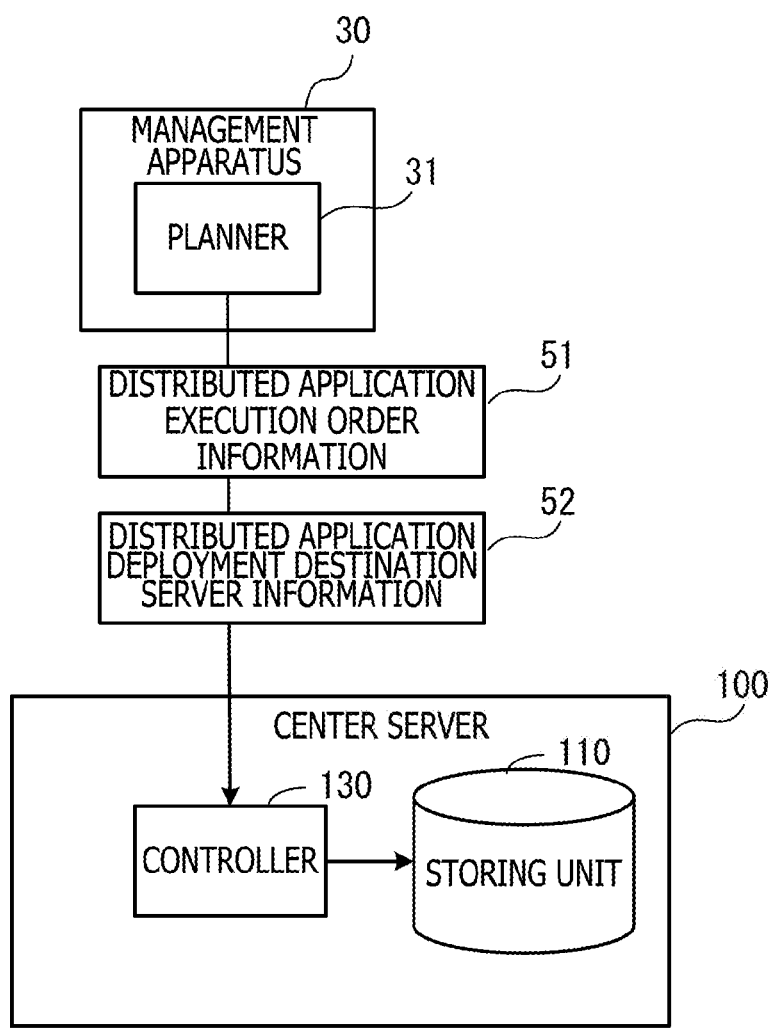
FIG. 8 is a diagram illustrating a specifying situation of an order of execution of distributed applications and deployment destinations.

FIG. 8 is a diagram illustrating a specifying situation of an order of execution of distributed applications and deployment destinations. The planner 31 in the management apparatus 30 transmits distributed application execution order information 51 and distributed application deployment destination server information 52 to the center server 100. The contents of the distributed application execution order information 51 are similar to the distributed application execution order information 111 represented in FIG. 6. The contents of the distributed application deployment destination server information 52 are similar to the distributed application deployment destination server information 112 represented in FIG. 6.

In the center server 100, the controller 130 receives the distributed application execution order information 51 and the distributed application deployment destination server information 52. The controller 130 stores the received distributed application execution order information 51 and distributed application deployment destination server information 52 in the storing unit 110.

Furthermore, the controller 130 transmits the distributed application execution order information 51 to the servers of the deployment destinations of the distributed applications. At this time, the controller 130 may extract a part having a relation to the distributed application deployed in the server from the distributed application execution order information 51 and transmit only information on the extracted part to the server.

Next, the controller 130 decides the inter-adjacent-server communication paths in which a communication coupling between servers is carried out based on the distributed application deployment destination history 117. For example, the controller 130 identifies a server in which a distributed application has been deployed in the past as a deployment candidate server of the distributed application. Then, the controller 130 decides the inter-adjacent-server communication paths in which communication coupling is carried out based on a list of the deployment candidate servers of each distributed application.

Figure 9:
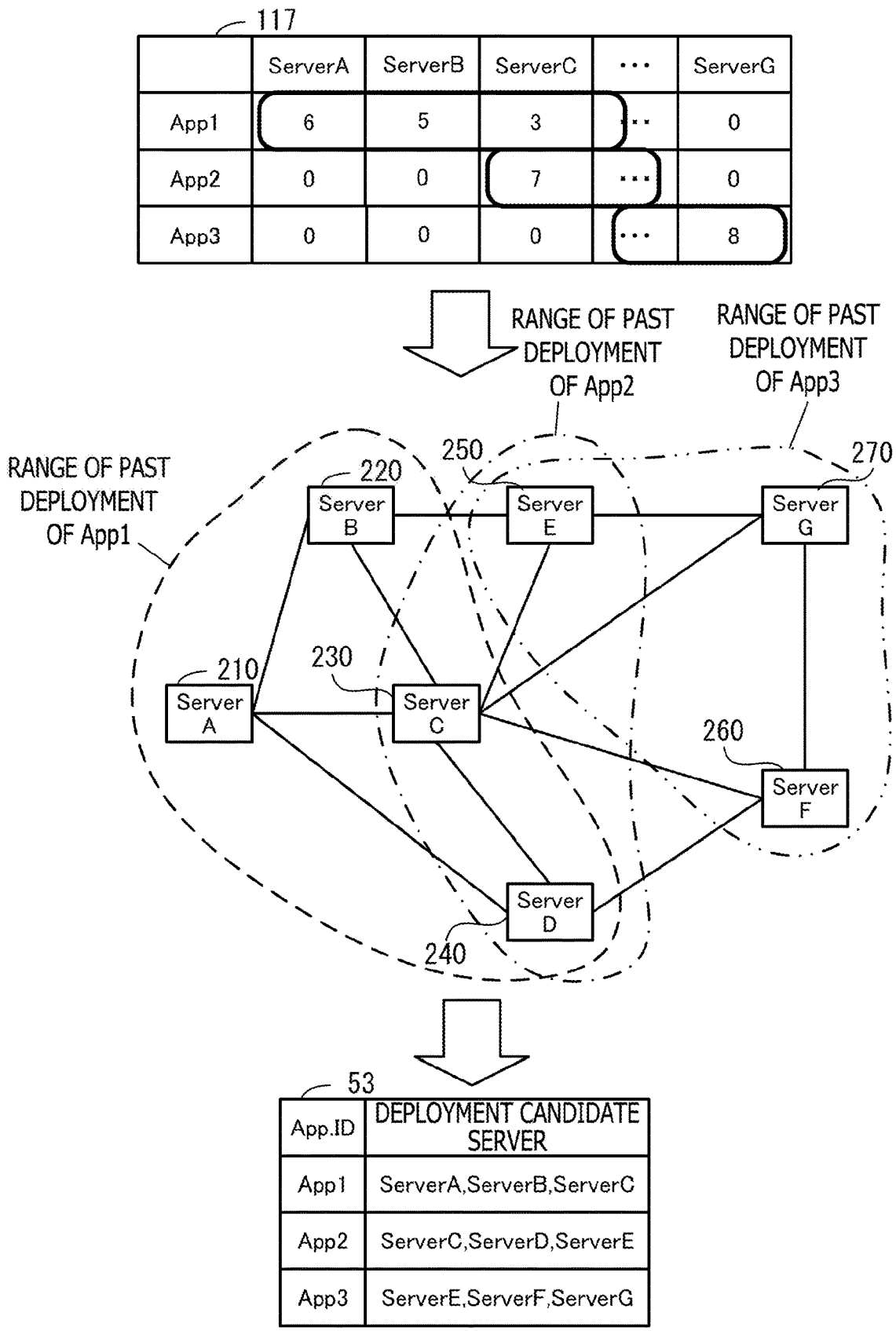
FIG. 9 is a diagram illustrating an identification example of distributed application deployment destination servers.

FIG. 9 is a diagram illustrating an identification example of distributed application deployment destination servers. In the distributed application deployment destination history 117, which servers each of applications including distributed application "App1," distributed application "App2," and distributed application "App3" has been deployed individually in the past are represented.

For example, suppose that it is indicated that the distributed application "App1" has been deployed one or more times in each of servers including "Server A," "Server B," "Server C," and "Server D" in the past. In this case, the controller 130 identifies "Server A," "Server B," "Server C," and "Server D" as the deployment destination candidate servers of the distributed application "App1." Similarly, suppose that it is indicated that the distributed application "App2" has been deployed one or more times in each of servers including "Server C," "Server D," and "Server E" in the past. In this case, the controller 130 identifies "Server C," "Server D," and "Server E" as the deployment destination candidate servers of the distributed application "App2." Suppose that it is indicated that the distributed application "App3" has been deployed one or more times in each of servers including "Server E," "Server F," and "Server G" in the past. In this case, the controller 130 identifies "Server E," "Server F," and "Server G" as the deployment destination candidate servers of the distributed application "App3."

The controller 130 may decide N (N is an integer equal to or larger than 1) servers from the server having the largest number of times of deployment among the servers in which a distributed application has been deployed in the past as the deployment destination candidate servers of the distributed application. Furthermore, the controller 130 may decide a server group that satisfies a confidence coefficient (place of deployment is selected at a certain probability) in the servers in which a distributed application has been deployed in the past as the deployment destination candidate servers of the distributed application. Moreover, the controller 130 may carry out clustering of the servers in which a distributed application has been deployed in the past and servers near the servers (for example, adjacent servers) and identify the server group arising from the clustering as the deployment destination candidate servers of the distributed application. In this case, servers in which the distributed application has not been deployed in the past are also included in the deployment destination candidate servers of the distributed application.

By analyzing the history of the past deployment of the distributed application by various statistical methods as above, the deployment destination candidate servers having a high possibility of deployment of the distributed application may be decided. The deployment destination candidate servers of the distributed application may be decided by using a statistical method other than the above-described methods (for example, method of machine learning).

The controller 130 generates distributed application deployment destination candidate information 53 that represents the deployment destination candidate servers of each distributed application. The controller 130 temporarily stores the generated distributed application deployment destination candidate information 53 in the memory 102. Then, the controller 130 decides the inter-adjacent-server communication paths in which communication coupling is carried out based on the distributed application execution order information 111 and the distributed application deployment destination candidate information 53.

Figure 10:
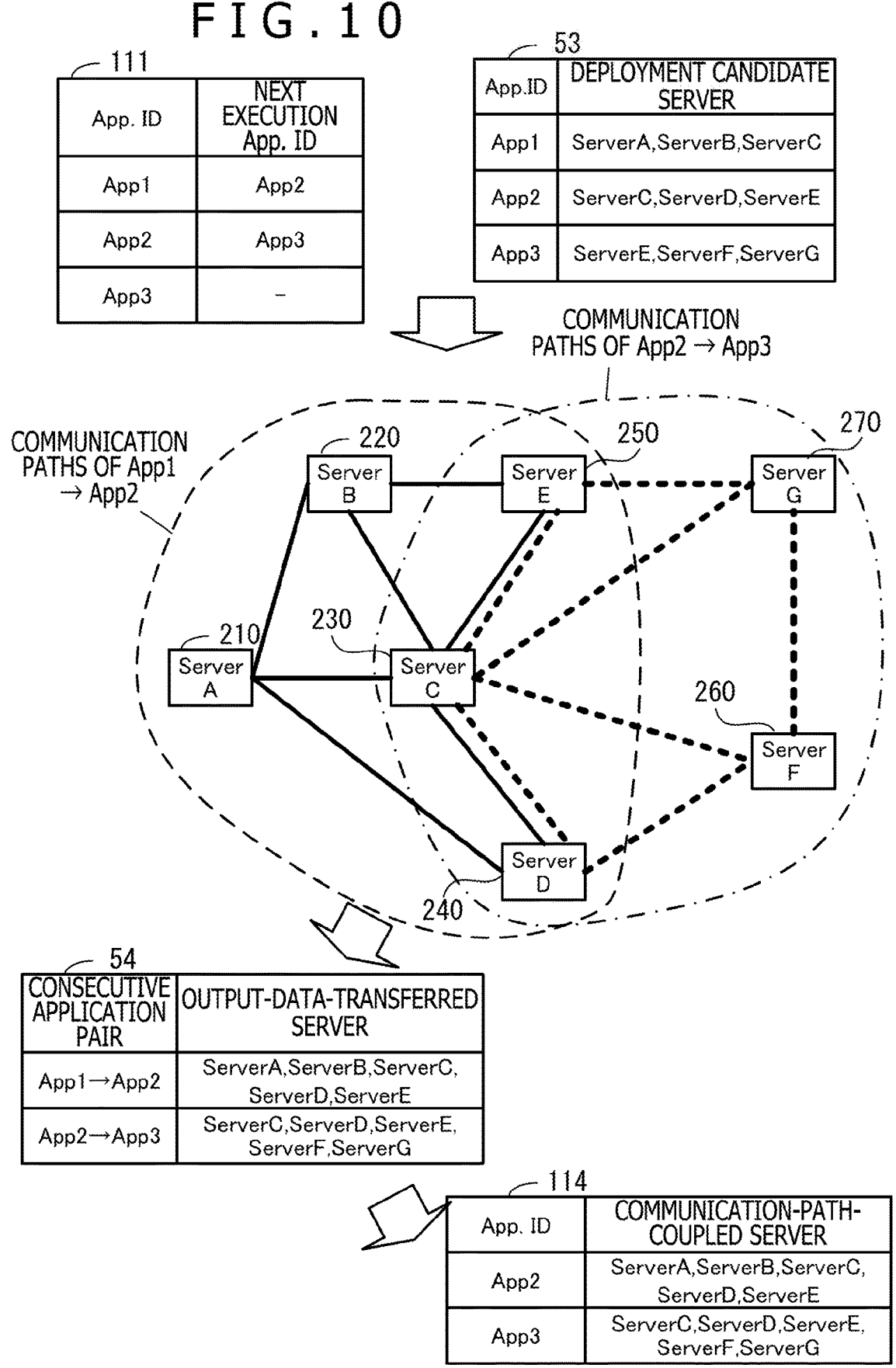
FIG. 10 is a diagram illustrating a decision example of inter-adjacent-server communication paths.

FIG. 10 is a diagram illustrating a decision example of inter-adjacent-server communication paths. For example, the controller 130 generates a pair of distributed applications that are consecutive in the order of execution of distributed applications (consecutive application pair). In the example of FIG. 10, a consecutive application pair between the distributed application "App1" and the distributed application "App2" and a consecutive application pair between the distributed application "App2" and the distributed application "App3" are generated. For each of the generated consecutive application pairs, the controller 130 decides inter-adjacent-server communication paths coupled for transfer of transfer data from the distributed application that is earlier in the order of execution in the two distributed applications belonging to the consecutive application pair to the distributed application that is later in the order of execution.

For example, the controller 130 integrates, regarding each consecutive application pair, the deployment destination candidates of the distributed applications belonging to the consecutive application pair to generate distributed application output data transfer destination information 54. In the distributed application output data transfer destination information 54, a collection of servers to which output data of the distributed application is transferred is set in association with the consecutive application pair.

Regarding each consecutive application pair, the controller 130 decides all servers set as the output-data-transferred server in the distributed application output data transfer destination information 54 as communication-path-coupled servers for the distributed application of the transmission destination in the consecutive application pair. Then, the controller 130 generates communication path information 114 in which the communication-path-coupled servers of each consecutive application pair are set. In the communication path information 114 represented in FIG. 10, the communication-path-coupled servers of the consecutive application pair are set in association with the application ID of the distributed application of the transmission destination in the consecutive application pair.

The controller 130 generates transfer destination control information to be transmitted to each server based on the communication path information 114. When the controller 130 transmits the transfer destination control information to each server, processing of communication coupling with the servers represented in the transfer destination control information is executed in each server.

Figure 11:
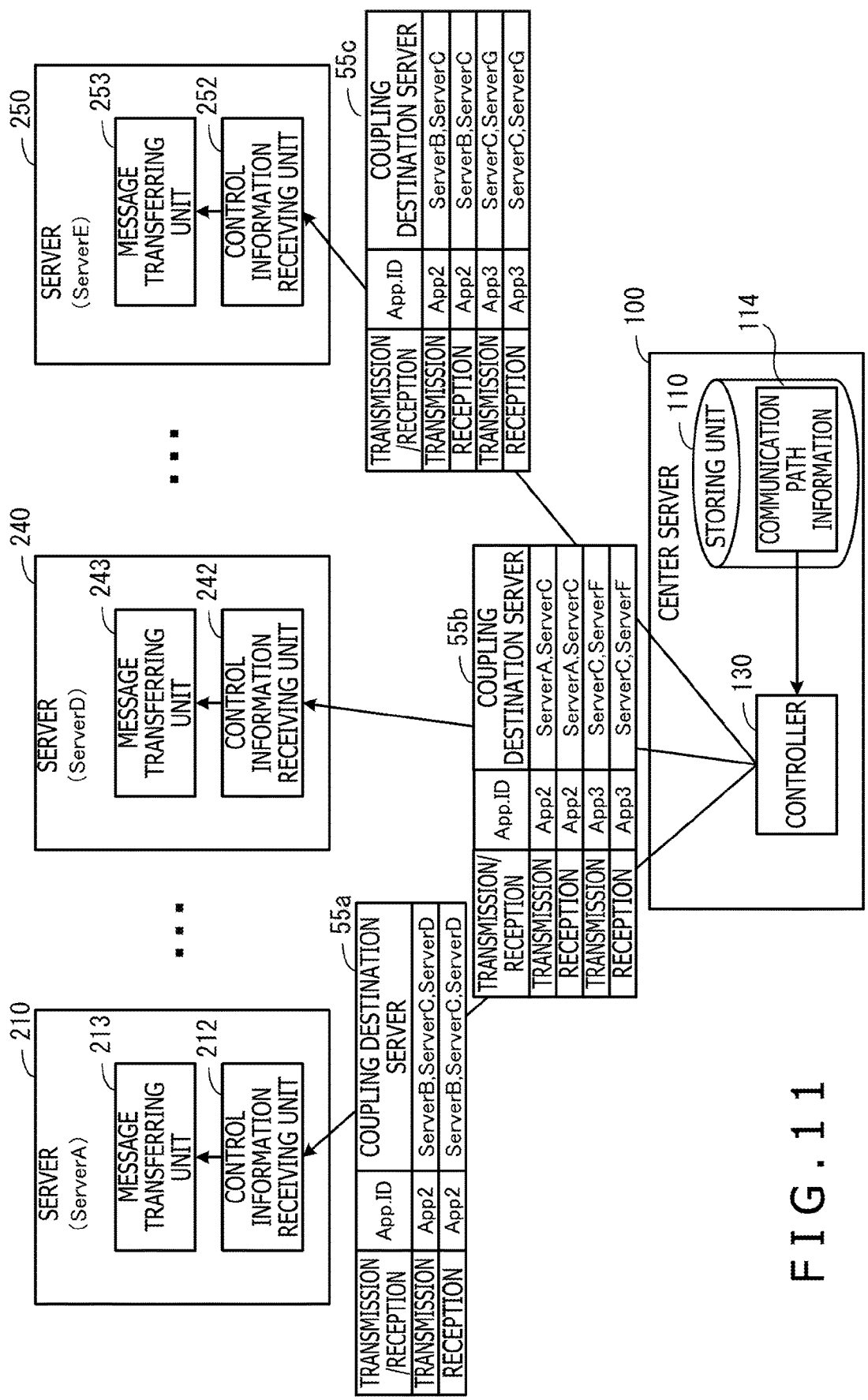
FIG. 11 is a diagram illustrating one example of transfer destination control information.

FIG. 11 is a diagram illustrating one example of transfer destination control information. In the example of FIG. 11, pieces of transfer destination control information 55a, 55b, and 55c transmitted to the servers 210, 240, and 250, respectively, are represented. The transfer destination control information is transmitted also to the servers other than the servers 210, 240, and 250 although not represented in FIG. 11.

In the pieces of transfer destination control information 55a to 55c, one or more servers as the coupling destination (coupling destination server) are set in association with the set of specifying of transmission or reception (transmission/reception) and the application ID (App. ID) of the distributed application of the transmission destination of transfer data. The control information receiving units 212, 242, and 252 of the servers 210, 240, and 250 that have received the pieces of transfer destination control information 55a to 55c transfer the pieces of transfer destination control information 55a to 55c to the message transferring units 213, 243, and 253. The message transferring units 213, 243, and 253 carry out communication coupling with the coupling destination servers specified by the pieces of transfer destination control information 55a to 55c. In the second embodiment, the message transferring units 213, 243, and 253 carry out the communication coupling for data transmission and the communication coupling for data reception separately.

Next, with reference to FIG. 12 and FIG. 13, processing executed by the respective pieces of apparatus when an initial coupling of servers is carried out will be described in detail with reference to flowcharts. The initial coupling of servers is carried out when a new service is added and the distributed application execution order information 51 for the service is transmitted from the planner 31 to the controller 130, for example. The controller 130 starts communication path decision processing after delivering the distributed application execution order information 51 to each server.

Figure 12:
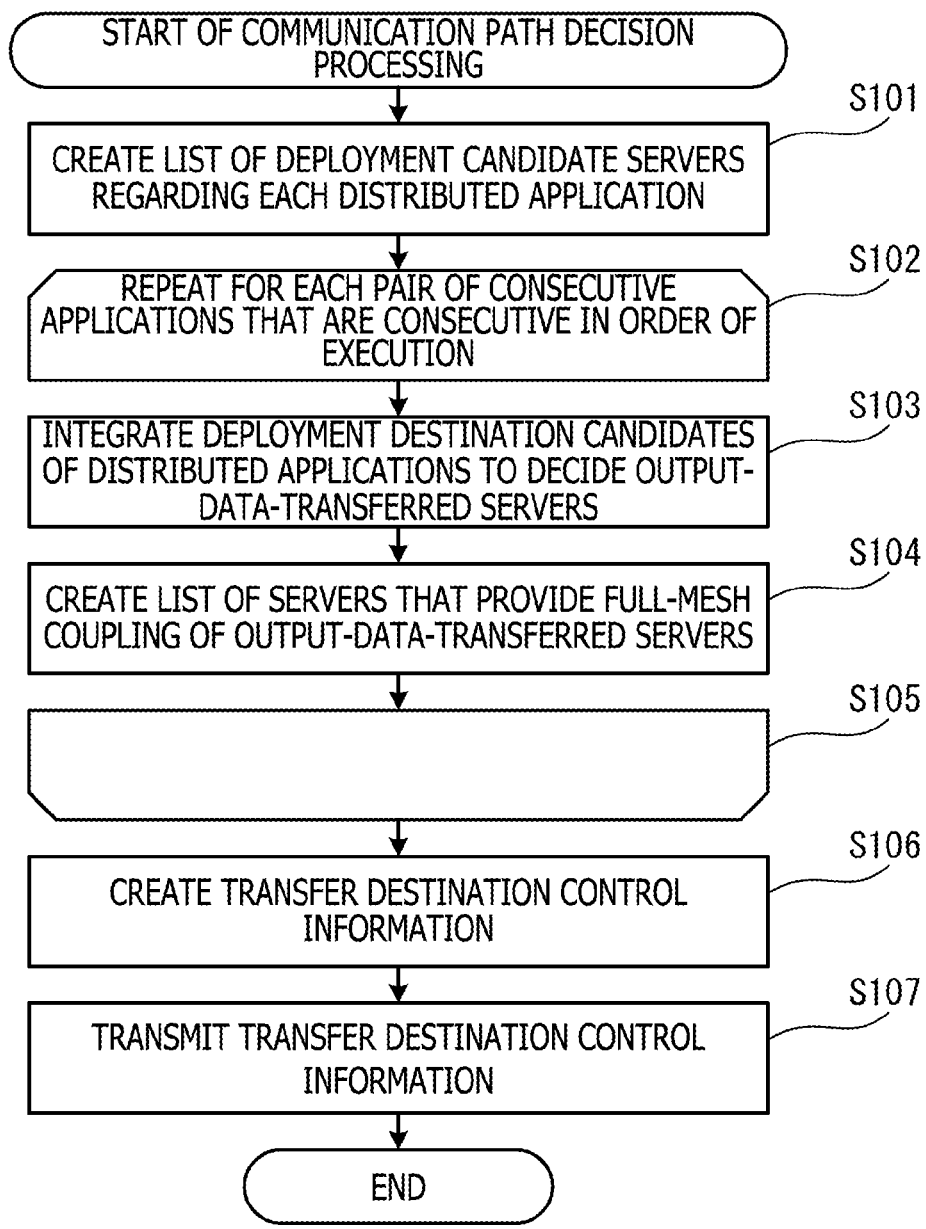
FIG. 12 is a flowchart illustrating one example of a procedure of communication path decision processing by a controller.

FIG. 12 is a flowchart illustrating one example of a procedure of communication path decision processing by a controller. The processing represented in FIG. 12 will be described below along the operation number.

[Operation S101] The controller 130 refers to the distributed application deployment destination history 117 and creates a list of deployment candidate servers regarding each distributed application. The deployment candidate server of a distributed application is a server having a deployment track record of the distributed application, for example. Then, the controller 130 puts together the deployment candidate servers of each distributed application to create the distributed application deployment destination candidate information 53.

[Operation S102] The controller 130 repeats processing of operations S103 and S104 to execute the processing of the operations S103 and S104 for every two distributed applications that are consecutive in the order of execution in the distributed application flow (consecutive application pair).

[Operation S103] The controller 130 integrates the deployment destination candidates of the two distributed applications belonging to the consecutive application pair to decide output-data-transferred servers.

[Operation S104] The controller 130 creates a list of servers that provide a full-mesh coupling of the output-data-transferred servers (communication-path-coupled servers). The controller 130 associates the created list of the communication-path-coupled servers with the application ID of the distributed application that is later in the order of processing in the consecutive application pair and registers the list in the communication path information 114.

[Operation S105] When the processing of the operations S103 and S104 ends regarding all consecutive application pairs, the controller 130 forwards the processing to operation S106.

[Operation S106] The controller 130 creates transfer destination control information of each server based on the communication path information 114 including the list of the communication-path-coupled servers of each consecutive application pair. For example, the controller 130 selects a server as the creation target of the transfer destination control information. Based on the communication path information 114, the controller 130 identifies the distributed application that includes the selected server in the communication-path-coupled servers. The controller 130 extracts servers adjacent to the selected server from the communication-path-coupled servers of the identified distributed application and employs the extracted servers as coupling destination servers of transmission and reception of the identified distributed application.

[Operation S107] The controller 130 transmits the transfer destination control information created for each server to the corresponding servers.

In this manner, the transfer destination control information is transmitted to each server. In the servers that have received the transfer destination control information, communication coupling with the servers specified as the coupling destination is carried out.

Figure 13:
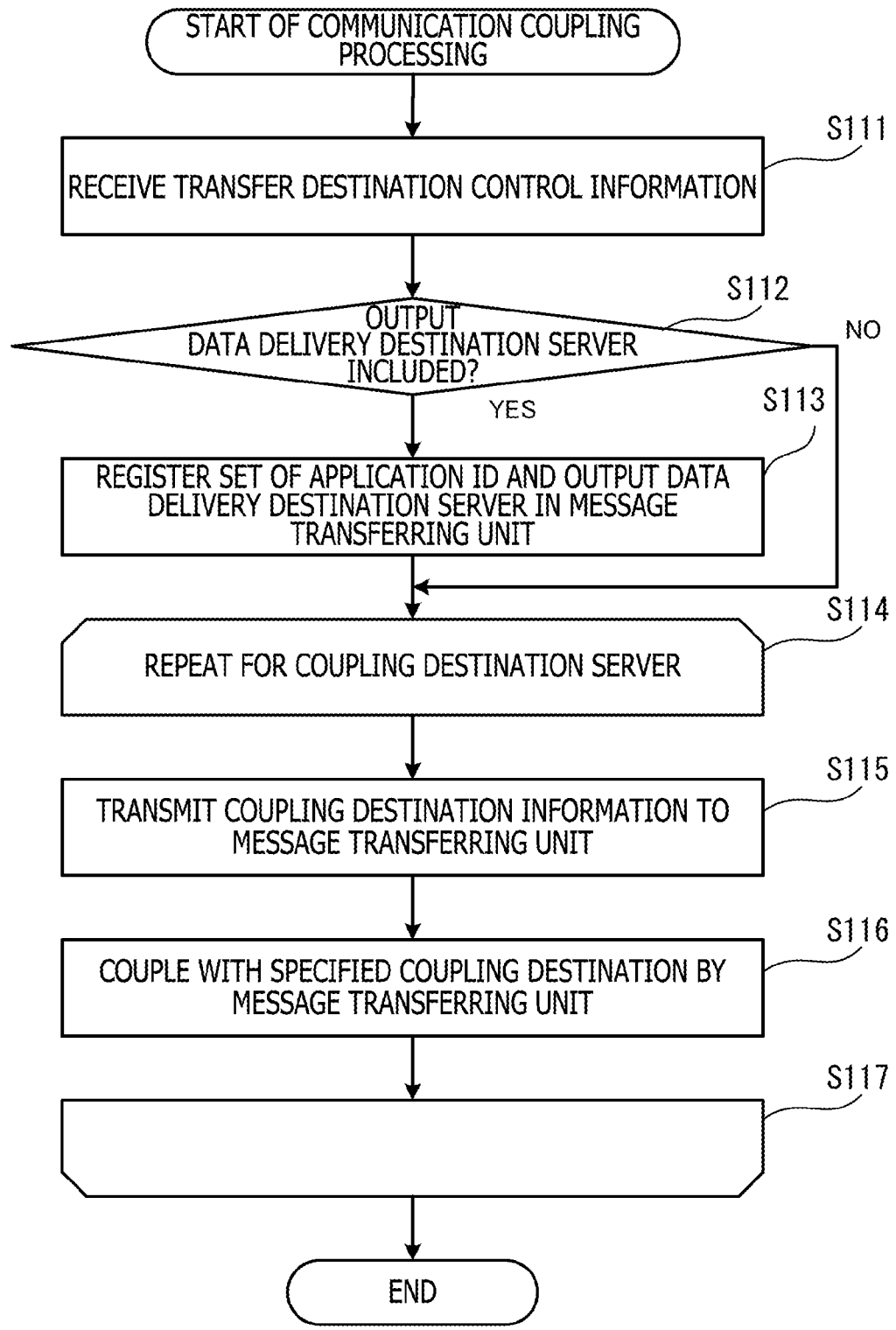
FIG. 13 is a flowchart illustrating one example of a procedure of communication coupling processing by a server.

FIG. 13 is a flowchart illustrating one example of a procedure of communication coupling processing by a server. In the following, the case in which the server 210 executes the processing will be assumed and the processing represented in FIG. 13 will be described along the operation number.

[Operation S111] The control information receiving unit 212 receives the transfer destination control information 55a transmitted by the center server 100.

[Operation S112] The control information receiving unit 212 determines whether or not an output data delivery destination server is included in the received transfer destination control information 55a. If an output data delivery destination server is included, the control information receiving unit 212 forwards the processing to operation S113. Furthermore, if an output data delivery destination server is not included, the control information receiving unit 212 forwards the processing to operation S114.

[Operation S113] The control information receiving unit 212 registers, in the message transferring unit 213, the set of the application ID represented in the transfer destination control information 55a and the output data delivery destination server as the delivery destination of output data of the distributed application indicated by the application ID.

[Operation S114] The control information receiving unit 212 and the message transferring unit 213 execute processing of operations S115 and S116 for each coupling destination server.

[Operation S115] The control information receiving unit 212 transmits, to the message transferring unit 213, coupling destination information including the application ID, the server name of the coupling destination server, and the data transfer condition (transmission or reception).

[Operation S116] With the server specified by the server name of the coupling destination server, the message transferring unit 213 carries out a communication coupling for transfer of data with the distributed application represented by the application ID according to the data transfer condition.

[Operation S117] When the processing of the operations S115 and S116 ends regarding all coupling destination servers, the control information receiving unit 212 and the message transferring unit 213 end the communication coupling processing.

In this manner, the communication coupling at the initial stage is completed. Thereafter, the controller 130 carries out deployment control of distributed applications based on the distributed application deployment destination server information 52 sent from the planner 31.

Figure 14:
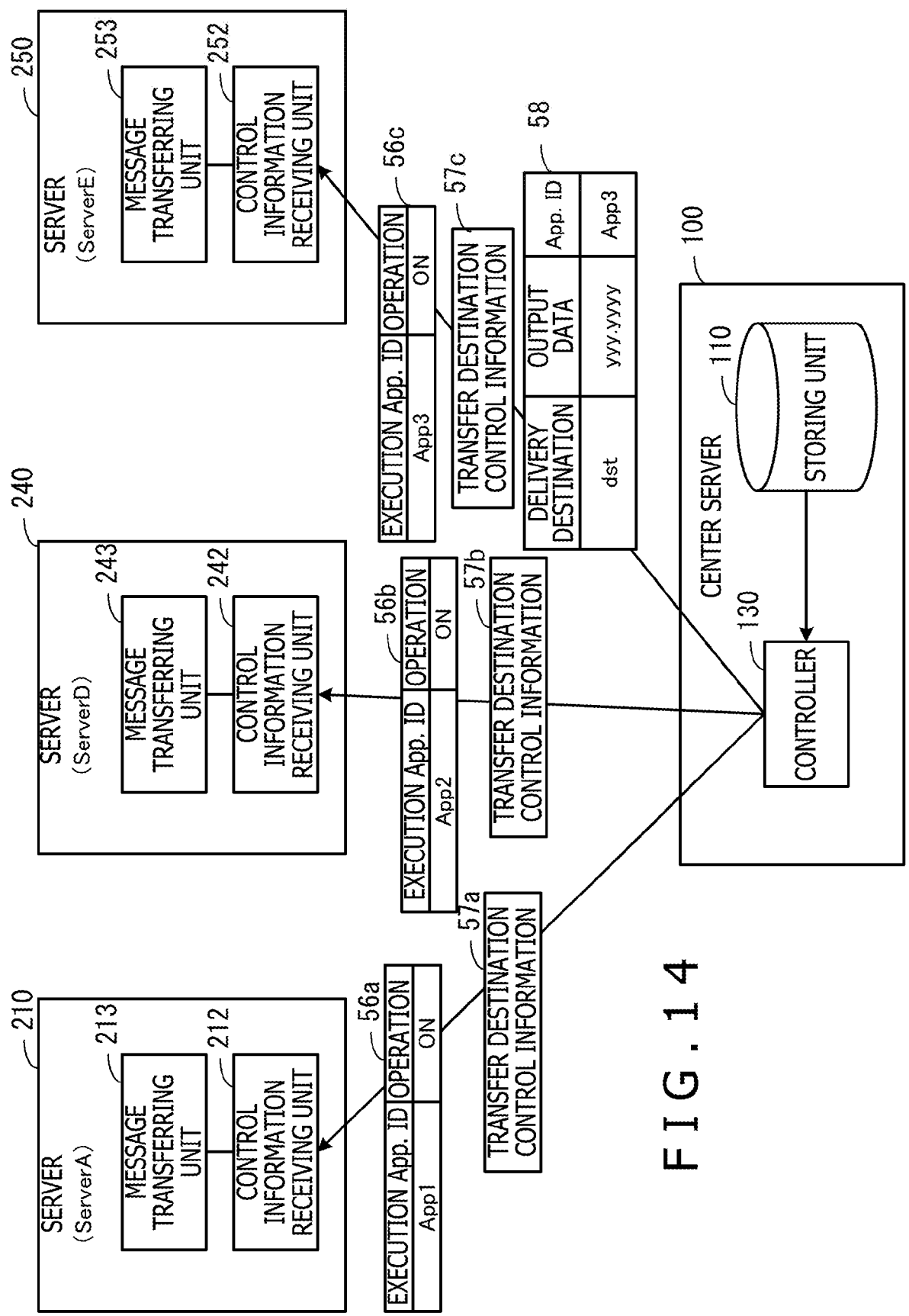
FIG. 14 is a diagram illustrating one example of deployment control of distributed applications.

FIG. 14 is a diagram illustrating one example of deployment control of distributed applications. Suppose that, in the example of FIG. 14, the distributed application "App1" is deployed in the server 210 and the distributed application "App2" is deployed in the server 240 and the distributed application "App3" is deployed in the server 250. In this case, the controller 130 of the center server 100 transmits pieces of execution application control information 56a, 56b, and 56c to three servers 210, 240, and 250, respectively. An instruction to deploy the distributed application "App1" (operation "ON") is included in the execution application control information 56a transmitted to the server 210. An instruction to deploy the distributed application "App2" (operation "ON") is included in the execution application control information 56b transmitted to the server 240. An instruction to deploy the distributed application "App3" (operation "ON") is included in the execution application control information 56c transmitted to the server 250.

Furthermore, the controller 130 updates the distributed application deployment destination history 117 in association with the deployment of the new distributed applications. When the distributed application deployment destination history 117 is updated, possibly the communication-path-coupled servers of each distributed application are also changed. Therefore, the controller 130 recalculates the communication-path-coupled server in association with the deployment of the distributed applications and transmits new pieces of transfer destination control information 57a to 57c to the respective servers 210, 240, and 250. The transfer destination control information is transmitted also to servers that are not diagrammatically represented.

Moreover, the controller 130 transmits output data delivery destination information 58 to the server 250 in which the distributed application "App3" executed last in the distributed application flow is deployed. In the output data delivery destination information 58, terminal apparatus to which output data of the distributed application "App3" is transmitted is represented.

Figure 15:
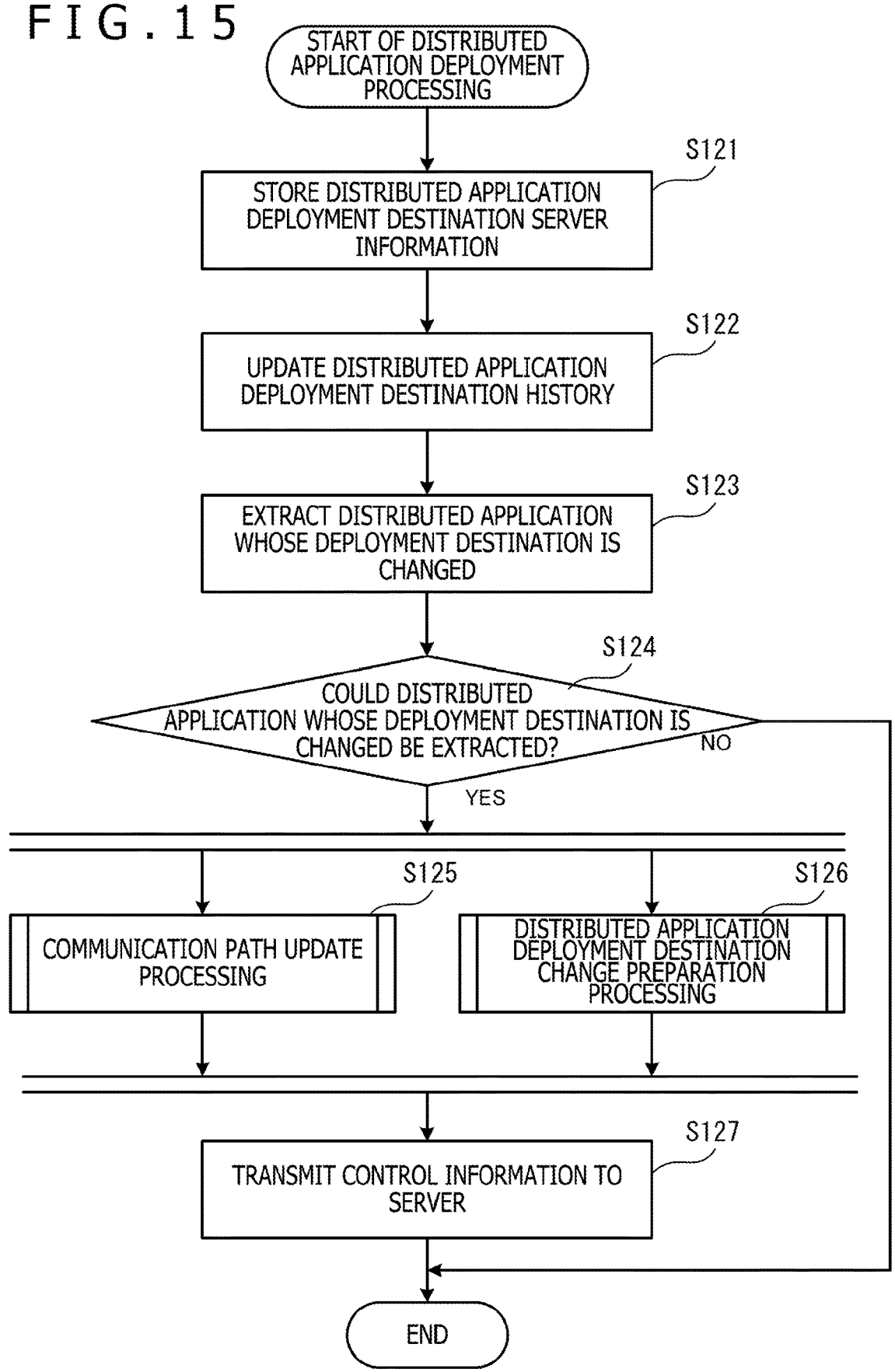
FIG. 15 is a flowchart illustrating one example of a procedure of distributed application deployment processing.

The distributed application deployment processing will be described in detail below with reference to FIG. 15 to FIG. 18. FIG. 15 is a flowchart illustrating one example of a procedure of distributed application deployment processing. The processing represented in FIG. 15 will be described below along the operation number. The distributed application deployment processing is executed when the distributed application deployment destination server information is received from the planner 31, for example.

[Operation S121] The controller 130 receives the distributed application deployment destination server information 52 from the planner 31 and stores the distributed application deployment destination server information 52 in the storing unit 110.

[Operation S122] The controller 130 updates the distributed application deployment destination history 117 based on the distributed application deployment destination server information 112 stored in the storing unit 110. For example, the controller 130 sequentially selects the sets of the application ID of the distributed application and the deployment destination server from the distributed application deployment destination server information 112. Then, the controller 130 adds 1 to the values in the distributed application deployment destination history 117 corresponding to the selected sets.

[Operation S123] The controller 130 extracts the distributed application whose deployment destination is changed from the distributed application deployment destination server information 112.

[Operation S124] The controller 130 determines whether or not at least one distributed application whose deployment destination is changed could be extracted in the operation S123. If the distributed application could not be extracted, the controller 130 ends the distributed application deployment processing. Furthermore, if the distributed application could be extracted, the controller 130 executes processing of operation S125 and operation S126 concurrently.

[Operation S125] The controller 130 executes communication path update processing. Details of this processing will be described later (see FIG. 16).

[Operation S126] The controller 130 executes distributed application deployment destination change preparation processing. Details of this processing will be described later (see FIG. 17).

[Operation S127] When both the processing of the operation S125 and the processing of the operation S126 end, the controller 130 transmits control information generated by the operations S125 and S126 to each server.

Next, the communication path update processing will be described.

Figure 16:
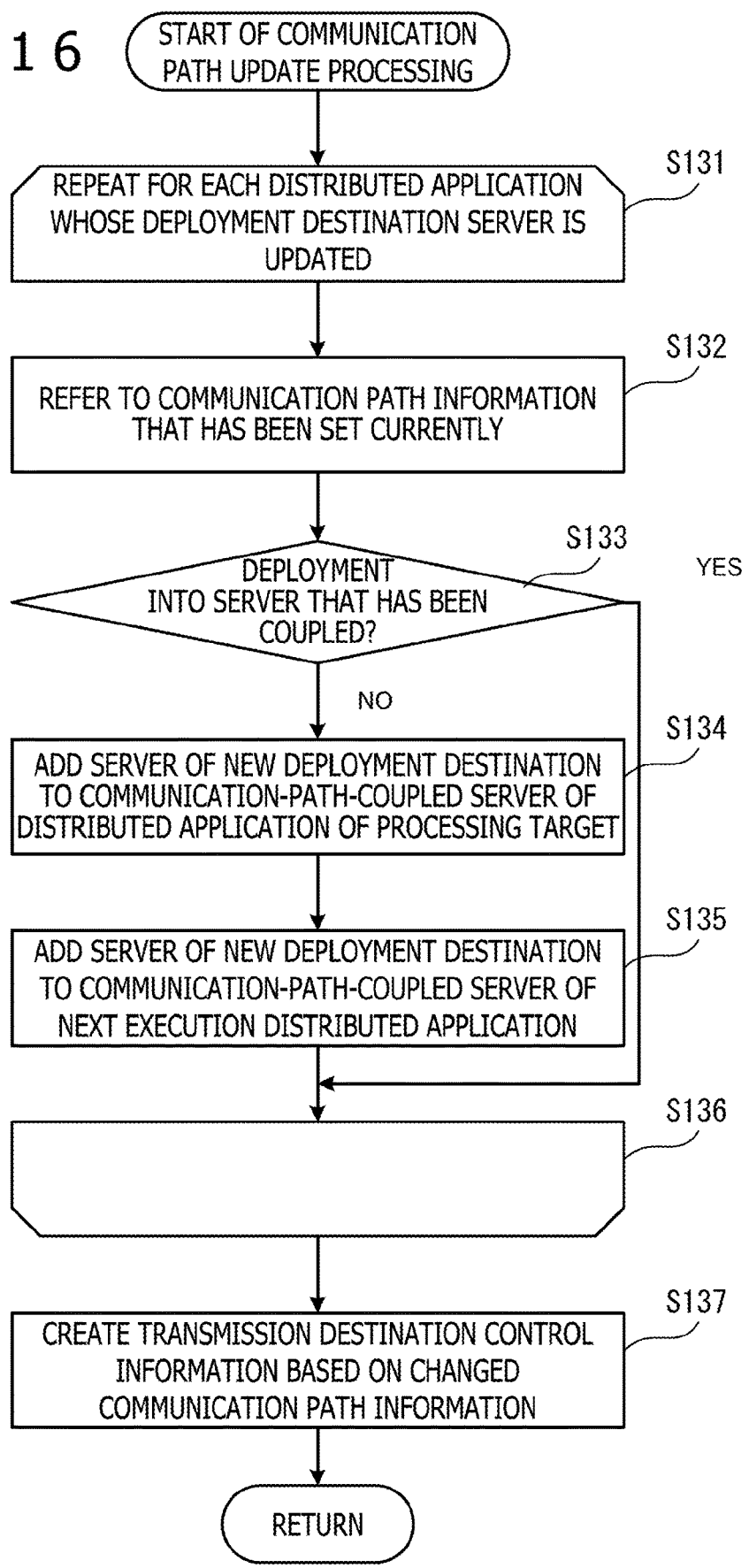
FIG. 16 is a flowchart illustrating one example of a procedure of communication path update processing.

FIG. 16 is a flowchart illustrating one example of a procedure of communication path update processing. The processing represented in FIG. 16 will be described below along the operation number.

[Operation S131] The controller 130 repeats processing of operations S132 to S135 to execute the processing of the operations S132 to S135 for each distributed application whose deployment destination server is changed.

[Operation S132] The controller 130 refers to the communication path information 114 that has been set currently.

[Operation S133] The controller 130 determines whether or not the deployment destination of the distributed application of the processing target is a server that has been already coupled. For example, if the server of the deployment destination after the change in the distributed application of the processing target is included in the communication-path-coupled servers set in association with the application ID of this distributed application in the communication path information 114, the controller 130 determines that the server has been already coupled. The controller 130 forwards the processing to operation S136 in the case of deployment into a server that has been coupled. Furthermore, the controller 130 forwards the processing to operation S134 in the case of deployment into a server that has not been coupled.

[Operation S134] The controller 130 adds the server name of the server of the new deployment destination of the distributed application of the processing target to the communication-path-coupled server corresponding to the distributed application of the processing target in the communication path information 114.

[Operation S135] The controller 130 identifies the next execution distributed application to be executed subsequently to the distributed application of the processing target on the distributed application flow based on the distributed application execution order information 111. Then, the controller 130 adds the server name of the server of the new deployment destination of the distributed application of the processing target to the communication-path-coupled server corresponding to the next execution distributed application in the communication path information 114.

[Operation S136] If the processing of the operations S132 to S135 ends for all distributed applications whose deployment destination server is changed, the controller 130 forwards the processing to operation S137.

[Operation S137] The controller 130 creates transfer destination control information of the server that receives the influence of the change based on the updated communication path information 114. For example, a server adjacent to the server of the new deployment destination in the server group represented in the communication-path-coupled server to which the server name of the server of the new deployment destination has been added is the server that receives the influence of the change.

In this manner, the transfer destination control information for carrying out a communication coupling is generated in association with the change in the server of the deployment destination.

Figure 17:
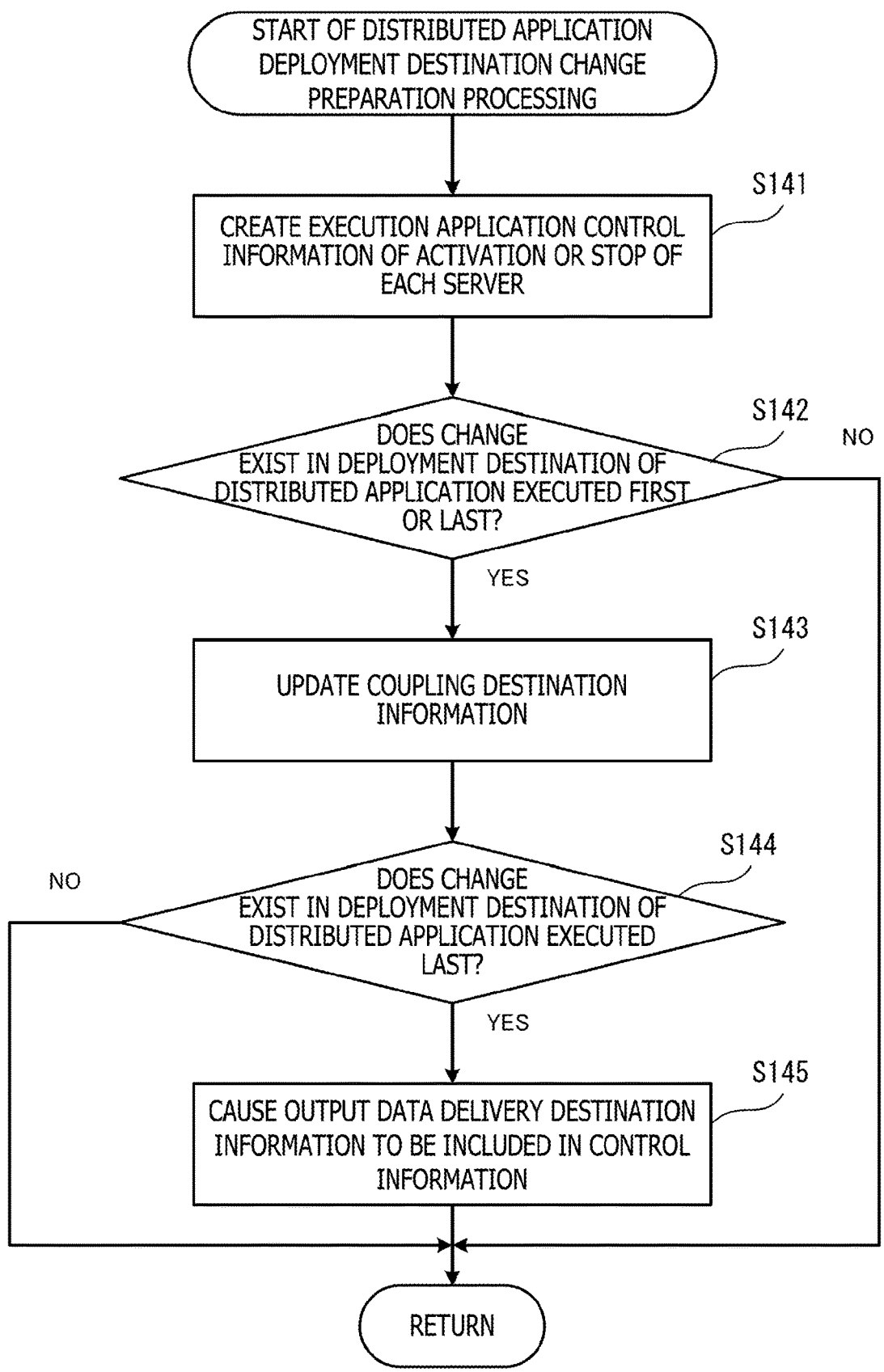
FIG. 17 is a flowchart illustrating one example of a procedure of distributed application deployment destination change preparation processing.

Next, the distributed application deployment destination change preparation processing will be described. FIG. 17 is a flowchart illustrating one example of a procedure of distributed application deployment destination change preparation processing. The processing represented in FIG. 17 will be described below along the operation number.

[Operation S141] The controller 130 creates execution application control information of activation or stop of each server. For example, for a server in which a distributed application is newly deployed, the controller 130 creates the execution application control information that instructs operation "ON" of the distributed application to be deployed. Furthermore, for a server of the before-change deployment destination of a distributed application whose deployment destination is changed, the controller 130 creates the execution application control information that instructs operation "OFF" of the deployed distributed application.

[Operation S142] The controller 130 determines whether or not a change exists in the server of the deployment destination of the distributed application executed first or last in the distributed application flow. If a change in the server of the deployment destination exists, the controller 130 forwards the processing to operation S143. Furthermore, if a change in the deployment destination does not exist, the controller 130 ends the distributed application deployment destination change preparation processing.

[Operation S143] The controller 130 refers to the distributed application execution order information 111 and the distributed application deployment destination server information 112 and registers the servers of the deployment destinations of the distributed applications executed first and last in the coupling destination information 115.

[Operation S144] The controller 130 determines whether or not a change exists in the server of the deployment destination of the distributed application executed last. If a change exists in the server of the deployment destination, the controller 130 forwards the processing to operation S145. Furthermore, if a change does not exist in the server of the deployment destination, the controller 130 ends the distributed application deployment destination change preparation processing.

[Operation S145] The controller 130 causes the output data delivery destination information 116 to be included in control information transmitted to the server of the deployment destination of the distributed application executed last.

As the result of the processing of FIG. 15 to FIG. 17, control information like that represented in FIG. 14 is transmitted to each server. The processing of the server when the transfer destination control information is received is as represented in FIG. 13. The server that has received the execution application control information executes activation or stop processing of the distributed application.

Figure 18:
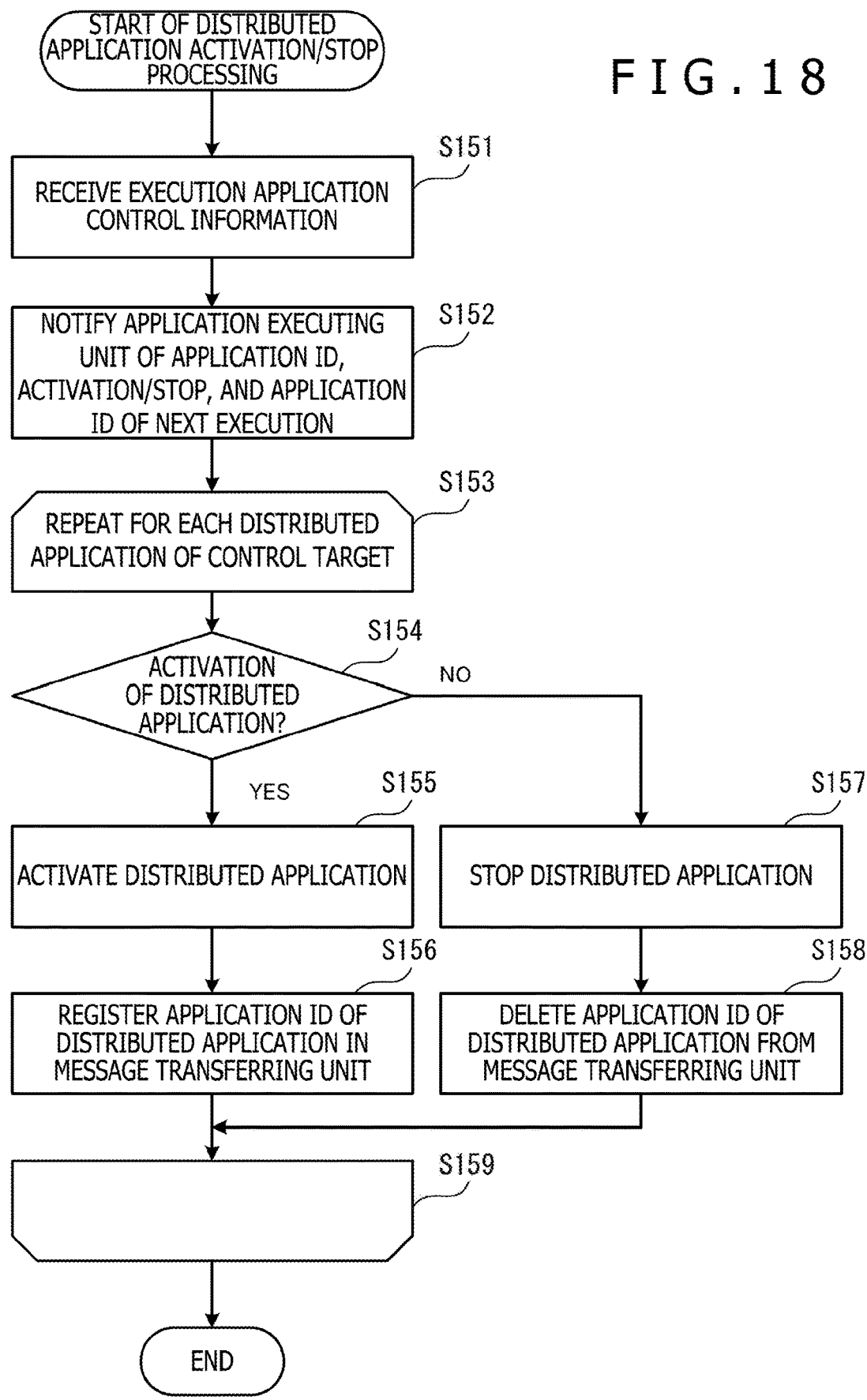
FIG. 18 is a flowchart illustrating one example of a procedure of distributed application activation/stop processing.

FIG. 18 is a flowchart illustrating one example of a procedure of distributed application activation/stop processing. In the following, the case in which the server 210 executes the processing will be assumed and the processing represented in FIG. 18 will be described along the operation number.

[Operation S151] The control information receiving unit 212 receives execution application control information.

[Operation S152] The control information receiving unit 212 notifies the application executing unit 214 of the application ID of the distributed application represented in the execution application control information, the contents of operation (activation (ON) or stop (OFF)), and the application ID of the distributed application executed next. The application ID of the distributed application executed next is identified through reference to the distributed application execution order information 211b by the control information receiving unit 212.

[Operation S153] The application executing unit 214 repeats processing of operations S154 to S158 to execute the processing of the operations S154 to S158 for each distributed application of the control target.

[Operation S154] The application executing unit 214 determines whether the contents of operation are activation or stop of the distributed application. If the contents of operation are activation of the distributed application, the application executing unit 214 forwards the processing to the operation S155. Furthermore, if the contents of operation are stop of the distributed application, the application executing unit 214 forwards the processing to the operation S157.

[Operation S155] The application executing unit 214 activates the distributed application corresponding to the notified application ID.

[Operation S156] The application executing unit 214 registers, in the message transferring unit 213, the application ID of the activated distributed application as the application ID of the acquisition target of input data to the distributed application. Thereafter, if the registered application ID is given to transfer data received from another server, the message transferring unit 213 transmits data in the transfer data to the application executing unit 214.

[Operation S157] The application executing unit 214 stops the distributed application corresponding to the notified application ID.

[Operation S158] The application executing unit 214 deletes the application ID of the stopped distributed application registered in the message transferring unit 213.

[Operation S159] When the processing of the operations S154 to S158 ends regarding all distributed applications of the control target, the application executing unit 214 ends the distributed application activation/stop processing.

In this manner, the distributed application is deployed in any server and transmission and reception of transfer data between distributed applications is enabled.

Figure 19:
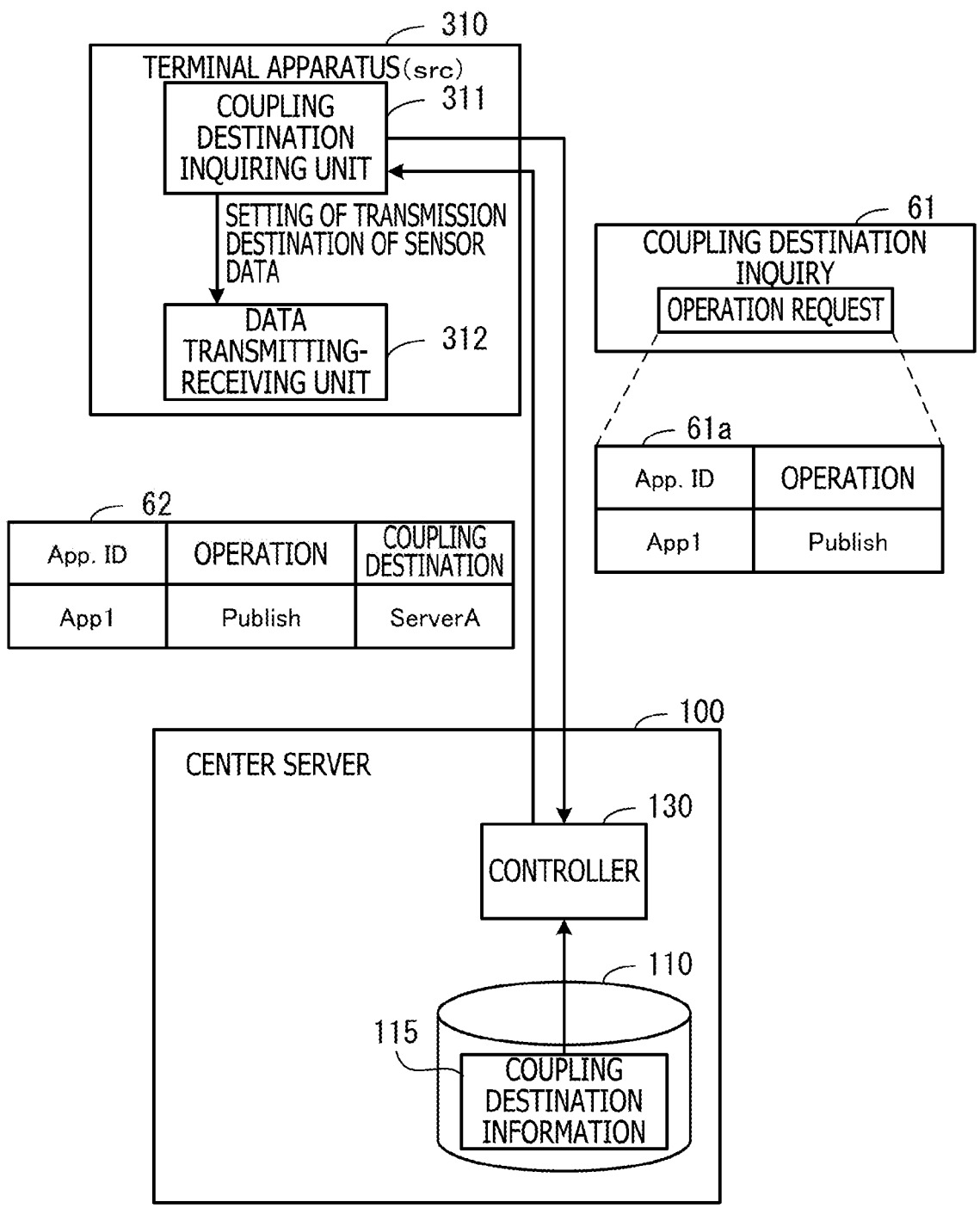
FIG. 19 is a diagram illustrating one example of coupling destination inquiry by terminal apparatus that transmits sensor data.

Next, coupling destination inquiry processing by the terminal apparatus will be described. FIG. 19 is a diagram illustrating one example of coupling destination inquiry by terminal apparatus that transmits sensor data. The coupling destination inquiring unit 311 of the terminal apparatus 310 (apparatus name "src") transmits a coupling destination inquiry 61 to inquire the transmission destination of the sensor data to the center server 100. Information for communication with the center server 100 (for example, IP address) is set in the terminal apparatus 310 in advance. An operation request 61a is included in the coupling destination inquiry 61. In the operation request 61a, the application ID of the distributed application executed first in the distributed application flow and operation "Publish" are included.

In the center server 100, the controller 130 receives the coupling destination inquiry 61. The controller 130 that has received the coupling destination inquiry 61 refers to the coupling destination information 115 and generates data transmission destination information 62. In the data transmission destination information 62, in addition to the application ID of the distributed application executed first in the distributed application flow and operation "Publish," the server name of the server in which the distributed application is deployed is included as the coupling destination. Then, the controller 130 transmits the data transmission destination information 62 to the terminal apparatus 310.

When receiving the data transmission destination information 62, the coupling destination inquiring unit 311 of the terminal apparatus 310 sets the server name set in the data transmission destination information 62 as the coupling destination in the data transmitting-receiving unit 312 as the transmission destination of the sensor data. Thereafter, the data transmitting-receiving unit 312 transmits the sensor data to the server set as the coupling destination.

Figure 20:
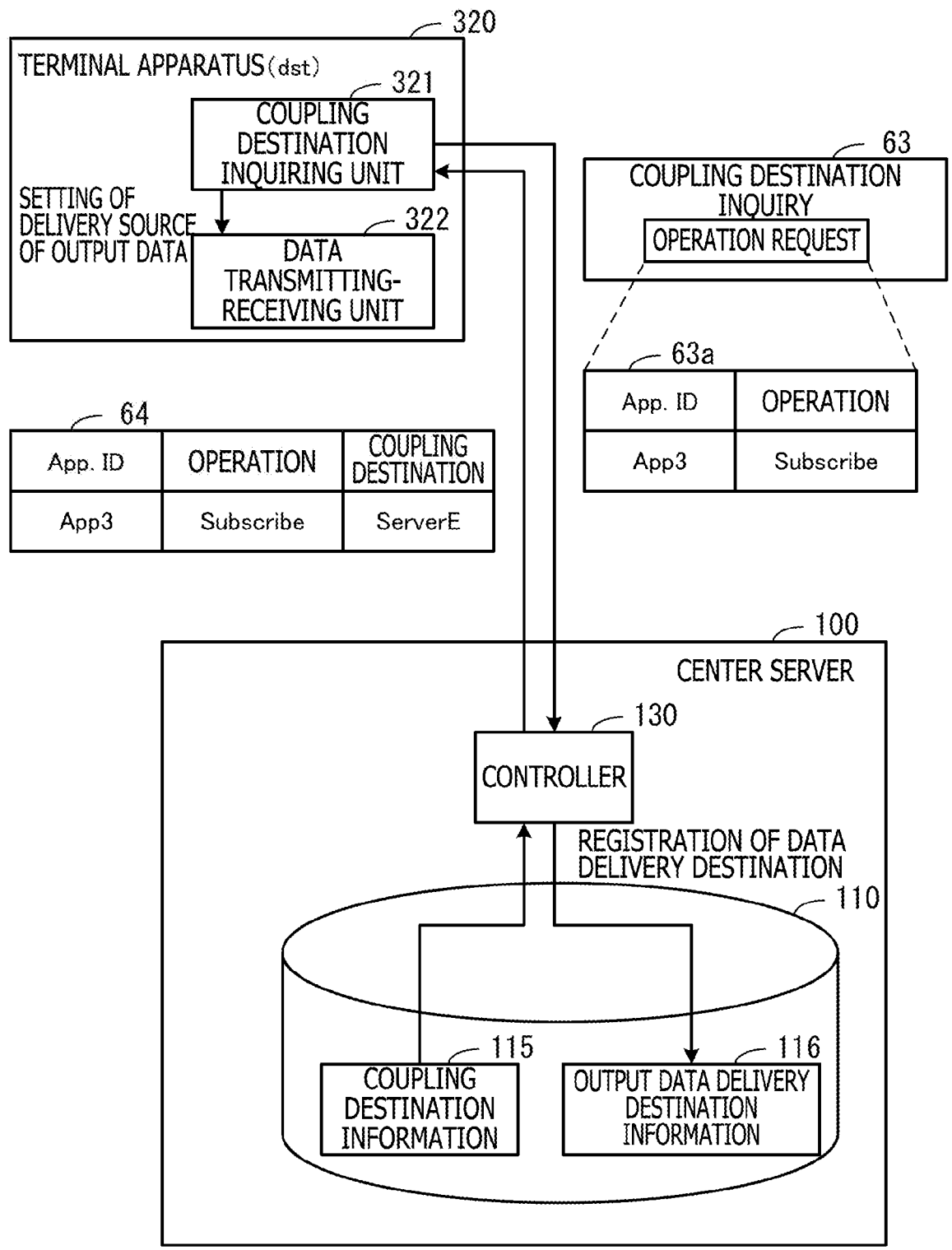
FIG. 20 is a diagram illustrating one example of coupling destination inquiry by terminal apparatus that receives delivery of output data.

FIG. 20 is a diagram illustrating one example of coupling destination inquiry by terminal apparatus that receives delivery of output data. The coupling destination inquiring unit 321 of the terminal apparatus 320 (apparatus name "dst") transmits a coupling destination inquiry 63 for receiving delivery of the output data of the last distributed application in the distributed application flow to the center server 100. Information for communication with the center server 100 is set in the terminal apparatus 320 in advance. An operation request 63a is included in the coupling destination inquiry 63. In the operation request 63a, the application ID of the distributed application executed last in the distributed application flow and operation "Subscribe" are included.

In the center server 100, the controller 130 receives the coupling destination inquiry 63. The controller 130 that has received the coupling destination inquiry 63 registers the apparatus name "dst" of the terminal apparatus 320 in the output data delivery destination information 116. Furthermore, the controller 130 refers to the coupling destination information 115 and generates data delivery source information 64. In the data delivery source information 64, in addition to the application ID of the distributed application executed last in the distributed application flow and operation "Subscribe," the server name of the server in which the distributed application is deployed is included as the coupling destination. Then, the controller 130 transmits the data delivery source information 64 to the terminal apparatus 320.

When receiving the data delivery source information 64, the coupling destination inquiring unit 321 of the terminal apparatus 320 sets the server name set in the data delivery source information 64 as the coupling destination in the data transmitting-receiving unit 322 as the transmission source of the output data. Thereafter, the data transmitting-receiving unit 322 receives the output data from the server set as the transmission source.

Figure 21:
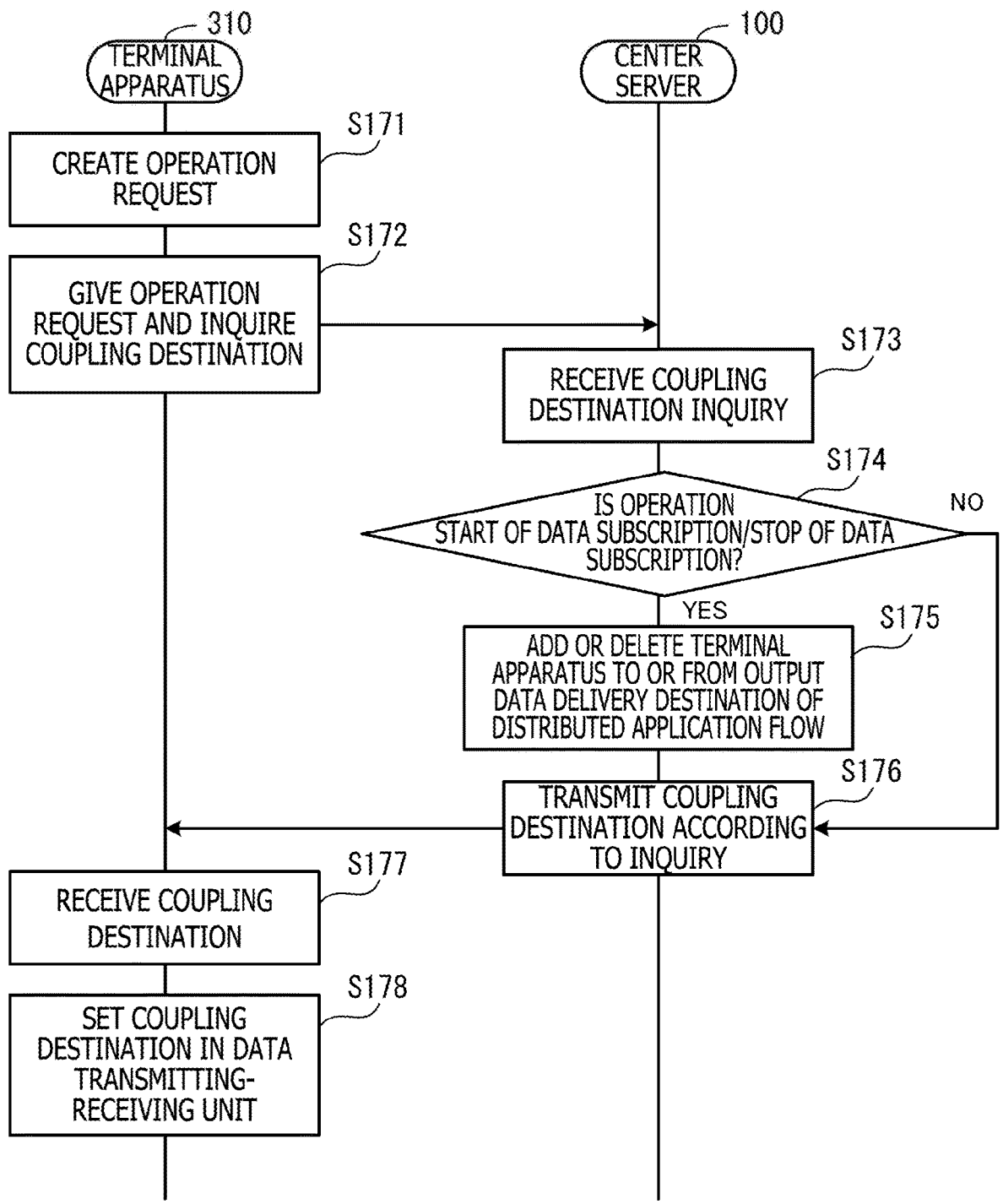
FIG. 21 is a sequence diagram illustrating one example of a procedure of coupling destination inquiry processing.

Next, the procedure of coupling destination inquiry processing will be described in detail by using a sequence diagram. FIG. 21 is a sequence diagram illustrating one example of a procedure of coupling destination inquiry processing. Suppose that the terminal apparatus 310 makes a coupling destination inquiry in the example of FIG. 21. The processing represented in FIG. 21 will be described below along the operation number.

[Operation S171] The coupling destination inquiring unit 311 of the terminal apparatus 310 creates an operation request that represents the contents of the inquiry. In the operation request, any of "data registration (Publish)," "start of data subscription (Subscribe)," and "stop of data subscription (un-Subscribe)" is set as the contents of operation.

[Operation S172] The coupling destination inquiring unit 311 transmits a coupling destination inquiry given the operation request to the center server 100.

[Operation S173] In the center server 100, the controller 130 receives the coupling destination inquiry.

[Operation S174] The controller 130 determines whether or not the operation is "start of data subscription (Subscribe)" or "stop of data subscription (un-Subscribe)." If the operation is either "start of data subscription (Subscribe)" or "stop of data subscription (un-Subscribe)," the controller 130 forwards the processing to operation S175. Furthermore, if the operation is "data registration (Publish)," the controller 130 forwards the processing to operation S176.

[Operation S175] If the operation is "start of data subscription (Subscribe)," the controller 130 adds the apparatus name of the terminal apparatus 310 to the output data delivery destination information of the distributed application flow. Furthermore, if the operation is "stop of data subscription (un-Subscribe)," the controller 130 deletes the apparatus name of the terminal apparatus 310 from the output data delivery destination information of the distributed application flow.

[Operation S176] The controller 130 transmits information on the coupling destination according to the coupling destination inquiry to the terminal apparatus 310. For example, if the operation is "data registration (Publish)," the controller 130 transmits, to the terminal apparatus 310, the server name of the server in which the distributed application executed first in the distributed application flow is deployed as the coupling destination. Furthermore, if the operation is either "start of data subscription (Subscribe)" or "stop of data subscription (un-Subscribe)," the controller 130 transmits, to the terminal apparatus 310, the server name of the server in which the distributed application executed last is deployed as the coupling destination.

[Operation S177] The coupling destination inquiring unit 311 of the terminal apparatus 310 receives the information on the coupling destination transmitted from the center server 100.

[Operation S178] The coupling destination inquiring unit 311 sets the coupling destination in the data transmitting-receiving unit 312.

In this manner, the processing according to the operation request represented in the coupling destination inquiry from the terminal apparatus 310 is executed. Thereafter, sensor data is transmitted from the terminal apparatus that has transmitted the operation request for data registration to the distributed system and output data of the processing based on the distributed application flow is delivered to the terminal apparatus that has transmitted the operation request for start of data subscription.

Figure 22:
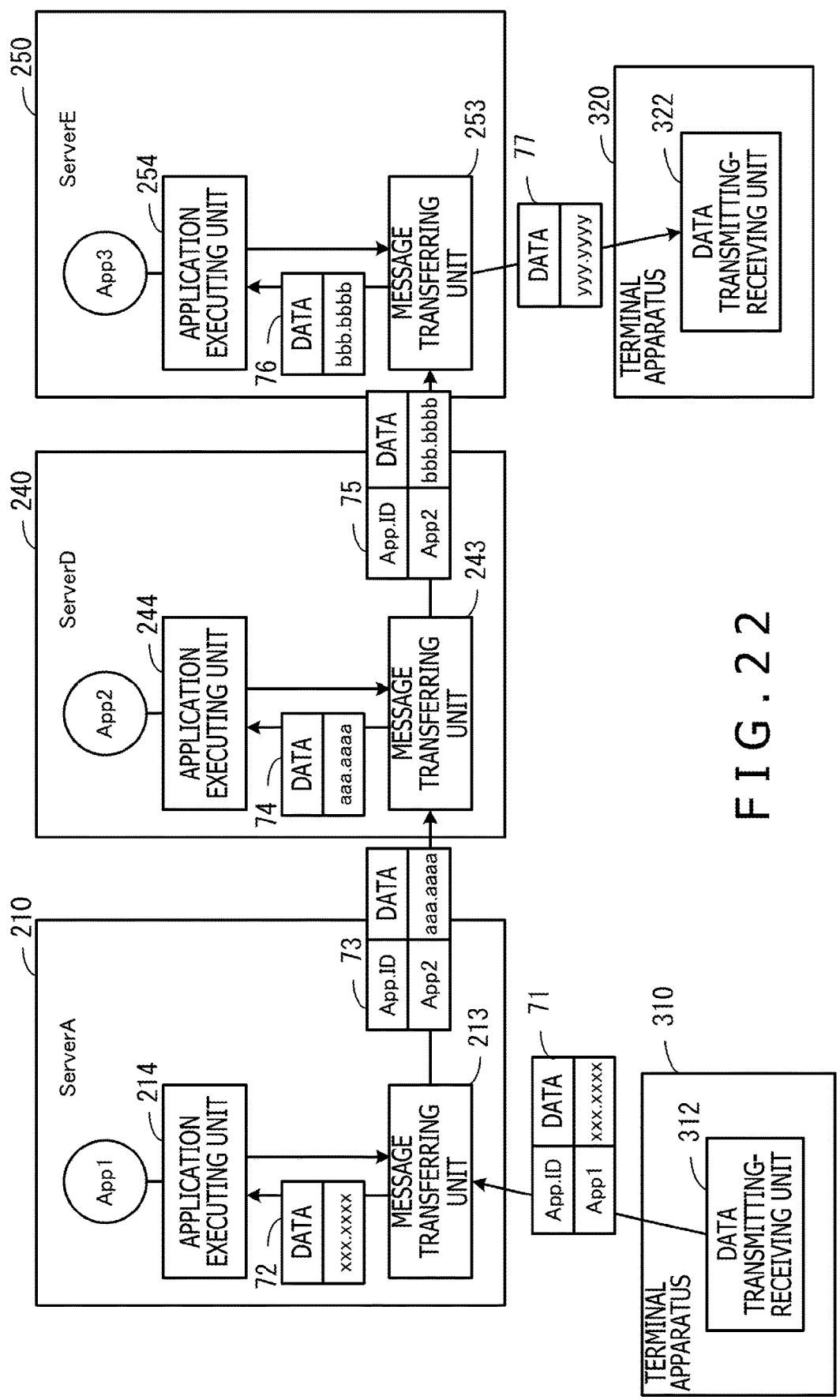
FIG. 22 is a diagram illustrating one example of distributed processing.

FIG. 22 is a diagram illustrating one example of distributed processing. The data transmitting-receiving unit 312 in the terminal apparatus 310 transmits sensor data 71 to the server 210 in which the distributed application "App1" is deployed. The application ID of the distributed application "App1" is represented in the sensor data 71.

In the server 210, the message transferring unit 213 receives the sensor data 71. The message transferring unit 213 understands that the sensor data 71 is data to be processed by the distributed application "App1" deployed in the server 210 based on the application ID included in the sensor data 71. Then, the message transferring unit 213 transmits data 72 included in the sensor data 71 to the application executing unit 214. The application executing unit 214 processes the data 72 by using the distributed application "App1." Then, the application executing unit 214 specifies the distributed application "App2" executed subsequently to the distributed application "App1" in the distributed application flow and transmits data obtained as the processing result to the message transferring unit 213. The message transferring unit 213 transmits transfer data 73 obtained by giving the application ID of the distributed application "App2" to the output data of the distributed application "App1" onto the inter-adjacent-server communication path coupled in association with the distributed application "App2."

When the transfer data 73 is transmitted on the inter-adjacent-server communication path and reaches the server 240, the message transferring unit 243 receives the transfer data 73. The message transferring unit 243 understands that the transfer data 73 is data to be processed by the distributed application "App2" deployed in the server 240 based on the application ID included in the transfer data 73. Then, the message transferring unit 243 transmits data 74 included in the transfer data 73 to the application executing unit 244. The application executing unit 244 processes the data 74 by using the distributed application "App2." Then, the application executing unit 244 specifies the distributed application "App3" executed subsequently to the distributed application "App2" in the distributed application flow and transmits data obtained as the processing result to the message transferring unit 243. The message transferring unit 243 transmits transfer data 75 obtained by giving the application ID of the distributed application "App3" to the output data of the distributed application "App2" onto the inter-adjacent-server communication path coupled in association with the distributed application "App3."

When the transfer data 75 is transmitted on the inter-adjacent-server communication path and reaches the server 250, the message transferring unit 253 receives the transfer data 75. The message transferring unit 253 understands that the transfer data 75 is data to be processed by the distributed application "App3" deployed in the server 250 based on the application ID included in the transfer data 75. Then, the message transferring unit 253 transmits data 76 included in the transfer data 75 to the application executing unit 254. The application executing unit 254 processes the data 76 by using the distributed application "App3." Then, because the distributed application "App3" is the last distributed application in the distributed application flow, the application executing unit 254 specifies the terminal apparatus of the delivery destination of output data and transmits output data 77 obtained as the processing result to the message transferring unit 253. The message transferring unit 253 transmits the output data 77 of the distributed application "App3" to the terminal apparatus 320 as the delivery destination. In the terminal apparatus 320, the data transmitting-receiving unit 322 receives the output data 77.

The pieces of transfer data 73 and 75 transferred in the distributed system in such distributed processing are transmitted via all inter-adjacent-server communication paths coupled in association with the given application ID. For this reason, even when the deployment destination of a distributed application is changed, it may be expected that the inter-adjacent-server communication path is coupled to the server of the change destination in advance and data to be processed is preliminarily sent to this server.

In addition, in the second embodiment, based on the distributed application deployment destination history 117, the inter-adjacent-server communication path corresponding to the distributed application is coupled only to the server having a high possibility of becoming the deployment destination of the distributed application. Thus, the amount of data transferred in the distributed system may be suppressed.

Figure 23:
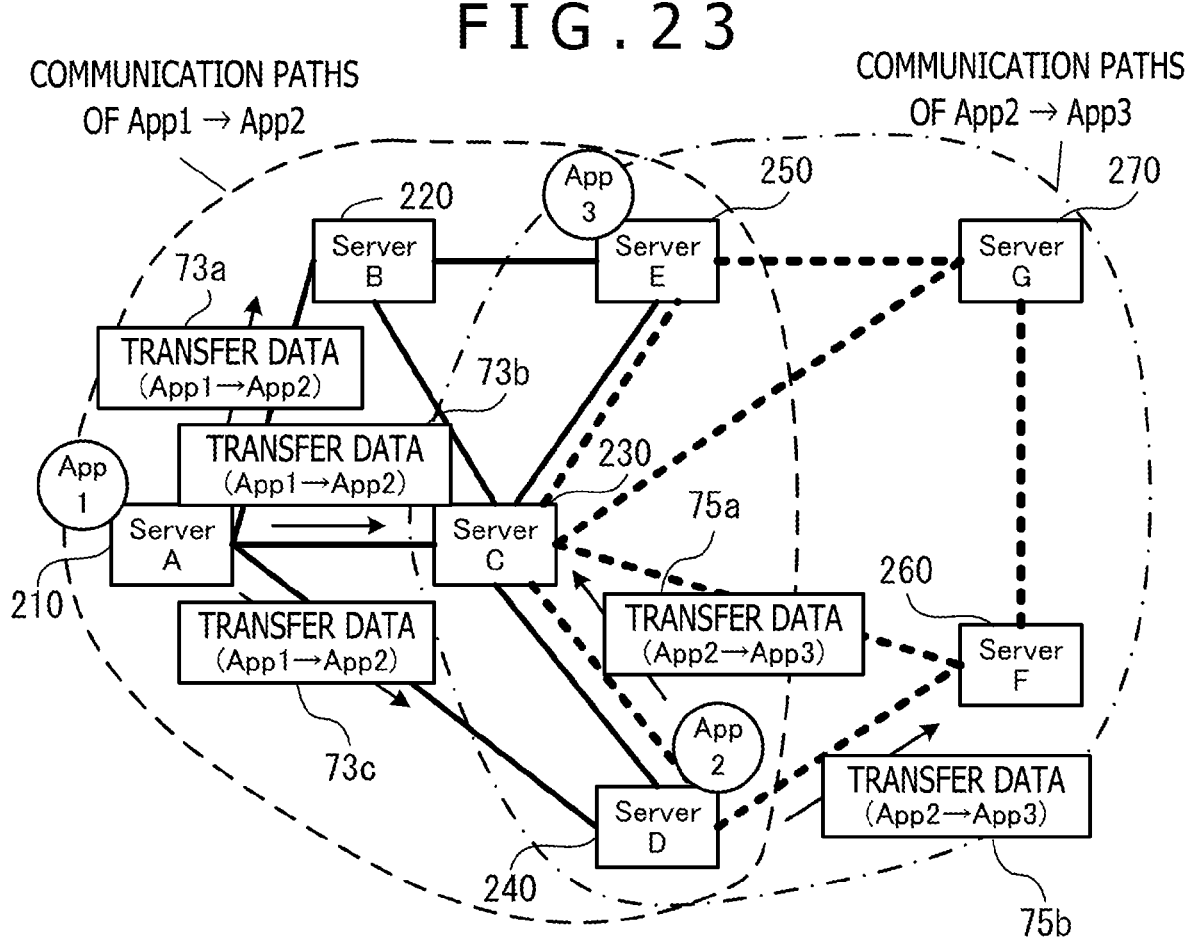
FIG. 23 is a diagram illustrating one example of transfer data transferred in a distributed system.

FIG. 23 is a diagram illustrating one example of transfer data transferred in a distributed system. In the server 210 in which the distributed application "App1" is deployed, pieces of transfer data 73a, 73b, and 73c including output data of the distributed application "App1" are transmitted to the respective servers 220, 230, and 240 to which communication coupling has been carried out. The pieces of transfer data 73a and 73b transmitted to the servers 220 and 230 in which the distributed application "App2" is not deployed are transferred to other servers by using inter-adjacent-server communication paths corresponding to the distributed application "App2." For example, although the server 230 transfers the received transfer data 73b to the servers 220, 240, and 250, the server 230 does not transfer the received transfer data 73*b* to the servers 260 and 270.

When the server 240 in which the distributed application "App2" is deployed receives the transfer data 73*c*, the output data of the distributed application "App1" included in the transfer data 73*c* is processed by using the distributed application "App2" in the server 240. Thereafter, pieces of transfer data 75*a* and 75*b* including output data of the distributed application "App2" are transmitted to the respective servers 230 and 260 to which communication coupling has been carried out. The pieces of transfer data 75*a* and 75*b* transmitted to the servers 230 and 260 in which the distributed application "App3" is not deployed are transferred to other servers by using inter-adjacent-server communication paths corresponding to the distributed application "App3." For example, although the server 230 transfers the received transfer data 75*a* to the servers 250, 260, and 270, the server 230 does not transfer the received transfer data 75*a* to the servers 210 and 220.

When the server 250 in which the distributed application "App3" is deployed receives the transfer data 75*a*, the output data of the distributed application "App2" included in the transfer data 75*a* is processed by using the distributed application "App3" in the server 250. Output data of the processing by the distributed application "App3" is transmitted to terminal apparatus that desires delivery.

By setting limitation to the transfer destination of transfer data in this manner, the amount of data communicated in the distributed system may be reduced. In the following, with reference to FIG. 24, description will be made in detail about distributed application execution and data transfer processing in a server that has received sensor data or transfer data.

Figure 24:
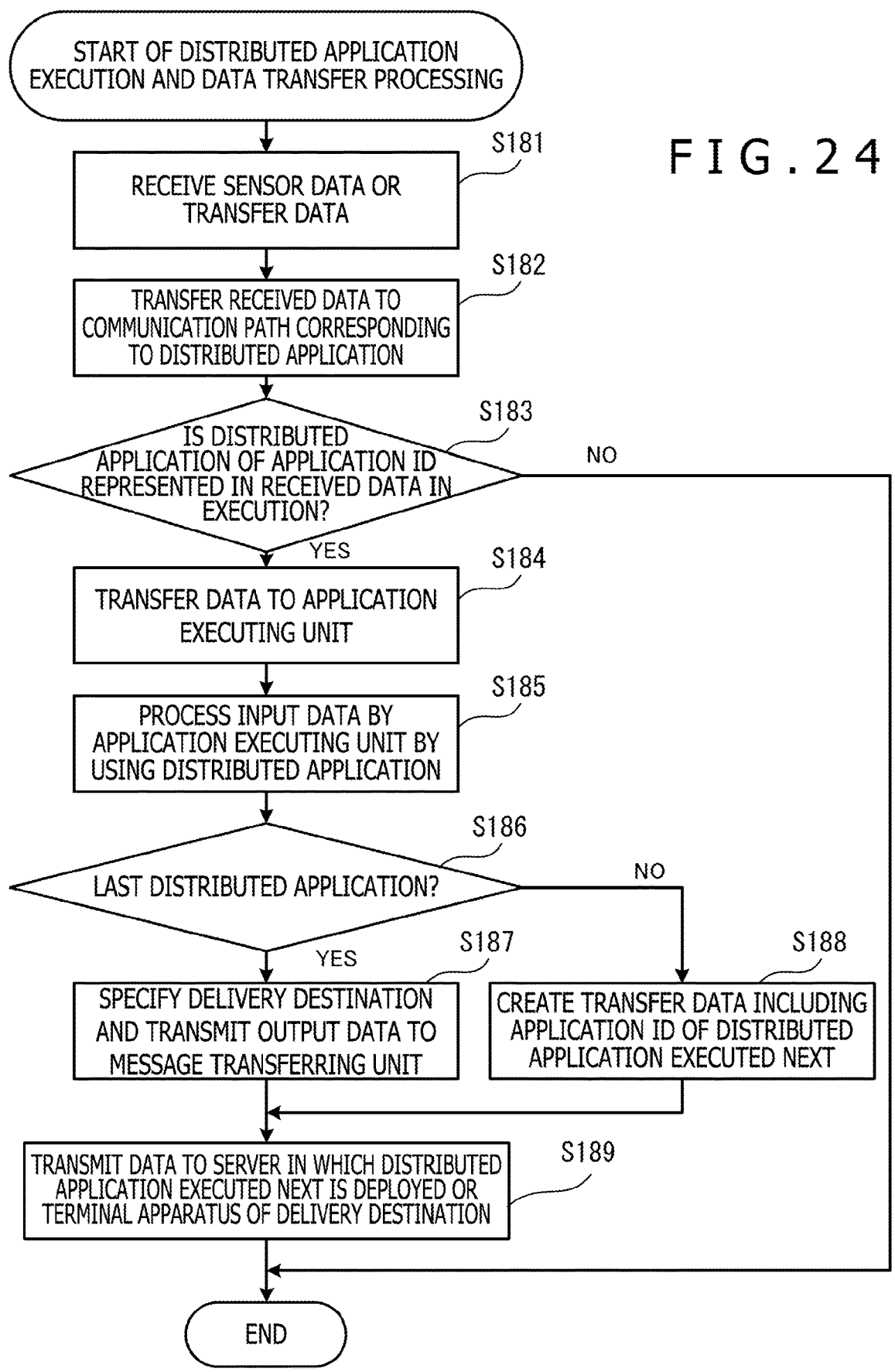
FIG. 24 is a flowchart illustrating one example of a procedure of distributed application execution and data transfer processing.

FIG. 24 is a flowchart illustrating one example of a procedure of distributed application execution and data transfer processing. In the following, the case in which the server 210 executes the processing will be assumed and the processing represented in FIG. 24 will be described along the operation number.

[Operation S181] The message transferring unit 213 receives sensor data or transfer data.

[Operation S182] The message transferring unit 213 transfers the received data to the inter-adjacent-server communication path in which a communication coupling has been carried out in association with the distributed application represented by the application ID given to the received sensor data or transfer data.

[Operation S183] The message transferring unit 213 determines whether or not the distributed application of the application ID represented in the received sensor data or transfer data is in execution. For example, if the execution target distributed application ID 211*a* corresponds with the application ID represented in the received sensor data or transfer data, the message transferring unit 213 determines that the relevant distributed application is in execution. If the relevant distributed application is in execution, the message transferring unit 213 forwards the processing to operation S184. Furthermore, if the relevant distributed application is not in execution, the message transferring unit 213 ends the distributed application execution and data transfer processing.

[Operation S184] The message transferring unit 213 transfers the received data (sensor data or transfer data) to the application executing unit 214.

[Operation S185] The application executing unit 214 processes the input data by using the distributed application. For example, the application executing unit 214 transmits the input data to a process that executes the distributed application and receives the processing result as a return value.

[Operation S186] The application executing unit 214 determines whether or not the distributed application that has executed the processing is the distributed application that executes processing last in the distributed application flow. If the distributed application is the last distributed application, the application executing unit 214 forwards the processing to operation S187. Furthermore, if the distributed application is not the last distributed application, the application executing unit 214 forwards the processing to operation S188.

[Operation S187] The application executing unit 214 specifies terminal apparatus of the delivery destination and transmits output data to the message transferring unit 213. Thereafter, the processing is forwarded to operation S189.

[Operation S188] The application executing unit 214 adds the application ID of the distributed application executed next to the output data to create transfer data.

[Operation S189] The message transferring unit 213 carries out transmission of the output data to the terminal apparatus of the delivery destination or transmission of the transfer data to the server in which the distributed application executed next is deployed.

The processing represented in FIG. 24 is executed in each server that has received the sensor data or the transfer data. As a result, transfer data is transmitted in communication in which communication coupling is carried out in a range limited in advance as illustrated in FIG. 23. This reduces the amount of communication data in the distributed system.

Third Embodiment

Next, a third embodiment will be described. The third embodiment reduces the amount of traffic in a distributed system by deciding the appropriate inter-adjacent-server communication path by using a history of past deployment servers of distributed applications and transfer delay information between servers. The third embodiment will be described below with focus on a different part from the second embodiment. An element having the similar function as the second embodiment in the third embodiment is given the same symbol as the second embodiment and description of the element is omitted.

In the third embodiment, the center server creates a history of deployment of distributed applications in the respective servers in the past as with the second embodiment. In addition to this, the center server in the third embodiment collects, from each server, measurement results of the transfer delay time with the other servers.

Figure 25:
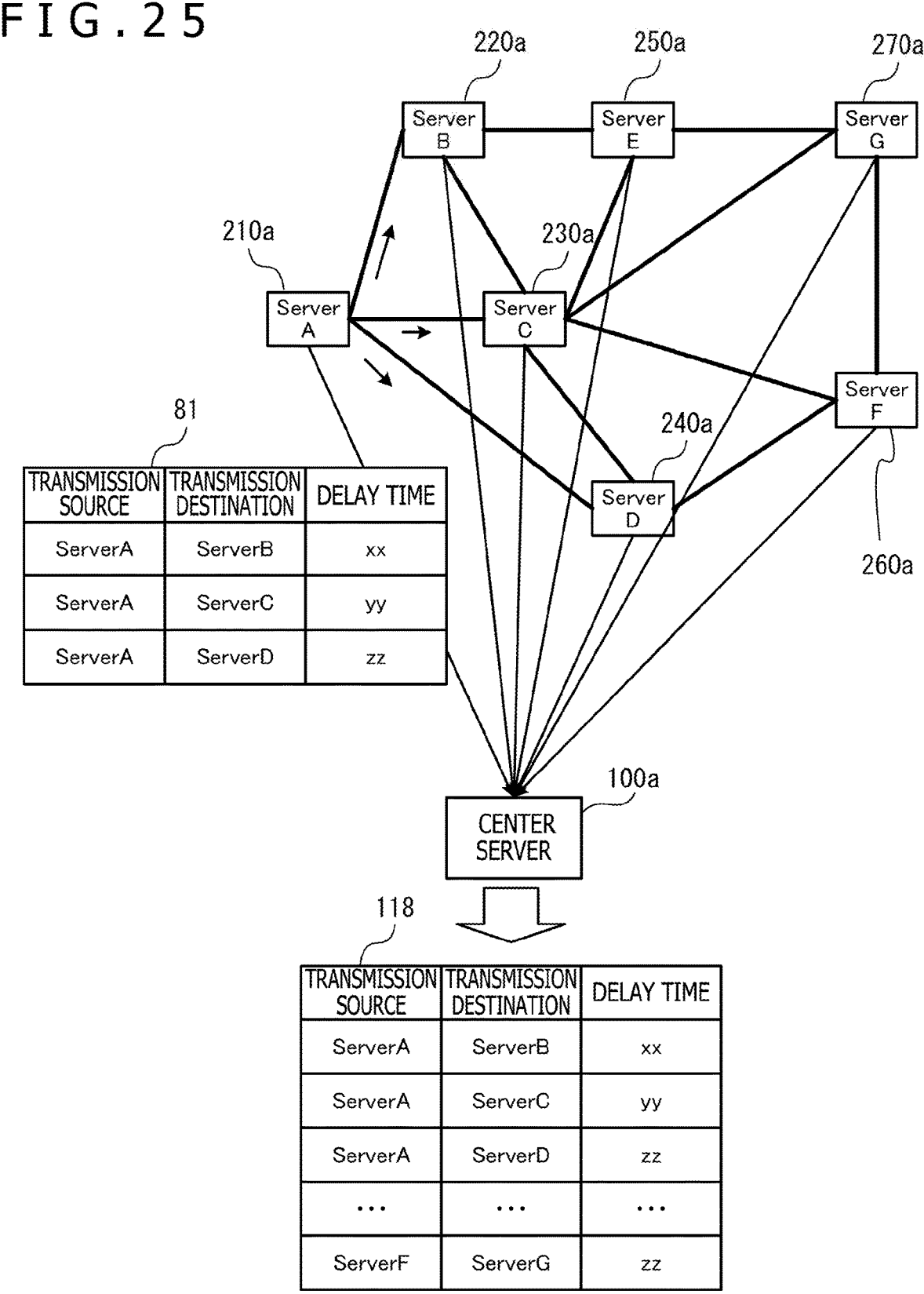
FIG. 25 is a diagram illustrating a collection example of measurement results of transfer delay time.

FIG. 25 is a diagram illustrating a collection example of measurement results of transfer delay time. The respective servers 210*a*, 220*a*, 230*a*, 240*a*, 250*a*, 260*a*, and 270*a* in a distributed system measure the delay times of data transfer with other adjacent servers that may be reached. The delay time is the time from the start of transmission of data with a given size from the transmission source to the completion of reception of all data by the transmission destination, for example. Furthermore, as the delay time, one-way latency when the transmission source transmits data in response to a request from the transmission destination may be used. Moreover, each server may measure the bandwidth of data transfer from the transmission source to the transmission destination (the amount of data transmitted per unit time) and calculate the delay time from the bandwidth.

For example, the server 210a measures the delay times with the servers 220a, 230a, and 240a. The server 210a transmits a transfer delay measurement result 81 including the delay times of data transfer with the respective servers to a center server 100a. The other servers 220a, 230a, 240a, 250a, 260a, and 270a also transmit the transfer delay measurement result including the measured delay times to the center server 100a similarly.

The center server 100a generates inter-server transfer delay information 118 based on the collected transfer delay measurement results. In the inter-server transfer delay information 118, the delay time when data is transferred from the server of the transmission source to the server of the transmission destination is set in association with the set of the server name of the transmission source and the server name of the transmission destination.

Furthermore, regarding each distributed application, the center server 100a deems the server having the highest deployment frequency (the number of times of deployment) as the starting point and decides the communication path with which the transfer delay is the shortest regarding each of the communication paths from the server of the starting point to the other servers. Then, the center server 100a employs the inter-adjacent-server communication path on the decided communication path as the inter-adjacent-server communication path for transferring output data of the corresponding distributed application.

Figure 26:
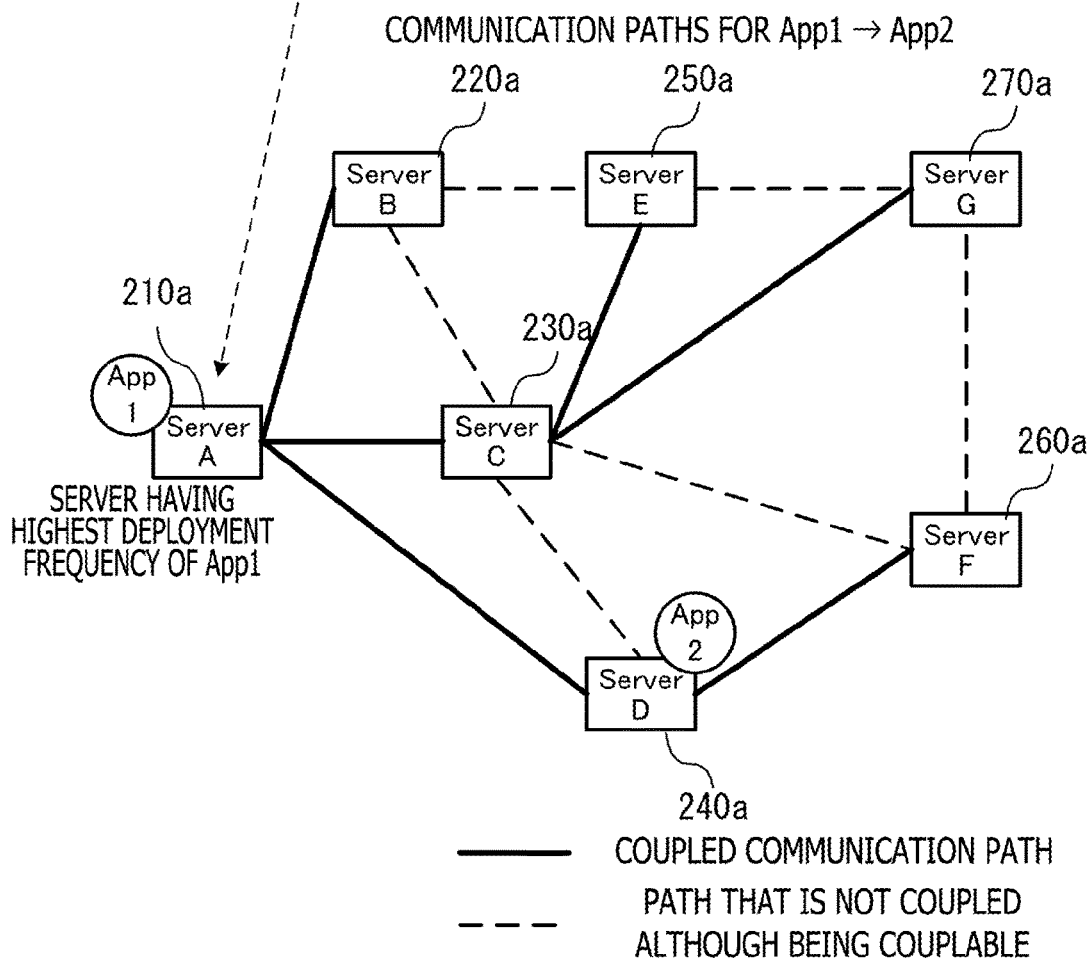
FIG. 26 is a diagram illustrating a first example of coupling of communication paths according to a delay time of data transfer from a server of a starting point.

FIG. 26 is a diagram illustrating a first example of coupling of communication paths according to a delay time of data transfer from a server of a starting point. In FIG. 26, a coupling example of the inter-adjacent-server communication paths for transferring transfer data to the distributed application "App2" including output data from the distributed application "App1" is illustrated. Suppose that the server 210a (server name "Server A") has the highest deployment frequency of the distributed application "App1" in the distributed application deployment destination history 117.

In this case, the center server 100a deems the server 210a as the starting point server and decides the communication path with which the delay time of data transfer is the shortest regarding each of the communication paths from the server 210a to the other servers 220a, 230a, 240a, 250a, 260a, and 270a. For example, as the communication paths from the server 210a to the server 240a, there are the directly-coupled path, the path that passes through the server 230a, and the path that passes through the server 230a and the server 260a.

The center server 100a refers to the inter-server transfer delay information 118 and calculates the total delay time of the respective paths. For example, in the case of the path on which data is transferred from the server 210a to the server 240a directly, the delay time corresponding to the set of the transmission source "Server A" and the transmission destination "Server D" is the delay time of the path.

Furthermore, in the case of the path on which data is transferred from the server 210a to the server 240a via the server 230a, plural delay times are calculated. For example, the total of the delay time corresponding to the set of the transmission source "Server A" and the transmission destination "Server C" and the delay time corresponding to the set of the transmission source "Server C" and the transmission destination "Server D" is the delay time of the path.

The center server 100a decides the communication path with which the delay time of data transfer is the shortest regarding each of the communication paths from the server 210a to the other servers 220a, 230a, 240a, 250a, 260a, and 270a. Then, the center server 100a decides the inter-adjacent-server communication path on the decided communication path as the inter-adjacent-server communication path used for transmission of transfer data.

Figure 27:
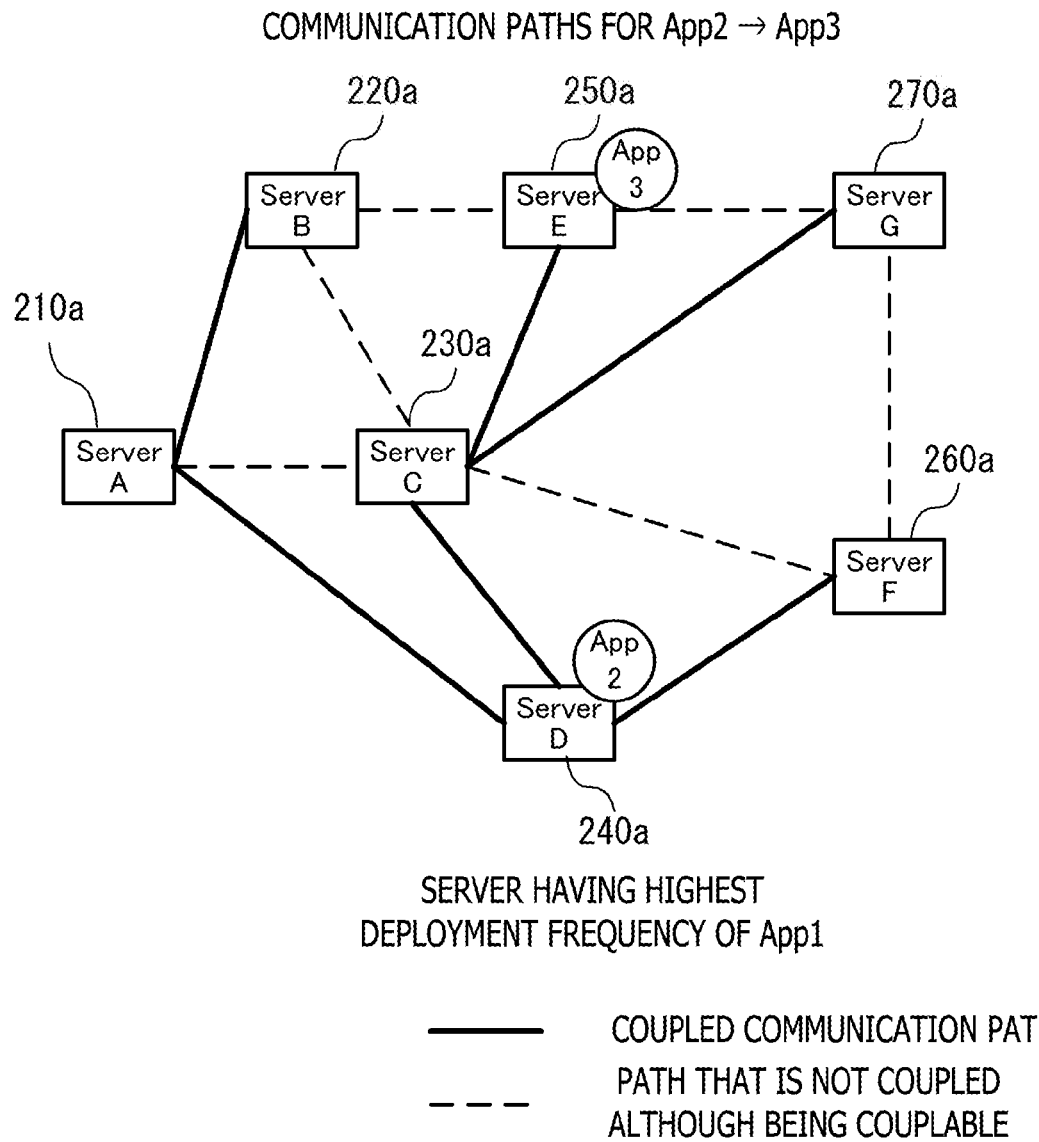
FIG. 27 is a diagram illustrating a second example of coupling of communication paths according to a delay time of data transfer from a server of a starting point.

FIG. 27 is a diagram illustrating a second example of coupling of communication paths according to a delay time of data transfer from a server of a starting point. In FIG. 27, a coupling example of the inter-adjacent-server communication paths for transferring transfer data to the distributed application "App3" including output data from the distributed application "App2" is illustrated. Suppose that the server 240a (server name "Server D") has the highest deployment frequency of the distributed application "App2" in the distributed application deployment destination history 117.

In this case, the center server 100a deems the server 240a as the starting point server and decides the communication path with which the delay time of data transfer is the shortest regarding each of the communication paths from the server 240a to the other servers 210a, 220a, 230a, 250a, 260a, and 270a. Then, the center server 100a decides the inter-adjacent-server communication path on the communication path with which the delay time of data transfer is the shortest as the inter-adjacent-server communication path used for transmission of transfer data to the relevant server.

Figure 28:
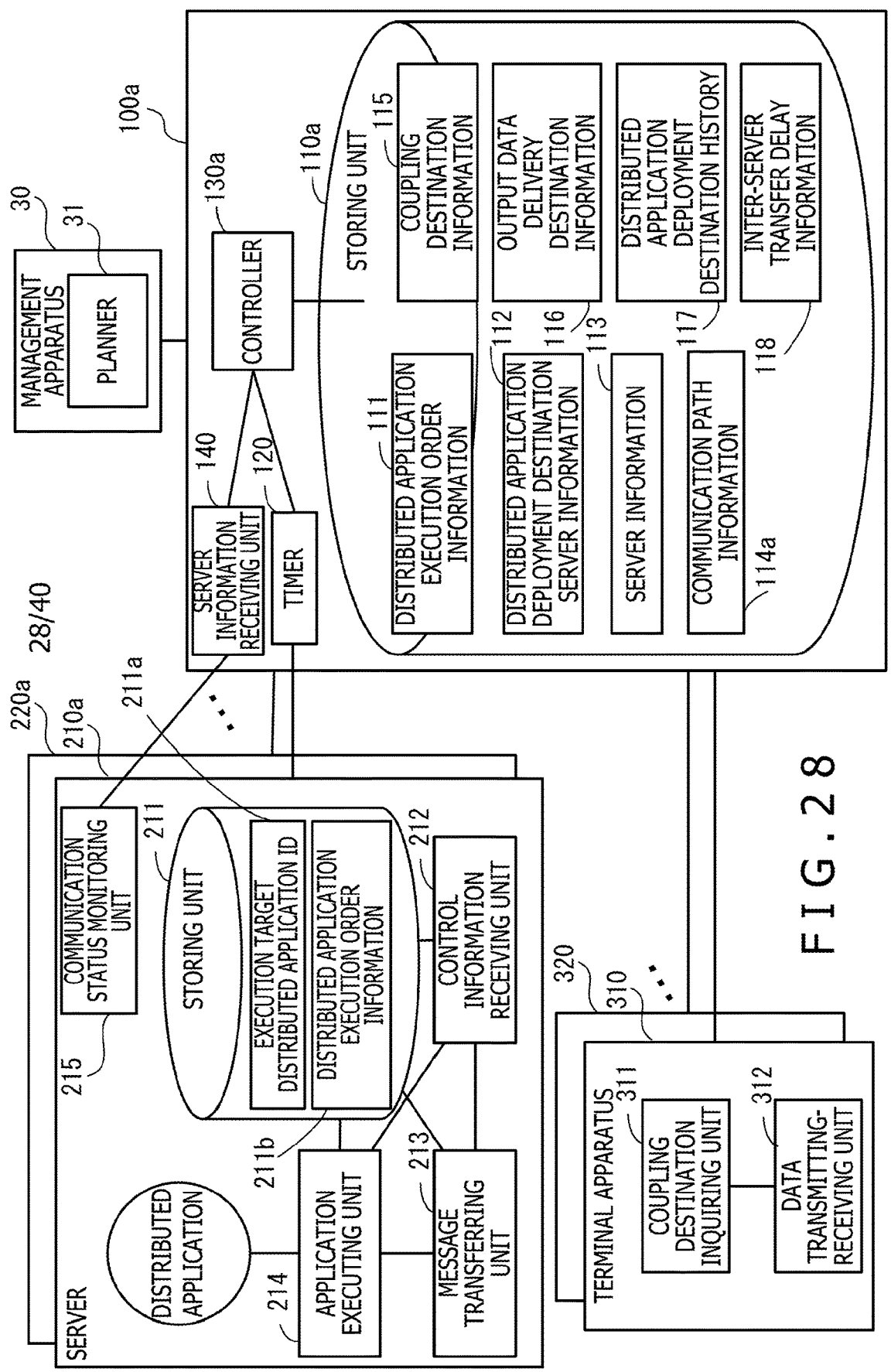
FIG. 28 is a diagram illustrating one example of functions of respective pieces of apparatus in a third embodiment.

FIG. 28 is a diagram illustrating one example of functions of respective pieces of apparatus in a third embodiment. The server 210a in the third embodiment includes a communication status monitoring unit 215 in addition to the functions possessed by the server 210 in the second embodiment illustrated in FIG. 5. The communication status monitoring unit 215 measures the delay time of data transfer from the server 210a to the other servers. Then, the communication status monitoring unit 215 transmits the transfer delay measurement result 81 (see FIG. 25) to the center server 100a. The other servers 220a, . . . also have the similar functions as the server 210a.

The center server 100a in the third embodiment includes a server information receiving unit 140 in addition to the functions possessed by the center server 100 in the second embodiment illustrated in FIG. 5. The server information receiving unit 140 collects the transfer delay measurement results from the respective servers 210a, 220a, . . . . The server information receiving unit 140 transfers the collected transfer delay measurement results to a controller 130a.

When acquiring the transfer delay measurement results of the respective servers 210a, 220a, . . . from the server information receiving unit 140, the controller 130a in the third embodiment generates the inter-server transfer delay information 118. Then, the controller 130a stores the generated inter-server transfer delay information 118 in a storing unit 110a.

Figure 29:
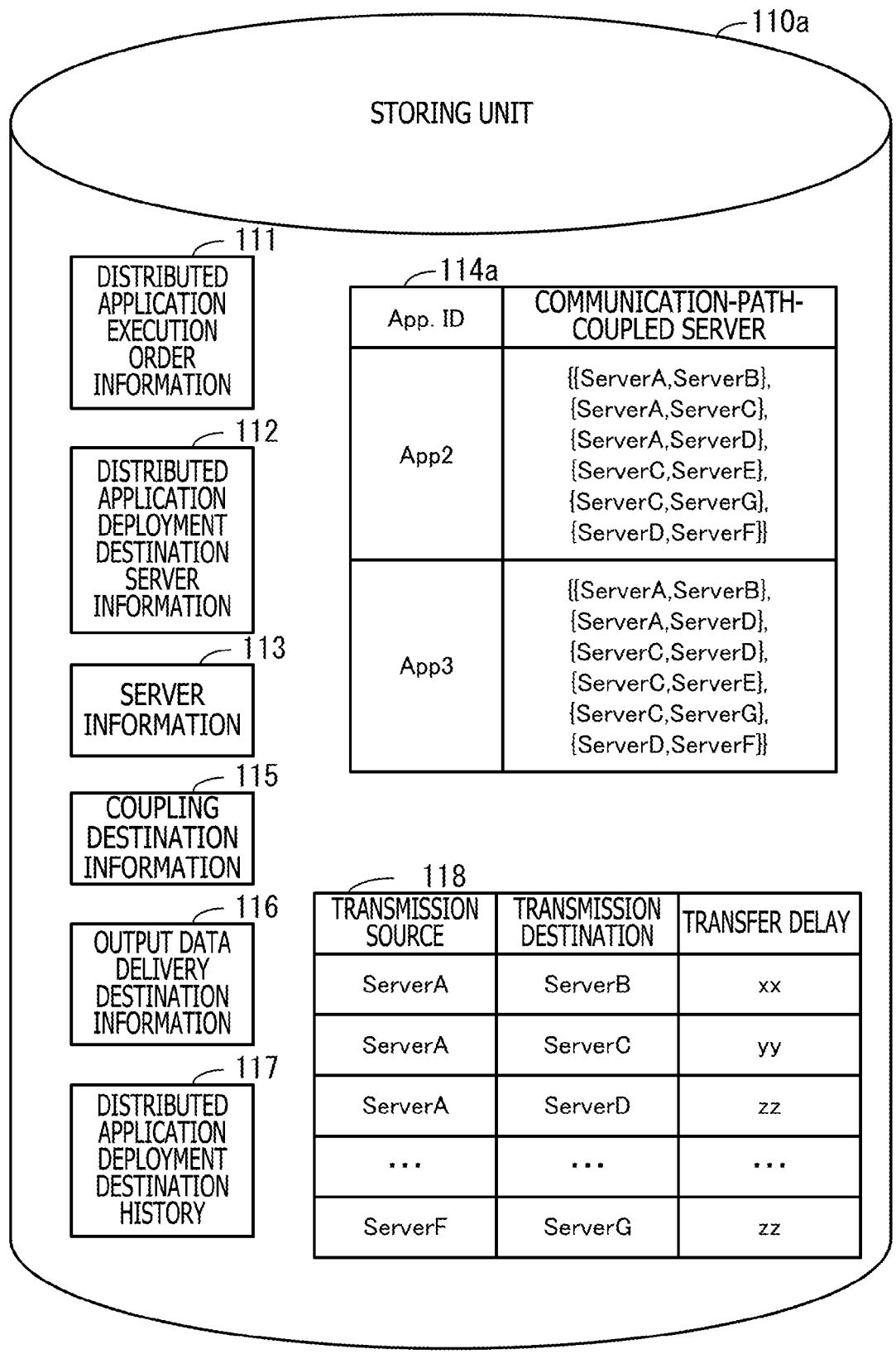
FIG. 29 is a diagram illustrating one example of information stored in a storing unit of a center server in the third embodiment.

FIG. 29 is a diagram illustrating one example of information stored in a storing unit of the center server in the third embodiment. The information other than communication path information 114a and the inter-server transfer delay information 118 in the information stored in the storing unit 110a has the similar contents as the information with the same name (see FIG. 6) represented in the second embodiment. Furthermore, the contents of the inter-server transfer delay information 118 are as represented in FIG. 25. In the communication path information 114a in the third embodiment, the sets of the server names of the servers at both ends of the inter-adjacent-server communication path of the coupling target are set in association with the application ID of the distributed application.

Figure 30:
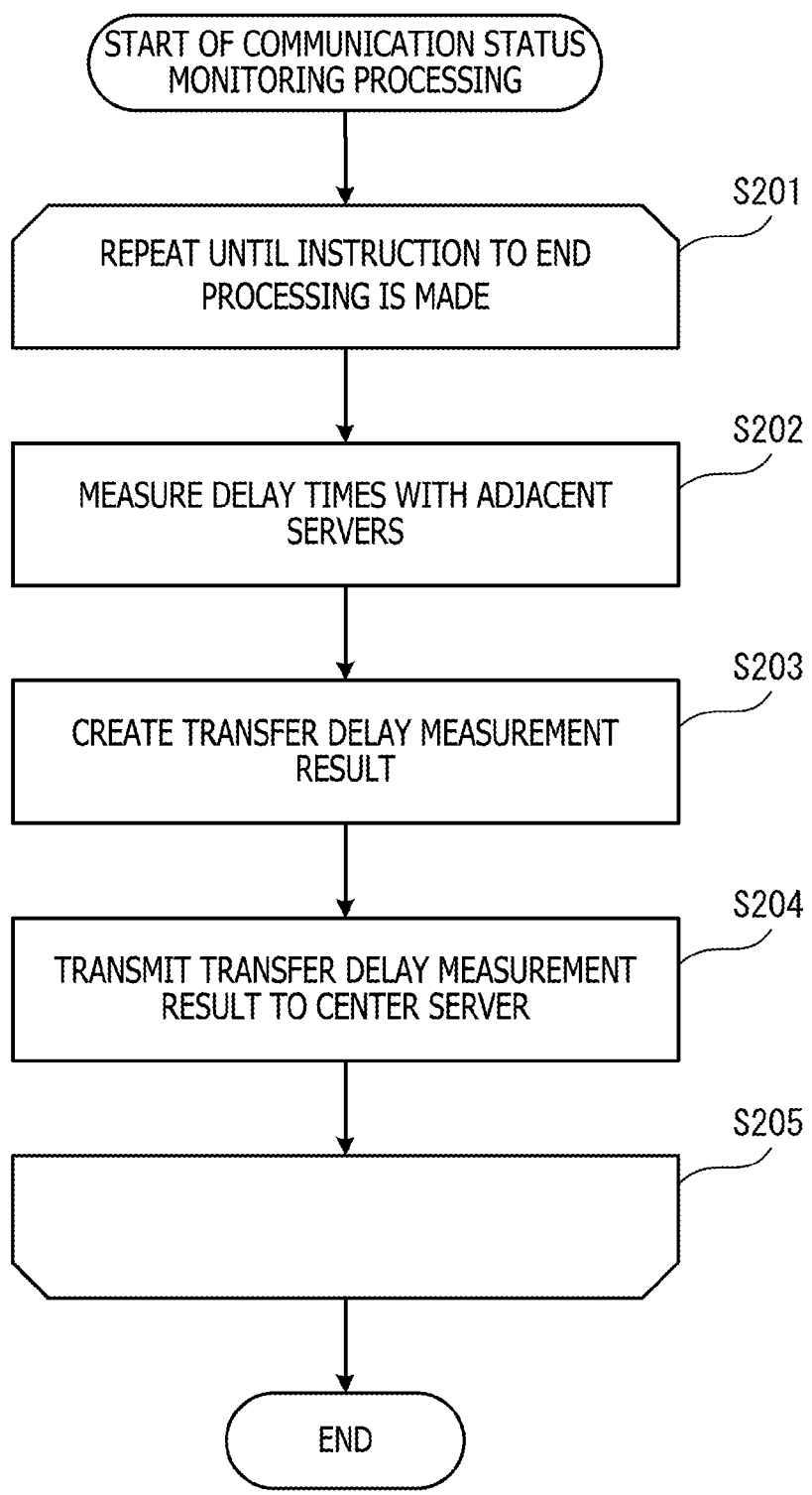
FIG. 30 is a flowchart illustrating one example of a procedure of communication status monitoring processing in a server.

Next, different processing from the second embodiment in the third embodiment will be described with reference to a flowchart. FIG. 30 is the flowchart illustrating one example of a procedure of communication status monitoring processing in a server. In the following, the case in which the server 210a executes the processing will be assumed and the processing represented in FIG. 30 will be described along the operation number.

[Operation S201] The communication status monitoring unit 215 repeats processing of operations S202 to S204 until an instruction to end the processing is made.

[Operation S202] The communication status monitoring unit 215 measures the delay times of communication with adjacent servers.

[Operation S203] The communication status monitoring unit 215 creates the transfer delay measurement result 81 (see FIG. 25).

[Operation S204] The communication status monitoring unit 215 transmits the transfer delay measurement result 81 to the center server 100a.

[Operation S205] The communication status monitoring unit 215 ends the communication status monitoring processing if an instruction to end the processing is input.

In this manner, the delay times are measured in the server 210a. The delay times are measured also in the other servers 220a, 230a, 240a, 250a, 260a, and 270a similarly. Every time the transfer delay measurement result including the measured delay times is received, the controller 130a executes inter-server delay time information update processing.

Figure 31:
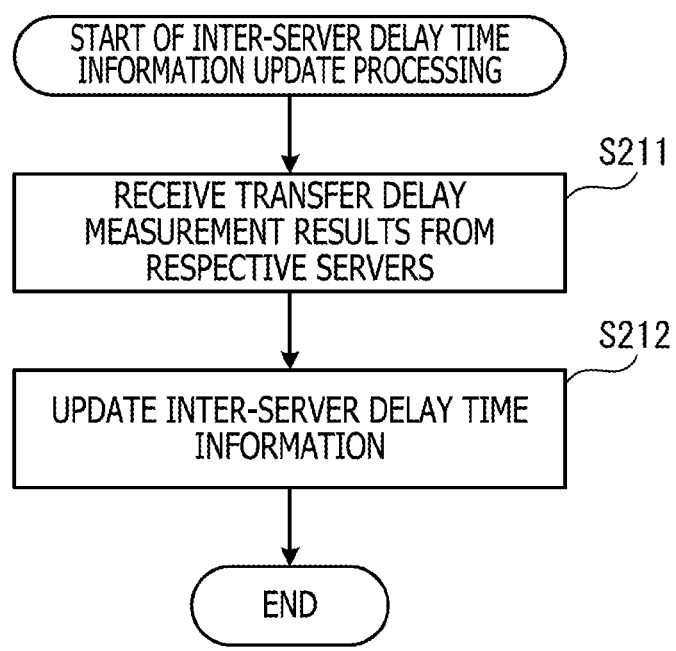
FIG. 31 is a flowchart illustrating one example of a procedure of inter-server delay time information update processing in the third embodiment.

FIG. 31 is a flowchart illustrating one example of a procedure of inter-server delay time information update processing in the third embodiment. The processing represented in FIG. 31 will be described below along the operation number.

[Operation S211] The controller 130a receives the transfer delay measurement results from the respective servers.

[Operation S212] The controller 130a updates the delay time of the part corresponding to the received transfer delay measurement results in the inter-server transfer delay information 118.

In this manner, the inter-server transfer delay information 118 is updated and the latest delay times are registered. Next, the procedure of communication path decision processing in the third embodiment will be described.

Figure 32:
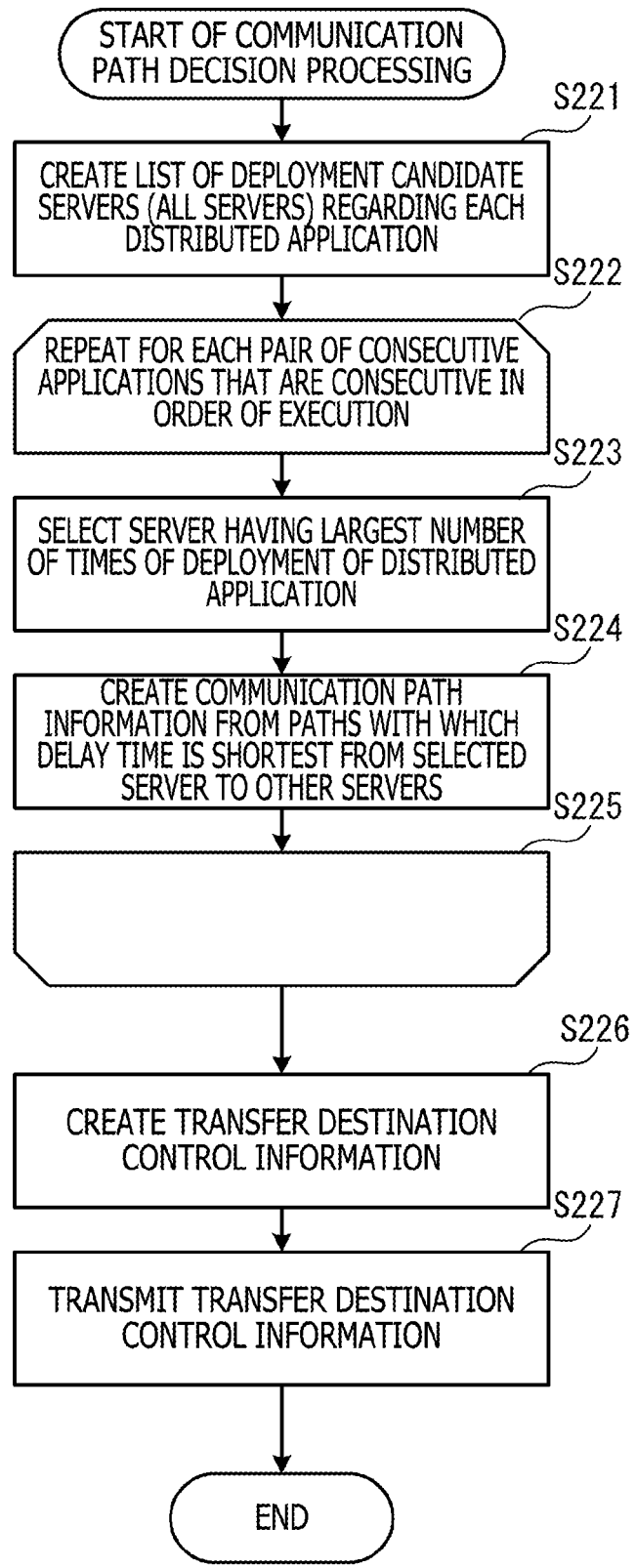
FIG. 32 is a flowchart illustrating one example of a procedure of communication path decision processing in the third embodiment.

FIG. 32 is a flowchart illustrating one example of a procedure of communication path decision processing in the third embodiment. Operations S222 and S225 to S227 in the processing represented in FIG. 32 are the same as the operations S102 and S105 to S107, respectively, of the communication path decision processing in the second embodiment represented in FIG. 12. Operations S221, S223, and S224 different from the second embodiment will be described below.

[Operation S221] The controller 130a creates a list of deployment candidate servers regarding each distributed application. The deployment candidate servers of distributed applications in the third embodiment are all servers in the distributed system. Then, the controller 130a puts together the deployment candidate servers of the respective distributed applications to create distributed application deployment destination candidate information.

[Operation S223] The controller 130a refers to the distributed application deployment destination history 117 and, regarding the distributed application that is earlier in the order of execution in the consecutive application pair of the processing target (two distributed applications that are consecutive in the order of execution), selects the server having the largest number of times of deployment from the deployment candidate servers of the distributed application.

[Operation S224] The controller 130a obtains the paths with which the delay time is the shortest from the selected server to a respective one of the other servers. The path with which the delay time is the shortest may be decided by the Dijkstra's algorithm, for example. Next, the controller 130a creates communication path information corresponding to the consecutive application pair of the processing target based on the paths with which the delay time is the shortest. For example, the controller 130a identifies pairs of adjacent servers (adjacent server pairs) on the path of the shortest delay time to the respective one of the other servers. Then, the controller 130a associates the identified adjacent server pairs with the application ID of the distributed application that is later in the order of execution in the consecutive application pair of the processing target and sets the adjacent server pairs in the communication path information 114a.

In this manner, the communication path information 114a like that represented in FIG. 29 is created. Then, transfer destination control information to be transmitted to each server is created based on the communication path information 114a and is transmitted to the corresponding servers.

Figure 33:
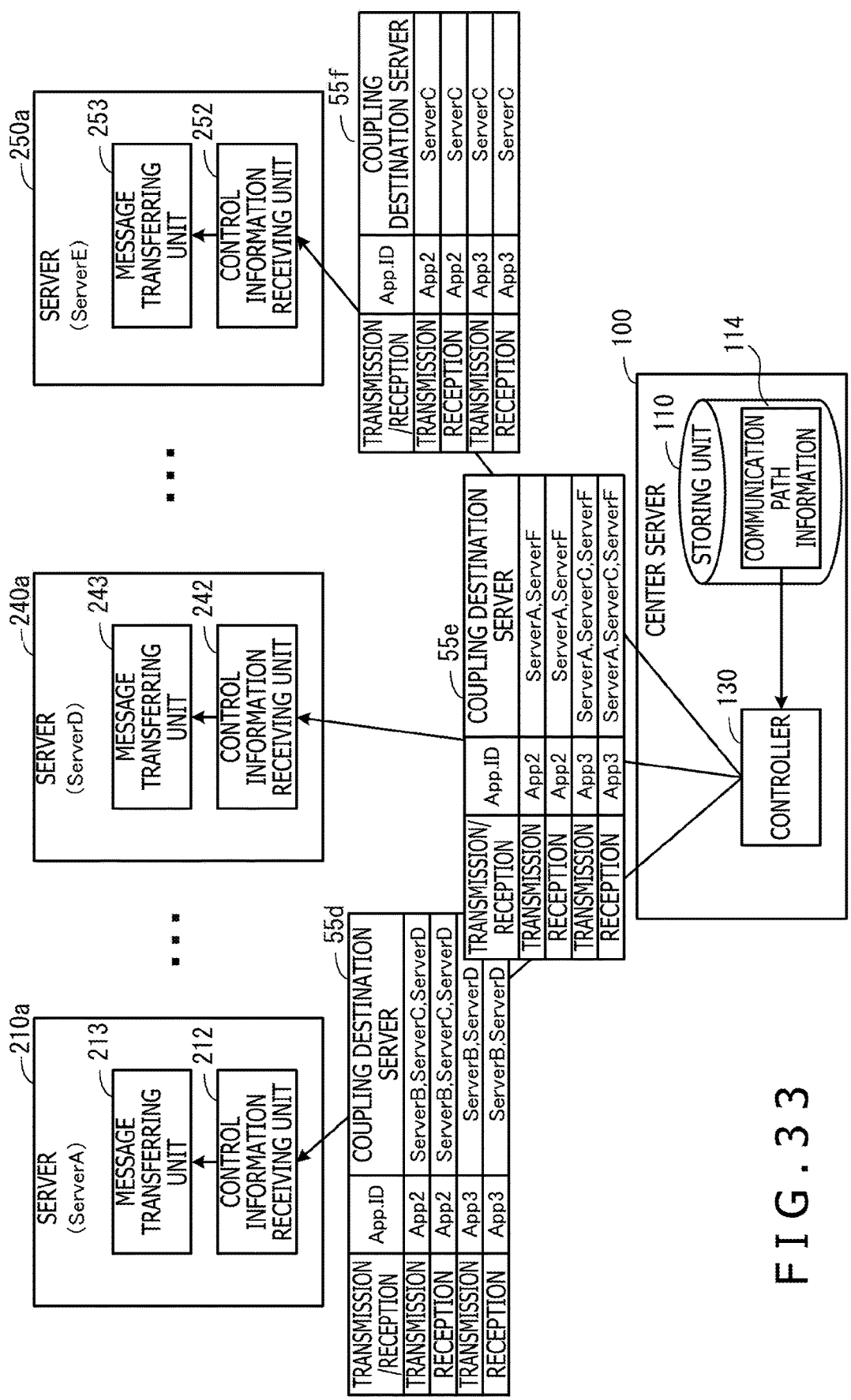
FIG. 33 is a diagram illustrating one example of transfer destination control information in the third embodiment.

FIG. 33 is a diagram illustrating one example of transfer destination control information in the third embodiment. In FIG. 33, pieces of transfer destination control information 55d, 55e, and 55f for causing the servers 210a, 240a, and 250a to carry out the communication coupling of the inter-adjacent-server communication paths represented in FIG. 26 and FIG. 27 are represented. Also to the servers that are not illustrated in FIG. 33, the corresponding transfer destination control information is transmitted.

Transmitting such transfer destination control information may cause the respective servers to carry out the communication coupling of the inter-adjacent-server communication paths illustrated in FIG. 26 and FIG. 27.

In the third embodiment, differently from the second embodiment, communication coupling is carried out to all servers although the communication path is limited to one system. Thus, change processing of the communication path does not have to be executed even when the deployment destination of the distributed application is changed by the distributed application deployment processing.

Figure 34:
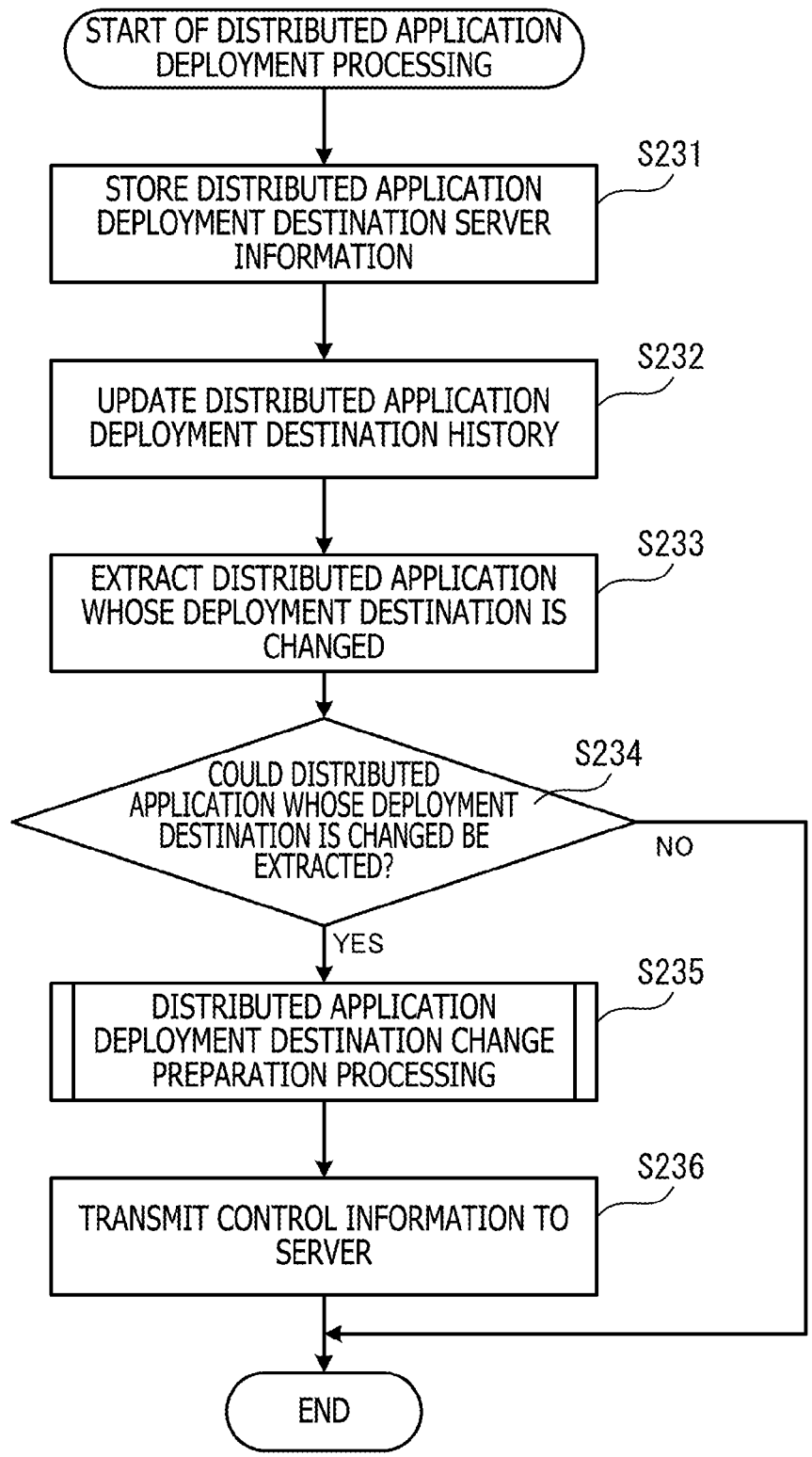
FIG. 34 is a flowchart illustrating one example of a procedure of distributed application deployment processing in the third embodiment.

FIG. 34 is a flowchart illustrating one example of a procedure of distributed application deployment processing in the third embodiment. Operations S231 to S236 in the processing represented in FIG. 34 are the same as the operations S121 to S124, S126, and S127, respectively, of the distributed application deployment processing in the second embodiment represented in FIG. 15. The difference is that the communication path update processing (operation S125) executed in the second embodiment is not executed in the third embodiment.

As above, in the third embodiment, communication coupling is carried out with the inter-adjacent-server communication paths on communication paths with short delay time and thus improvement in the efficiency of the processing is intended.

Fourth Embodiment

Next, a fourth embodiment will be described. The fourth embodiment determines whether or not to make a coupling in each communication direction based on the deployment history of the distributed application regarding the communication coupling. For example, in the second and third embodiments, a coupling is made in such a manner that bidirectional communication is possible regarding an inter-adjacent-server communication path decided to be subjected to a communication coupling. However, in some cases, usefulness is low regarding communication in one direction in this bidirectional communication from the past deployment status of the distributed application. By keeping a communication coupling from being made regarding the communication direction in which usefulness is low, transmission of useless transfer data may be suppressed and the amount of communication data on the network may be reduced. In the following, the fourth embodiment will be described with focus on the different point from the third embodiment. An element having the similar function as the third embodiment in the fourth embodiment is given the same symbol as the third embodiment and description of the element is omitted.

In the fourth embodiment, the center server creates a history of deployment of distributed applications in the respective servers in the past as with the third embodiment. In addition, the center server collects, from each server, measurement results of the transfer delay time with the other servers. Then, as with the third embodiment, the center server deems the server having the highest deployment frequency of the distributed application as the starting point server and identifies the communication path with which the delay time of data transfer is the shortest among the communication paths from the starting point server to the other servers.

In the fourth embodiment, the center server pays attention to each server on the communication path with which the delay time of data transfer is the shortest and determines whether or not a track record of deployment of the distributed application executed next exists in servers that may be reached by tracing from the server to the terminal of the communication path. If a deployment track record does not exist, the center server limits the transfer direction of data to one direction regarding the path on the terminal side relative to the server to which the attention is paid, and creates communication path information.

Figure 35:
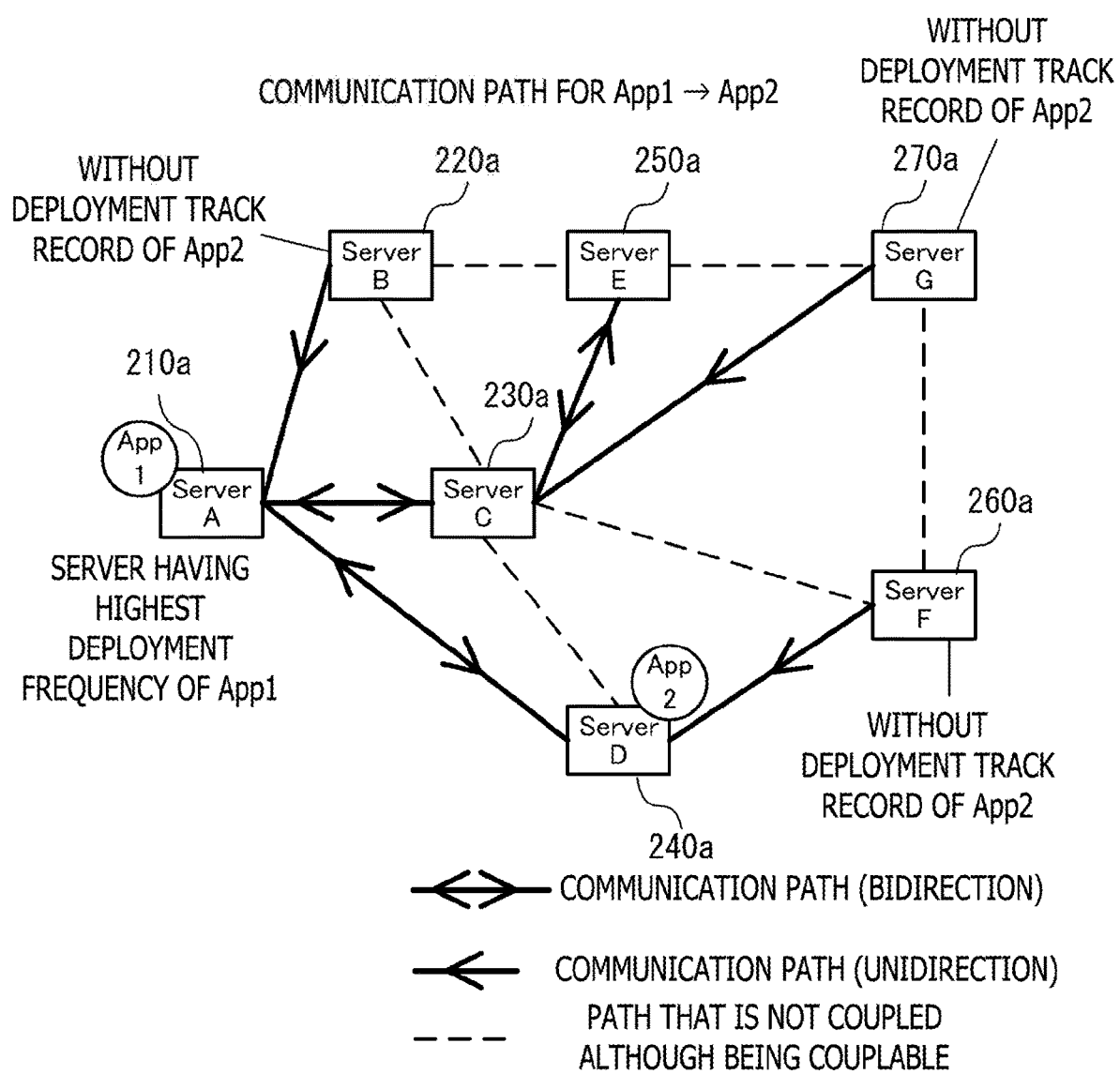
FIG. 35 is a diagram illustrating a first example of communication path coupling in which a transfer direction of data is limited to one direction.

FIG. 35 is a diagram illustrating a first example of communication path coupling in which a transfer direction of data is limited to one direction. In FIG. 35, a coupling example of inter-adjacent-server communication paths for transferring transfer data to the distributed application "App2" including output data from the distributed application "App1" is illustrated. In the example of FIG. 35, the server having the highest deployment frequency of the distributed application "App1" is the server 210a and the server 210a servers as the starting point server. Furthermore, suppose that a deployment track record of the distributed application "App2" does not exist in the servers 220a, 260a, and 270a.

In this case, for example, regarding the inter-adjacent-server communication path that couples the server 210a as the starting point server and the server 220a, it is sufficient to carry out a communication coupling in the communication direction from the server 220a to the server 210a because a deployment track record of the distributed application "App2" does not exist in the server 220a. For this reason, a communication coupling of only one direction from the server 220a to the server 210a is carried out on the inter-adjacent-server communication path that couples the server 210a and the server 220a.

Similarly, because a deployment track record of the distributed application "App2" does not exist in the server 260a, a communication coupling of only one direction from the server 260a to the server 240a is carried out on the inter-adjacent-server communication path that couples the server 240a and the server 260a. Furthermore, because a deployment track record of the distributed application "App2" does not exist in the server 270a, a communication coupling of only one direction from the server 270a to the server 230a is carried out on the inter-adjacent-server communication path that couples the server 230a and the server 270a.

Figure 36:
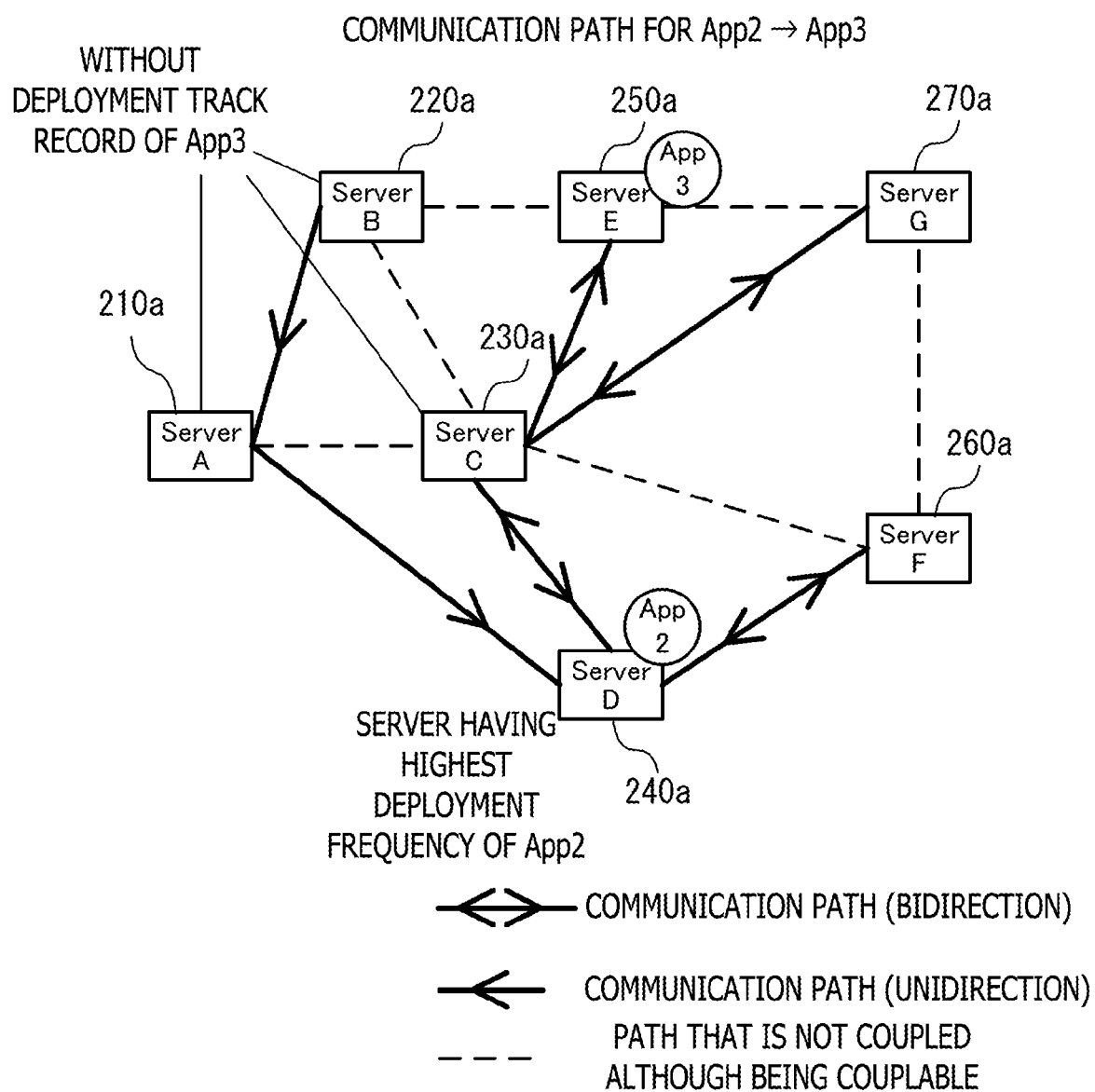
FIG. 36 is a diagram illustrating a second example of communication path coupling in which a transfer direction of data is limited to one direction.

FIG. 36 is a diagram illustrating a second example of communication path coupling in which a transfer direction of data is limited to one direction. In FIG. 36, a coupling example of inter-adjacent-server communication paths for transferring transfer data to the distributed application "App3" including output data from the distributed application "App2" is illustrated. In the example of FIG. 36, the server having the highest deployment frequency of the distributed application "App2" is the server 240a and the server 240a servers as the starting point server. Furthermore, suppose that a deployment track record of the distributed application "App3" does not exist in the servers 210a, 220a, and 230a.

In this case, because a deployment track record of the distributed application "App3" does not exist in the server 220a, a communication coupling of only one direction from the server 220a to the server 210a is carried out on the inter-adjacent-server communication path that couples the server 210a and the server 220a. Furthermore, because a deployment track record of the distributed application "App3" exists in neither the server 210a nor the server 220a, a communication coupling of only one direction from the server 210a to the server 240a is carried out on the inter-adjacent-server communication path that couples the server 240a and the server 210a.

Figure 37:
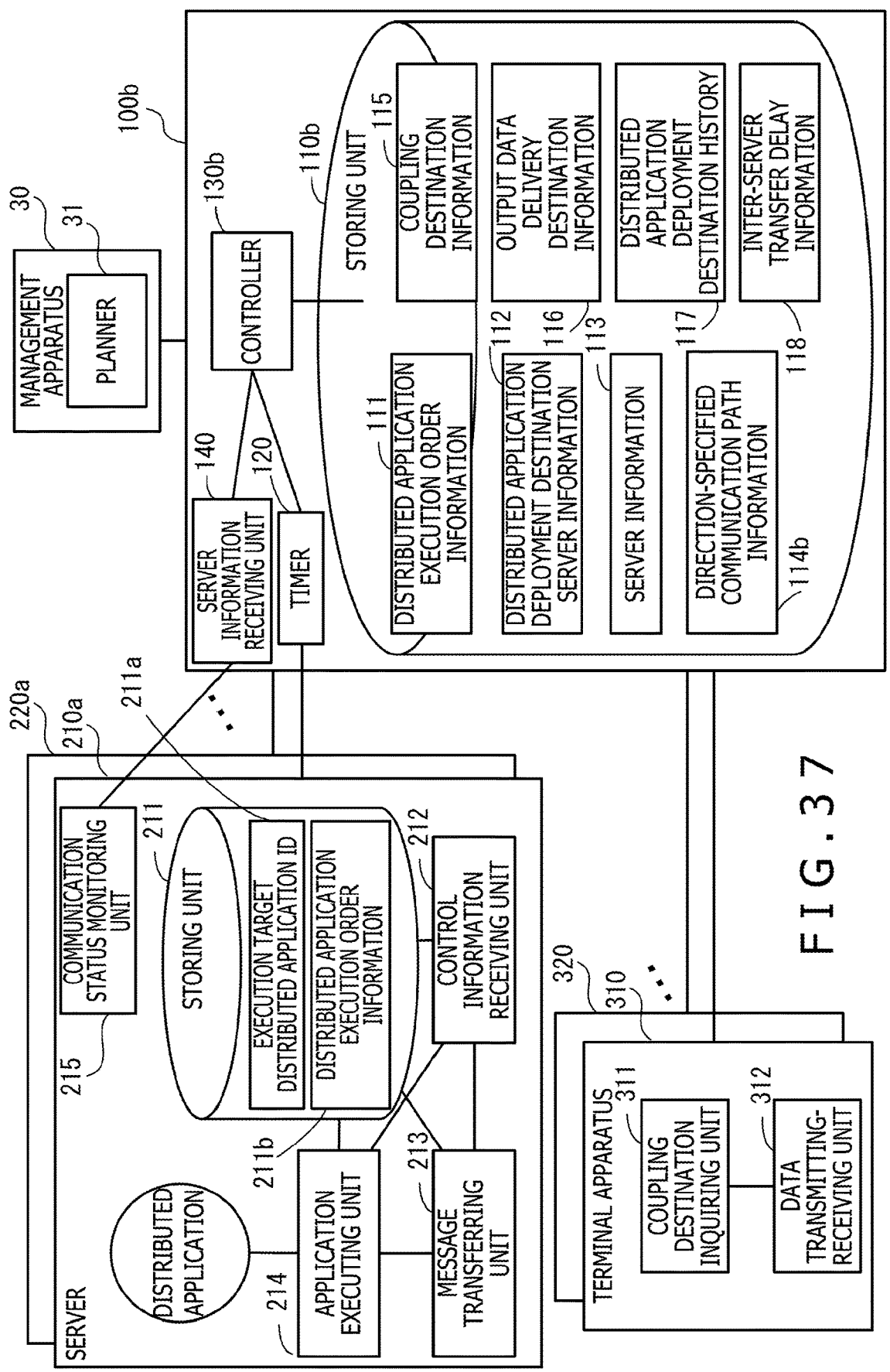
FIG. 37 is a diagram illustrating one example of functions of respective pieces of apparatus in a fourth embodiment.

FIG. 37 is a diagram illustrating one example of functions of respective pieces of apparatus in the fourth embodiment. A storing unit 110b of the center server 100b in the fourth embodiment includes direction-specified communication path information 114b instead of the communication path information 114a in the third embodiment illustrated in FIG. 28.

Figure 38:
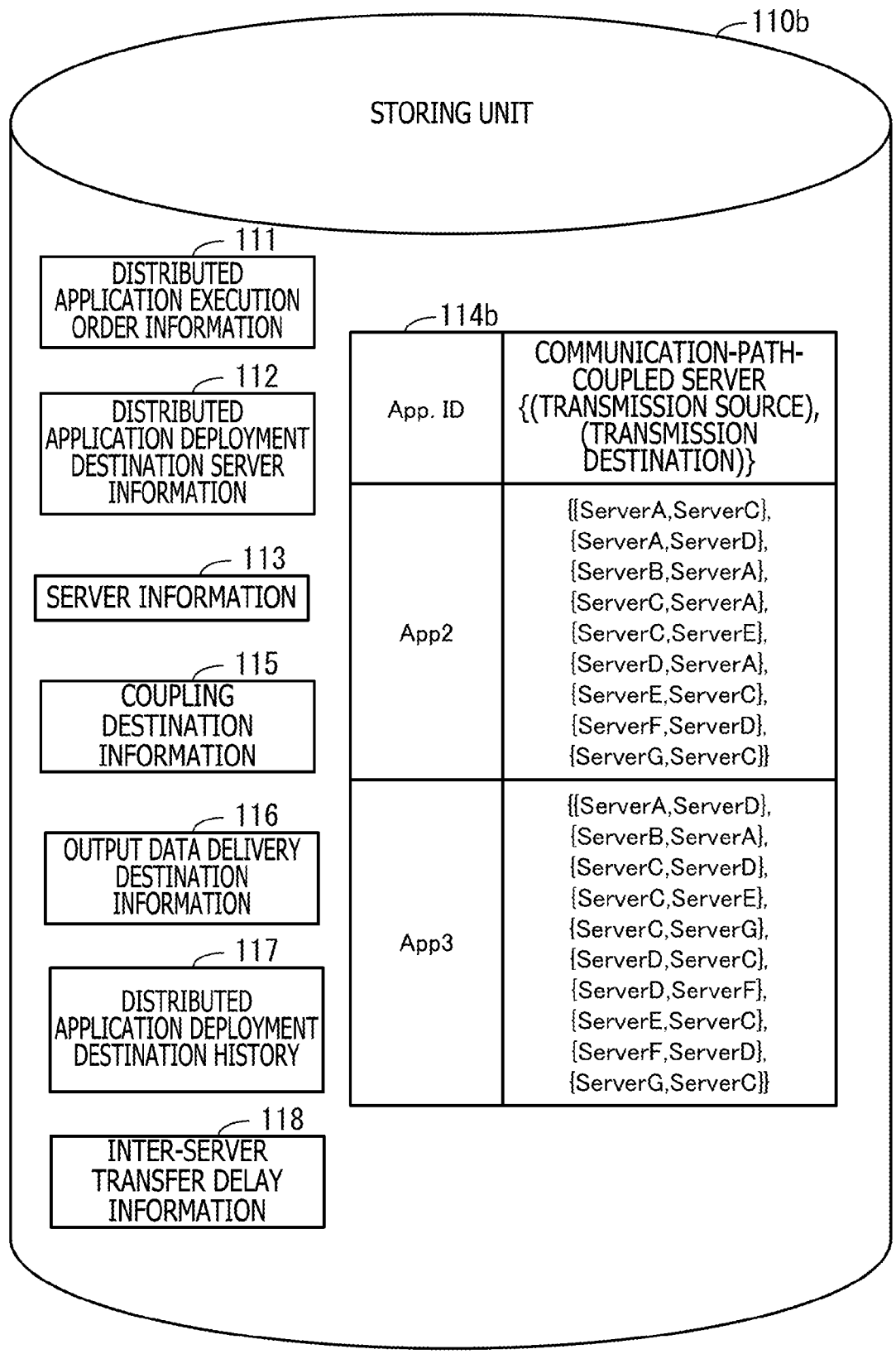
FIG. 38 is a diagram illustrating one example of information stored in a storing unit of a center server in the fourth embodiment.

FIG. 38 is a diagram illustrating one example of information stored in a storing unit of a center server in the fourth embodiment. In the direction-specified communication path information 114b, the sets of the server name of the server as the transmission source and the server name of the server as the transmission destination are set in association with the application ID of the distributed application. In the example of FIG. 38, in two server names that form a set, the left server name represents the server of the transmission source and the right server name represents the server of the transmission destination.

Figure 39:
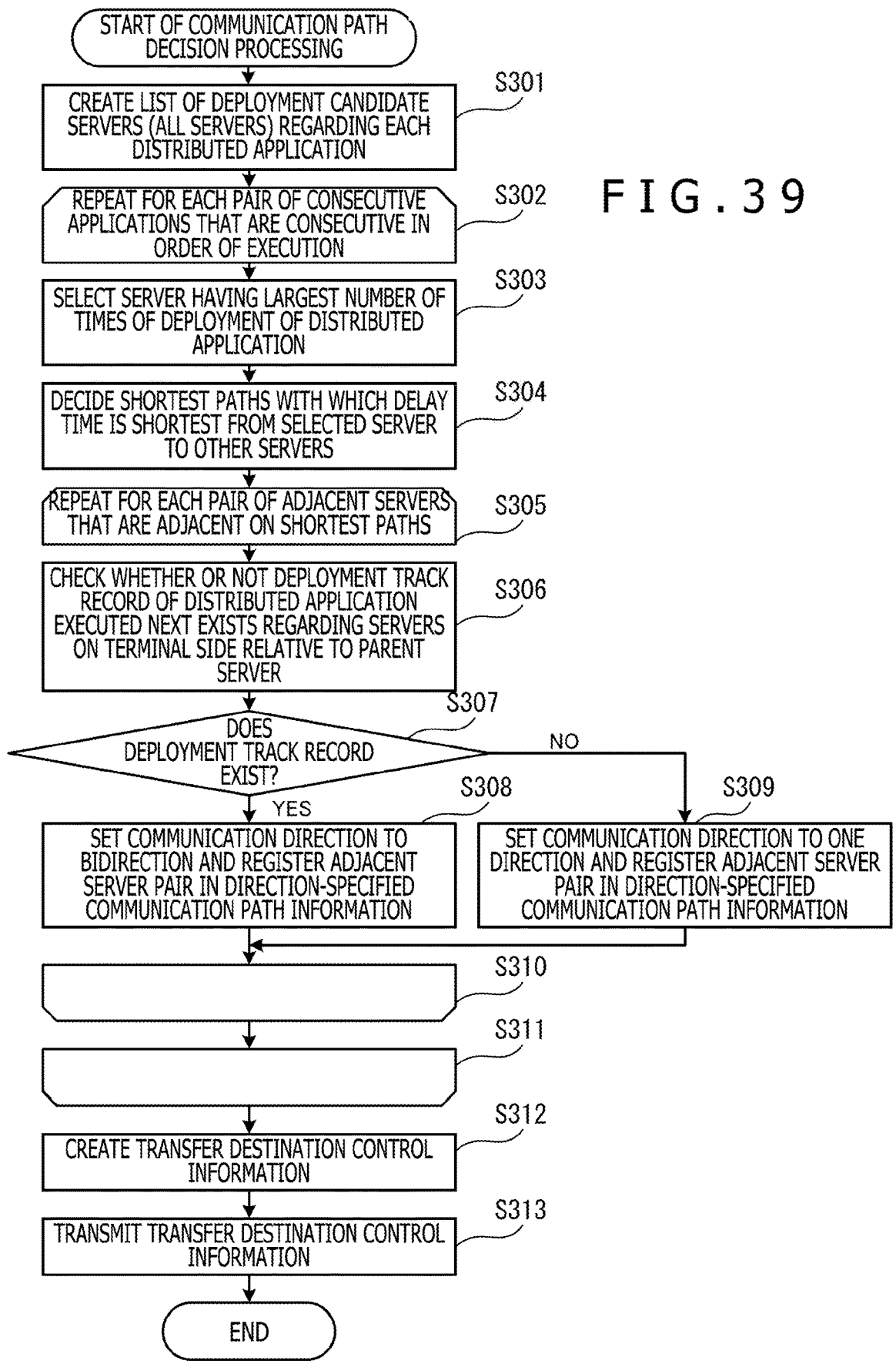
FIG. 39 is a flowchart illustrating one example of a procedure of communication path decision processing in the fourth embodiment.

Next, the procedure of communication path decision processing by a controller 130b of the fourth embodiment will be described in detail. FIG. 39 is a flowchart illustrating one example of a procedure of communication path decision processing in the fourth embodiment. Operations S301 to S303 and S311 to S313 in the processing represented in FIG. 39 are the same as the operations S221 to S223 and S225 to S227, respectively, in the communication path decision processing in the third embodiment represented in FIG. 32. Operations S304 to S310 different from the third embodiment will be described below.

[Operation S304] The controller 130b obtains the path with which the delay time is the shortest (shortest path) from the server selected in the operation S303 to each of the other servers.

[Operation S305] The controller 130*b* repeats processing of the operations S306 to S309 to execute the processing of the operations S306 to S309 for each pair of adjacent servers that are adjacent on the shortest paths. Here, in the two servers of the adjacent server pair, the server closer to the starting point server on the shortest path is defined as a parent and the server remoter from the starting point server is defined as a child.

[Operation S306] The controller 130*b* refers to the distributed application deployment destination history 117 and checks whether or not a deployment track record of the distributed application executed next exists regarding the servers on the terminal side relative to the patent server in the adjacent server pair (side remoter from the starting point server) on the shortest path.

[Operation S307] The controller 130*b* determines whether or not a deployment track record of the distributed application executed next exists in at least one of the servers on the terminal side relative to the parent server in the adjacent server pair on the shortest path. If a deployment track record exists, the controller 130*b* forwards the processing to the operation S308. Furthermore, if a deployment track record does not exist, the controller 130*b* forwards the processing to the operation S309.

[Operation S308] The controller 130*b* sets the communication direction to the bidirection and associates the adjacent server pair of the processing target with the application ID of the distributed application that is later in the order of processing in the consecutive application pair of the processing target to register the adjacent server pair in the direction-specified communication path information 114*b*. For example, the controller 130*b* registers, in the direction-specified communication path information 114*b*, data including the server name of the parent server of the adjacent server pair as the transmission source and the server name of the child server as the transmission destination. Moreover, the controller 130*b* registers, in the direction-specified communication path information 114*b*, the communication-path-coupled servers including the server name of the child server of the adjacent server pair as the transmission source and the server name of the parent server as the transmission destination. Thereafter, the controller 130*b* forwards the processing to the operation S310.

[Operation S309] The controller 130*b* sets the communication direction to one direction from the parent server to the child server and associates the adjacent server pair of the processing target with the application ID of the distributed application that is later in the order of processing in the consecutive application pair of the processing target to register the adjacent server pair in the direction-specified communication path information 114*b*. For example, the controller 130*b* registers, in the direction-specified communication path information 114*b*, data including the server name of the parent server of the adjacent server pair as the transmission source and the server name of the child server as the transmission destination.

[Operation S310] When the processing of the operations S306 to S309 for all adjacent server pairs on the shortest paths ends, the controller 130*b* forwards the processing to the operation S311.

In this manner, the direction-specified communication path information 114*b* is generated and transfer destination control information is transmitted to each server based on the direction-specified communication path information 114*b*.

Figure 40:
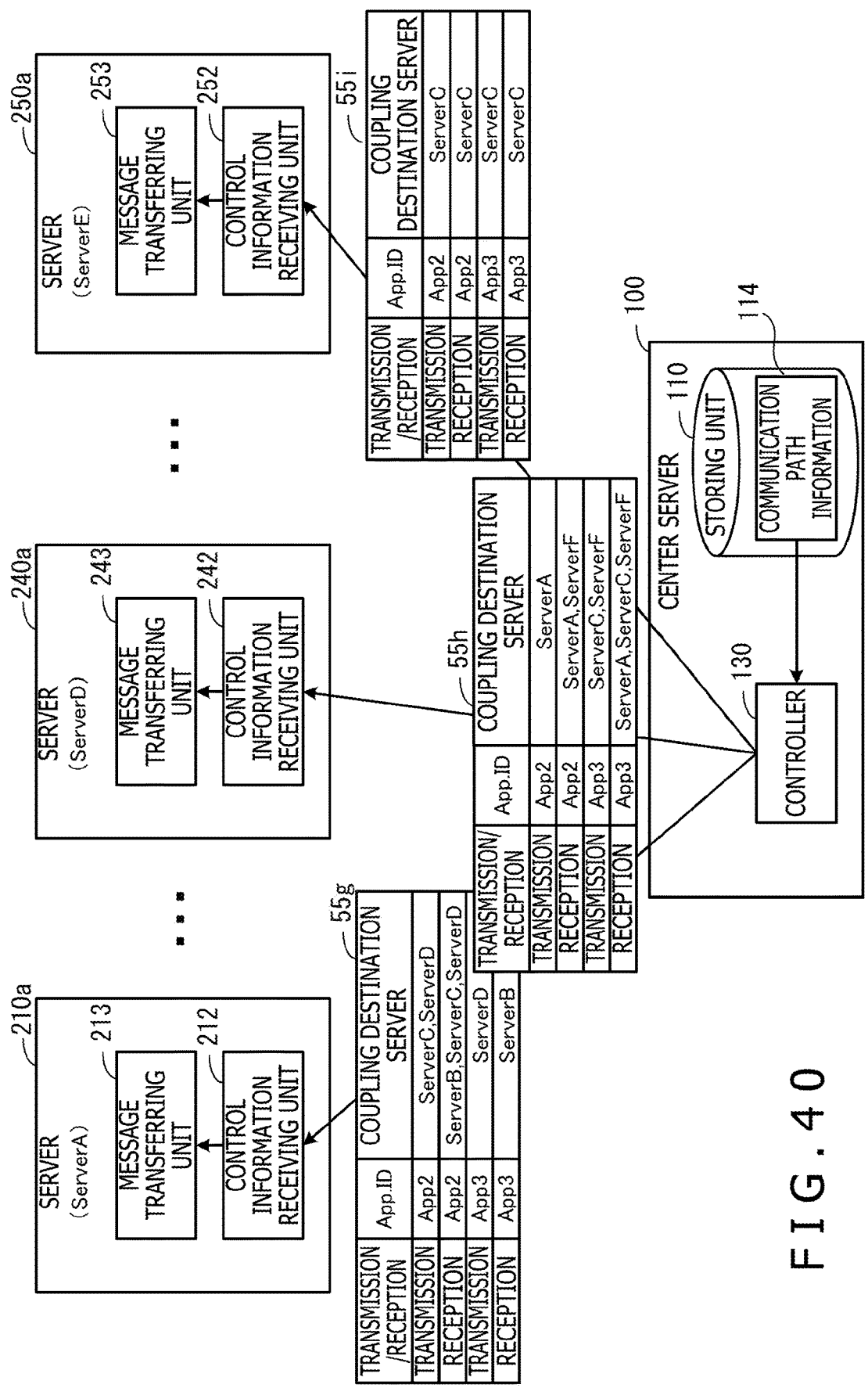
FIG. 40 is a diagram illustrating one example of transfer destination control information in the fourth embodiment.

FIG. 40 is a diagram illustrating one example of transfer destination control information in the fourth embodiment. In FIG. 40, pieces of transfer destination control information 55*g*, 55*h*, and 55*i* for causing the servers 210*a*, 240*a*, and 250*a* to carry out the communication coupling of the communication paths illustrated in FIG. 35 and FIG. 36 are represented. Also to the servers that are not illustrated in FIG. 40, the corresponding transfer destination control information is transmitted.

Transmitting such transfer destination control information may cause the respective servers to carry out the communication coupling of the communication paths illustrated in FIG. 35 and FIG. 36. By causing the respective servers to carry out the communication coupling with limitation of the transmission direction, the transfer amount of transfer data is reduced and the processing efficiency of the distributed system is improved.

Other Embodiments

The second embodiment and the fourth embodiment may be combined. For example, in the case of applying the processing of the second embodiment to the fourth embodiment, the controller 130*b* executes the processing of the operation S101 in FIG. 12 instead of the operation S301 in FIG. 39. Due to this, the deployment candidate servers of each distributed application are limited to servers having a track record of deployment of the distributed application in the past. Furthermore, in the operation S304, the shortest path is obtained only regarding the deployment candidate servers.

Furthermore, in the third embodiment and the fourth embodiment, the shortest path is obtained with the server having the highest deployment frequency of the distributed application deemed as the starting point server. However, another server may be deemed as the starting point server. For example, the server in which the relevant distributed application is currently deployed may be deemed as the starting point server.

Although the embodiments are exemplified above, the configuration of each unit represented in the embodiments may be replaced by another object having the similar functions. Furthermore, another arbitrary constituent object or process may be added. Moreover, what is obtained by combining arbitrary two or more configurations (characteristics) in the above-described embodiments may be employed.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A communication path management apparatus comprising:
    a memory configured to store history data relating to each of a plurality of processings performed by corresponding applications by a plurality of servers in a network; and
    a processor coupled to the memory and the processor configured to:

identify candidate servers based on history data relating to the first processing and the second processing, the candidate servers being a subset of the plurality of servers and including at least a first server and a second server to perform the first processing and second processing respectively;

establish a communication path between the first server and the second server of the candidate servers to transfer data for the first processing and the second processing; and limit inter-adjacent-server communication paths to paths between candidate servers of the plurality of servers of the distributed system, wherein the history data includes at least one of an execution track record associated with the first processing and the second processing, delay time between candidate servers, frequency of execution of the first processing and second processing by the candidate servers, and direction of data transfer between the candidate servers, the memory further stores delay time information that represents a delay time of communication between adjacent servers on the communication paths among the plurality of servers in the network, to establish the communication path, a server having highest execution frequency of the first processing among the plurality of servers is identified as a starting point server based on the execution frequency of the first processing regarding each of the plurality of servers, and a shortest path with which the delay time of communication is shortest among communication paths from the starting point server to a destination server is decided based on the delay time information, and an inter-adjacent-server communication path on the shortest path is decided as the communication path established within a data transfer path between the starting point server and a destination server, the processor is further configured to:

determine whether or not a track record of execution of the second processing exists in any one of servers allowed to be reached by tracing the shortest path from the starting point server to the destination server, servers at ends of a communication path within the data transfer path determined to have the track record of execution of the second processing establish a communication coupling of bidirectional communication and servers at the ends of a communication path within the data transfer path determined to have no track record of execution of the second processing establish a communication coupling of unidirectional communication in a direction from the first server to the second server.

2. A computer-readable non-transitory recording medium storing a program that causes a computer to execute a procedure, the procedure comprising:

storing history data related to each of a plurality of kinds of processing performed by corresponding applications by a plurality of servers in a network;

obtaining a processing pair that includes first processing and second processing being executed sequentially;

identifying candidate servers based on history data relating to the first processing and the second processing, the candidate servers being a subset of the plurality of servers and including at least a first server and a second server to perform the first processing and second processing respectively;

establishing a communication path between the first server and the second server of the candidate servers to transfer data for the first processing and the second processing; and limiting inter-adjacent-server communication paths to paths between candidate servers of the plurality of servers of the distributed system, wherein the history data includes at least one of an execution track record associated with the first processing and the second processing, delay time between candidate servers, frequency of execution of the first processing and second processing by the candidate servers, and direction of data transfer between the candidate servers, the computer further stores delay time information that represents a delay time of communication between adjacent servers on the communication paths among the plurality of servers in the network, in the establishing the communication path, a server having highest execution frequency of the first processing among the plurality of servers is identified as a starting point server based on the execution frequency of the first processing regarding each of the plurality of servers, and a shortest path with which the delay time of communication is shortest among communication paths from the starting point server to a destination server is decided based on the delay time information, and an inter-adjacent-server communication path on the shortest path is decided as the communication path established within a data transfer path between the starting point server and a destination server, the procedure further comprising:

determining whether or not a track record of execution of the second processing exists in any one of servers allowed to be reached by tracing the shortest path from the starting point server to the destination server, servers at ends of a communication path within the data transfer path determined to have the track record of execution of the second processing establish a communication coupling of bidirectional communication and servers at the ends of a communication path within the data transfer path determined to have no track record of execution of the second processing establish a communication coupling of unidirectional communication in a direction from the first server to the second server.

3. A communication path management method for a distributed system, which includes a plurality of servers, executing a plurality distributed applications, the method comprising:

obtaining a processing pair that includes first processing and second processing being executed sequentially;

identifying candidate servers based on history data relating to the first processing and the second processing, the candidate servers being a subset of the plurality of servers and including at least a first server and a second server to perform the first processing and second processing respectively;

establishing a communication path between the first server and the second server of the candidate servers to transfer data for the first processing and the second processing; and limiting inter-adjacent-server communication paths to paths between candidate servers of the plurality of servers of the distributed system, the method further comprising:

establishing data transfer paths, which includes the communication path, for data transfer from the first processing to the second processing by processing a plurality of processing pairs; and instructing servers at ends of data transfer paths established using each of the processing pairs to carry out data transfer of an execution result of the first processing by the data transfer paths;

the method further comprising:

storing delay time information that represents a delay time of communication between adjacent servers on the communication paths among the plurality of servers and execution frequency of the first processing regarding each of the plurality of servers; and in the establishing the data transfer paths, a server having highest execution frequency of the first processing among the plurality of servers is identified as a starting point server based on the execution frequency of the first processing regarding each of the plurality of servers, and a shortest path with which the delay time of communication is shortest among communication paths from the starting point server to a destination server based on the delay time information, is decided as the overall data transfer path between the starting point server and the destination server, the method further comprising:

determining whether or not a track record of execution of the second processing exists in any one of servers allowed to be reached by tracing the shortest path that passes from the starting point server to the destination server, wherein servers at ends of a data transfer path determined to have the track record of execution of the second processing establish a communication coupling of bidirectional communication and servers at ends of a data transfer path determined to have no track record of execution of the second processing are instructed to establish a communication coupling of unidirectional communication in a direction from the first server to the second serve.

4. The communication path management method according to claim 3, wherein the history data includes at least one of an execution track record associated with the first processing and the second processing, delay time between candidate servers, frequency of execution of the first processing and second processing by the candidate servers, and direction of data transfer between the candidate servers.

5. The communication path management method according to claim 3, wherein the identifying the candidate servers is calculated by a statistical method using the history data of the first processing or the second processing.

* * * * *